United States Patent
Liu et al.

(10) Patent No.: US 10,129,863 B2
(45) Date of Patent: *Nov. 13, 2018

(54) ENHANCED PHYSICAL DOWNLINK CONTROL CHANNEL TRANSMISSION METHOD AND APPARATUS

(71) Applicant: Huawei Technologies Co., Ltd., Shenzhen (CN)

(72) Inventors: Kunpeng Liu, Beijing (CN); Chi Gao, Shenzhen (CN); Jianghua Liu, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,330

(22) Filed: Apr. 21, 2017

(65) Prior Publication Data

US 2017/0230947 A1    Aug. 10, 2017

Related U.S. Application Data

(63) Continuation of application No. 14/611,837, filed on Feb. 2, 2015, now Pat. No. 9,756,625, which is a
(Continued)

(30) Foreign Application Priority Data

Aug. 2, 2012 (WO) ............... PCT/CN2012/079598

(51) Int. Cl.
H04W 72/04 (2009.01)
H04L 5/00 (2006.01)
H04W 88/02 (2009.01)

(52) U.S. Cl.
CPC ......... *H04W 72/042* (2013.01); *H04L 5/0007* (2013.01); *H04L 5/0048* (2013.01); *H04L 5/0053* (2013.01); *H04W 88/02* (2013.01)

(58) Field of Classification Search
None
See application file for complete search history.

(56) References Cited

U.S. PATENT DOCUMENTS

| 2010/0195612 A1 | 8/2010 | Seo et al. |
| 2011/0007674 A1 | 1/2011 | Dai et al. |

(Continued)

FOREIGN PATENT DOCUMENTS

| CN | 101159470 A | 4/2008 |
| CN | 101212416 A | 7/2008 |

(Continued)

OTHER PUBLICATIONS

"Definition of eCCE and eREG," 3GPP TSG-RAN WG1 Meeting #69, Prague, Czech Republic, R1-122360, 3rd Generation Partnership Project, Valbonne, France (May 21-25, 2012).

(Continued)

*Primary Examiner* — Edan Orgad
*Assistant Examiner* — Saumit Shah
(74) *Attorney, Agent, or Firm* — Leydig, Voit & Mayer, Ltd.

(57) ABSTRACT

This application provides an enhanced physical downlink control channel transmission method and apparatus. The method includes: in a physical resource block set, separately arranging first resource groups in each physical resource block pair PRB pair, where the first resource groups are enhanced resource element groups eREGs or REGs, and the physical resource block set includes at least one of the physical resource block pairs; numbering second resource groups according to a correspondence between the first resource groups and the second resource groups in the physical resource block set, where the second resource groups are control channel element eCCE groups or control channel candidates; determining numbers of the second
(Continued)

resource groups for transmitting an E-PDCCH; and mapping, according to the determined numbers, the E-PDCCH to the corresponding first resource groups for transmission. The technical solution of this application resolves an E-PDCCH transmission problem.

18 Claims, 15 Drawing Sheets

Related U.S. Application Data continuation of application No. PCT/CN2012/082363, filed on Sep. 28, 2012.

(56) References Cited

U.S. PATENT DOCUMENTS

| | | |
|---|---|---|
| 2011/0007695 A1 | 1/2011 | Choi et al. |
| 2011/0228729 A1 | 9/2011 | Dai et al. |
| 2013/0044712 A1 | 2/2013 | Kim et al. |
| 2013/0250882 A1 | 9/2013 | Dinan et al. |
| 2013/0286967 A1 | 10/2013 | Ji et al. |
| 2013/0301562 A1 | 11/2013 | Liao et al. |
| 2014/0286297 A1 | 9/2014 | Zhao et al. |
| 2014/0348125 A1 | 11/2014 | Zhao et al. |
| 2015/0078326 A1 | 3/2015 | Kim et al. |
| 2015/0146670 A1 | 5/2015 | Liu et al. |
| 2015/0181573 A1 | 6/2015 | Takeda et al. |
| 2015/0189640 A1 | 7/2015 | Lee et al. |
| 2015/0295688 A1 | 10/2015 | Pan et al. |

FOREIGN PATENT DOCUMENTS

| | | |
|---|---|---|
| CN | 101252422 A | 8/2008 |
| CN | 101594215 A | 12/2009 |
| CN | 101702644 A | 5/2010 |
| CN | 101895988 A | 11/2010 |
| CN | 101959307 A | 1/2011 |
| CN | 102082600 A | 6/2011 |
| CN | 102395206 A | 3/2012 |
| CN | 102420685 A | 4/2012 |
| CN | 102573094 A | 7/2012 |
| CN | 102611524 A | 7/2012 |
| CN | 102612094 A | 7/2012 |
| EP | 2779774 A1 | 9/2014 |
| EP | 2871894 A1 | 5/2015 |
| JP | 2014023108 A | 2/2014 |
| JP | 6077657 B2 | 2/2017 |
| KR | 20110137751 A | 12/2011 |
| WO | 2009041770 A2 | 4/2009 |
| WO | 2011132946 A2 | 10/2011 |
| WO | 2011137383 A1 | 11/2011 |
| WO | 2011159132 A2 | 12/2011 |
| WO | 2014019286 A1 | 2/2014 |

OTHER PUBLICATIONS

"Necessity of Multiplexing of Localized and Distributed ePDCCH Parts in the Same PRBs," 3GPP TSG-RAN WG1#69, Prague, Czech, R1-122168, 3rd Generation Partnership Project, Valbonne, France (May 21-25, 2012).

"Multiplexing of Localized and Distributed ePDCCH in the Same PRBs," 3GPP TSG RAN WG1 Meeting #69, Prague, Czech Republic, R1-122499, 3rd Generation Partnership Project, Valbonne, France (May 21-25, 2012).

"Multiplexing of ePDCCH for different users," 3GPP TSG RAN WG1 Meeting #68bis,Jeju, Korea, R1-121288, 3rd Generation Partnership Project, Valbonne, France (Mar. 26-30, 2012).

"Views on Resource Mapping for ePDCCH," 3GPP TSG RAN WG1 Meeting #69, Prague, Czech Republic, R1-121977, pp. 1-5, 3rd Generation Partnership Project, Valbonne, France (May 21-25, 2012).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.2.0, pp. 1-103, 3rd Generation Partnership Project, Valbonne, France (Jun. 2011).

"3rd Generation Partnership Project; Technical Specification Group Radio Access Network; Evolved Universal Terrestrial Radio Access (E-UTRA); Multiplexing and Channel Coding (Release 10)," 3GPP TS 36.212, V10.6.0, pp. 1-79, 3rd Generation Partnership Project, Valbonne, France (Jun. 2012).

"3rd Generation Partnership Project; Technical Specification Group Radio Access Network; Evolved Universal Terrestrial Radio Access (E-UTRA); Physical Layer Procedures (Release 10)," 3GPP TS 36.213, V10.6.0, pp. 1-125, 3rd Generation Partnership Project, Valbonne, France (Jun. 2012).

"Details of multiplexing of DCI Messages," 3GPP TSG-RAN WG1 #68bis,Jeju, Republic of Korea, R1-121023, 3rd Generation Partnership Project, Valbonne, France (Mar. 26-30, 2012).

"DCI multiplexing by eREG," 3GPP TSG-RAN WG1 #69, Prague, Czech Republic, R1-122001, 3rd Generation Partnership Project, Valbonne, France (May 21-25, 2012).

"Discussion on eREG/eCCE definition," 3GPP TSG RAN WG1 Meeting #69, Prague, Czech Republic, R1-122308, pp. 1-7, 3rd Generation Partnership Project, Valbonne, France (May 21-25, 2012).

"Introduction of CR for downlink DVRB Mapping to PRB," 3GPP TSG RAN WG1 #53, Kansas City, USA, R1-081818, pp. 1-4, 3rd Generation Partnership Project, Valbonne, France (May 5-9, 2008).

"Consideration on E-PDCCH Search Space and Multipelxing Design,"3GPP TSG RAN WG1 Meeting #69, Prague, Czech Republic, R1-122721, pp. 1-6, 3rd Generation Partnership Project, Valbonne, France (May 21-25, 2012).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.5.0, pp. 1-101, 3rd Generation Partnership Project, Valbonne, France (Jun. 2012).

"EREG and eCCE Definitions for ePDCCH," 3GPP TSG-RAN WG1 #69, Prague, Czech Republic, R1-122331, pp. 1-6, 3rd Generation Partnership Project, Valbonne, France (May 21-25, 2012).

"Need for multiplexing localized and distributed ePDCCHs in one PRB," 3GPP TSG RAN WG1 #69, Prague, Czech Republic, R1-122743, pp. 1-2, 3rd Generation Partnership Project, Valbonne, France (May 2012).

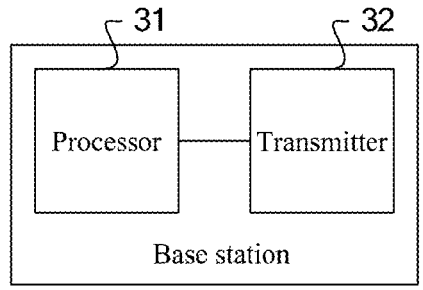

FIG. 3A

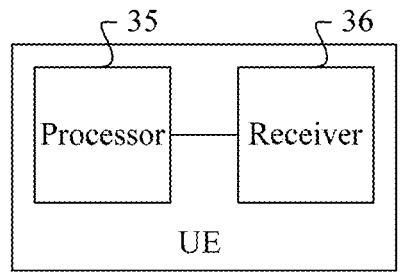

FIG. 3B

| In a physical resource block set, arrange first resource groups in each physical resource block pair, where the first resource groups are eREGs or REGs, and the physical resource block set includes at least one of the physical resource block pairs | 401 |

| Number second resource groups according to a correspondence between the first resource groups and the second resource groups in the physical resource block set, where the second resource groups are control channel element eCCE groups or control channel candidate groups | 402 |

| Determine numbers of the second resource groups for transmitting an E-PDCCH, and map, according to the determined numbers, the E-PDCCH to the corresponding first resource groups for transmission | 403 |

FIG. 4A

| DMRS port (port) | PRB pair index 1 eREG index | PRB pair index 2 eREG index | PRB pair index 3 eREG index | PRB pair index 4 eREG index |
|---|---|---|---|---|
| Port 7 | eREG (0) | eREG (0) | eREG (0) | eREG (0) |
| Port 9 | eREG (1) | eREG (1) | eREG (1) | eREG (1) |
| Port 8 | eREG (2) | eREG (2) | eREG (2) | eREG (2) |
| Port 10 | eREG (3) | eREG (3) | eREG (3) | eREG (3) |
| Port 9 | eREG (4) | eREG (4) | eREG (4) | eREG (4) |
| Port 7 | eREG (5) | eREG (5) | eREG (5) | eREG (5) |
| Port 10 | eREG (6) | eREG (6) | eREG (6) | eREG (6) |
| Port 8 | eREG (7) | eREG (7) | eREG (7) | eREG (7) |

FIG. 10

| DMRS port (port) | PRB pair index 1 eREG index | PRB pair index 2 eREG index | PRB pair index 3 eREG index | PRB pair index 4 eREG index |
|---|---|---|---|---|
| Port 7 | ereg (0) | ereg (0) | ereg (0) | ereg (0) |
| Port 8 | ereg (1) | ereg (1) | ereg (1) | ereg (1) |
| Port 8 | ereg (2) | ereg (2) | ereg (2) | ereg (2) |
| Port 7 | ereg (3) | ereg (3) | ereg (3) | ereg (3) |
| Port 9 | ereg (4) | ereg (4) | ereg (4) | ereg (4) |
| Port 10 | ereg (5) | ereg (5) | ereg (5) | ereg (5) |
| Port 10 | ereg (6) | ereg (6) | ereg (6) | ereg (6) |
| Port 9 | ereg (7) | ereg (7) | ereg (7) | ereg (7) |

FIG. 11

| DMRS port (port) | PRB pair index 1 eREG index | PRB pair index 2 eREG index | PRB pair index 3 eREG index | PRB pair index 4 eREG index |
|---|---|---|---|---|
| Port 7 | ereg (0) | ereg (0) | ereg (0) | ereg (0) |
| Port 9 | ereg (1) | ereg (1) | ereg (1) | ereg (1) |
| Port 8 | ereg (2) | ereg (2) | ereg (2) | ereg (2) |
| Port 10 | ereg (3) | ereg (3) | ereg (3) | ereg (3) |
| Port 9 | ereg (4) | ereg (4) | ereg (4) | ereg (4) |
| Port 7 | ereg (5) | ereg (5) | ereg (5) | ereg (5) |
| Port 10 | ereg (6) | ereg (6) | ereg (6) | ereg (6) |
| Port 8 | ereg (7) | ereg (7) | ereg (7) | ereg (7) |

FIG. 12

| DMRS port (port) | PRB pair index 1 eREG index | PRB pair index 2 eREG index | PRB pair index 3 eREG index | PRB pair index 4 eREG index |
|---|---|---|---|---|
| Port 7 | ereg (0) | ereg (0) | ereg (0) | ereg (0) |
| Port 7 | ereg (1) | ereg (1) | ereg (1) | ereg (1) |
| Port 8 | ereg (2) | ereg (2) | ereg (2) | ereg (2) |
| Port 8 | ereg (3) | ereg (3) | ereg (3) | ereg (3) |
| Port 9 | ereg (4) | ereg (4) | ereg (4) | ereg (4) |
| Port 9 | ereg (5) | ereg (5) | ereg (5) | ereg (5) |
| Port 10 | ereg (6) | ereg (6) | ereg (6) | ereg (6) |
| Port 10 | ereg (7) | ereg (7) | ereg (7) | ereg (7) |

FIG. 13

|  | PRB pair index 1 eREG index | PRB pair index 2 eREG index | PRB pair index 3 eREG index | PRB pair index 4 eREG index |
|---|---|---|---|---|
| eREG group 1 | eREG (a1) | eREG (a2) | eREG (a3) | eREG (a4) |
|  | eREG (a2) | eREG (a3) | eREG (a4) | eREG (a1) |
|  | eREG (a3) | eREG (a4) | eREG (a1) | eREG (a2) |
|  | eREG (a4) | eREG (a1) | eREG (a2) | eREG (a3) |
| eREG group 2 | eREG (a5) | eREG (a6) | eREG (a7) | eREG (a8) |
|  | eREG (a6) | eREG (a7) | eREG (a8) | eREG (a5) |
|  | eREG (a7) | eREG (a8) | eREG (a5) | eREG (a6) |
|  | eREG (a8) | eREG (a5) | eREG (a6) | eREG (a7) |
| eREG group 3 | eREG (a9) | eREG (a10) | eREG (a11) | eREG (a12) |
|  | eREG (a10) | eREG (a11) | eREG (a12) | eREG (a9) |
|  | eREG (a11) | eREG (a12) | eREG (a9) | eREG (a10) |
|  | eREG (a12) | eREG (a9) | eREG (a10) | eREG (a11) |
| eREG group 4 | eREG (a13) | eREG (a14) | eREG (a15) | eREG (a16) |
|  | eREG (a14) | eREG (a15) | eREG (a16) | eREG (a13) |
|  | eREG (a15) | eREG (a16) | eREG (a13) | eREG (a14) |
|  | eREG (a16) | eREG (a13) | eREG (a14) | eREG (a15) |

FIG. 14

ENHANCED PHYSICAL DOWNLINK CONTROL CHANNEL TRANSMISSION METHOD AND APPARATUS

CROSS-REFERENCE TO RELATED APPLICATION

This application is a continuation of U.S. patent application Ser. No. 14/611,837, filed on Feb. 2, 2015, which is a continuation of International Patent Application No. PCT/CN2012/082363, filed on Sep. 28, 2012. The International Patent Application claims priority to International Patent Application No. PCT/CN2012/079598, filed on Aug. 2, 2012. All of the afore-mentioned patent applications are hereby incorporated by reference in their entireties.

TECHNICAL FIELD

The present invention relates to communications technologies, and in particular, to an enhanced physical downlink control channel transmission method and apparatus.

BACKGROUND

In LTE release (Release) 8/9/10, a physical downlink control channel (PDCCH) is transmitted on first N (N=1, 2, 3, 4) orthogonal frequency division multiplexing (OFDM) symbols of each subframe, and is multiplexed with a physical downlink shared channel (PDSCH) in time-division multiplexing (TDM) mode, and its demodulation pilot is a downlink common pilot, namely, a cell-specific reference signal (CRS). To ensure transmission reliability, a space frequency block code (SFBC) transmission mode or a combination of an SFBC transmission mode and a frequency switched transmit diversity (FSTD) transmission mode is used.

As a heterogeneous network is deployed on a large scale, in LTE release 11, the PDCCH faces great challenges in aspects of capacity, coverage, and interference coordination, and therefore an enhanced PDCCH (E-PDCCH) is put forward. The E-PDCCH is located in a PDSCH region, and multiplexed with the PDSCH in frequency division multiplexing (FDM) mode. In addition, multiplexing of an enhanced control channel and a traffic channel in a time-frequency resource block is not supported. The E-PDCCH is demodulated based on a user equipment (UE) specific demodulation reference signal (DMRS). As may be seen above, time-frequency resources occupied by the E-PDCCH are different from those occupied by the PDCCH in the prior art, and a PDCCH transmission mode cannot be directly used to transmit the E-PDCCH. Therefore, an E-PDCCH transmission problem needs to be resolved.

SUMMARY

Embodiments of the present invention provide an enhanced physical downlink control channel transmission method and apparatus to resolve an E-PDCCH transmission problem.

A first aspect of an embodiment of the present invention provides an enhanced physical downlink control channel transmission method, including: in a physical resource block set, separately arranging first resource groups in each physical resource block pair PRB pair, where the first resource groups are resource element groups eREGs or REGs, and the physical resource block set includes at least one of the physical resource block pairs; numbering second resource groups according to a correspondence between the first resource groups and the second resource groups in the physical resource block set, where the second resource groups are control channel element eCCE groups or control channel candidates; determining numbers of the second resource groups for transmitting an E-PDCCH; and mapping, according to the determined numbers, the E-PDCCH to the corresponding first resource groups for transmission.

A second aspect of an embodiment of the present invention provides an enhanced physical downlink control channel E-PDCCH transmission apparatus, including:

an arranging unit, configured to separately arrange, in a physical resource block set, first resource groups in each physical resource block pair PRB pair, where the first resource groups are resource element groups eREGs or REGs, and the physical resource block set includes at least one of the physical resource block pairs;

a numbering unit, configured to number second resource groups according to a correspondence between the first resource groups and the second resource groups in the physical resource block set, where the second resource groups are control channel element eCCE groups or control channel candidates;

a fifth determining unit, configured to determine numbers of the second resource groups for transmitting an E-PDCCH; and a transmission unit, configured to map, according to the determined numbers, the E-PDCCH to the corresponding first resource groups for transmission.

A third aspect of an embodiment of the present invention provides an enhanced physical downlink control channel E-PDCCH transmission apparatus, including:

a transceiver, configured to transmit and receive a signal; and a processor, configured to execute the following steps:

in a physical resource block set, separately arranging first resource groups in each physical resource block pair PRB pair, where the first resource groups are resource element groups eREGs or REGs, and the physical resource block set includes at least one of the physical resource block pairs;

numbering second resource groups according to a correspondence between the first resource groups and second resource groups in the physical resource block set, where the second resource groups are control channel element eCCE groups or control channel candidates;

determining numbers of the second resource groups for transmitting an E-PDCCH; and mapping, according to the determined numbers, the E-PDCCH to the corresponding first resource groups for transmission.

By using the enhanced physical downlink control channel transmission method and apparatus provided by the embodiments of the present invention, numbers of second resource groups are determined according to the relationship between the first resource groups and the second resource groups; then, numbers of the second resource groups for transmitting an E-PDCCH are determined; and the E-PDCCH is mapped to corresponding first resource groups for transmission. Therefore, an E-PDCCH transmission problem is resolved, and in addition, a numbering method in the solution is advantageous for blind detection.

BRIEF DESCRIPTION OF DRAWINGS

FIG. 3A is a schematic structural diagram of a base station according to another embodiment of the present invention;

FIG. 3B is a schematic structural diagram of a UE according to another embodiment of the present invention;

FIG. 4A is a flowchart of another E-PDCCH transmission method according to an embodiment of the present invention;

FIG. 10 shows an optional correspondence between the second resource groups of the first type and second type and the first resource groups and pilot ports on a basis of Table 1;

FIG. 11 shows another optional correspondence between the second resource groups of the first type and second type and the first resource groups and the pilot ports on a basis of Table 2;

FIG. 12 shows a second resource group of the first type and a second resource group of the second type may also include four first resource groups on a basis of Table 1;

FIG. 13 shows another mapping relationship between the first resource groups and the DMRS ports; and FIG. 14 shows another mapping relationship between physical resource block pairs and first resource groups.

DESCRIPTION OF EMBODIMENTS

Figure 1A:
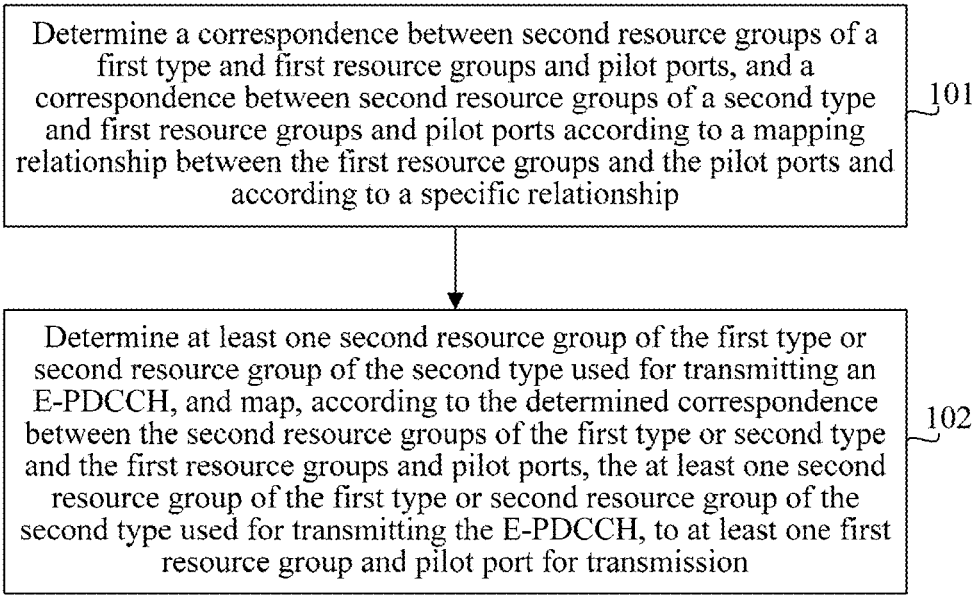
FIG. 1A is a flowchart of an E-PDCCH transmission method according to an embodiment of the present invention.

FIG. 1A is a flowchart of an E-PDCCH transmission method according to an embodiment of the present invention. This embodiment may be executed by a base station, for example, a base station in an LTE system. As shown in FIG. 1A, the method in this embodiment includes:

Step 101: Determine a correspondence between second resource groups of a first type and first resource groups and pilot ports, and a correspondence between second resource groups of a second type and first resource groups and pilot ports according to a mapping relationship between the first resource groups and the pilot ports and according to a specific relationship.

The mapping relationship between the first resource groups and the pilot ports is obtained by the base station in advance. A manner in which the base station obtains the mapping relationship between the first resource groups and the pilot ports in advance includes but is not limited to the following several manners: The base station and a user equipment (UE) predefine the mapping relationship between the first resource groups and the pilot ports. Alternatively, the base station generates the mapping relationship between the first resource groups and the pilot ports according to a local cell identity (ID). Optionally, the base station may further send higher layer signaling to the UE, where the higher layer signaling includes the mapping relationship between the first resource groups and the pilot ports.

The mapping relationship between the first resource groups and the pilot ports includes a mapping relationship between at least one first resource group in a physical resource element set and at least one pilot port; and the physical resource element set is at least one physical resource block pair (PRB pair). The first resource groups are resource element groups (eREGs) or REGs; the second resource groups of the first type are control channel elements (eCCEs) or control channel candidates; and the second resource groups of the second type are eCCEs or control channel candidates. A second resource group of the first type corresponds to at least two first resource groups, and a second resource group of the second type corresponds to at least two first resource groups. Herein the correspondence mainly indicates that the second resource groups of the first type and second type may include at least two first resource groups. A correspondence between second resource groups of different types and the first resource groups and the pilot ports satisfies the foregoing specific relationship. The pilot ports in this embodiment mainly refer to DMRS ports.

As may be seen above, the second resource groups in this embodiment include two types: second resource groups of the first type and second resource groups of the second type. Optionally, the second resource groups of the first type are resource groups for transmitting an E-PDCCH in localized mode, and the second resource groups of the second type are resource groups for transmitting the E-PDCCH in distributed mode. Herein the transmission in localized mode means that resources for transmitting the E-PDCCH are allocated and centralized in one or several consecutive physical resource block pairs, and the transmission in distributed mode means that resources for transmitting the E-PDCCH are allocated and decentralized in multiple non-consecutive physical resource block pairs. It is noted herein that in release 11, when the E-PDCCH is transmitted in distributed mode, SFBC is not supported, but a multi-user common precoding (random beam forming) mechanism is used.

If the first resource groups are eREGs, an optional mapping relationship between the first resource groups and the pilot ports is shown in Table 1.

TABLE 1

| eREG position index (index) | DMRS port (port) |
| --- | --- |
| eREG (0) | Port 7 |
| eREG (1) | Port 9 |
| eREG (2) | Port 8 |
| eREG (3) | Port 10 |
| eREG (4) | Port 9 |
| eREG (5) | Port 7 |
| eREG (6) | Port 10 |
| eREG (7) | Port 8 |

As shown in Table 1, the physical resource element set is a physical resource block pair, where the physical resource block pair includes eight eREGs, and the eight eREGs are mapped to four DMRS ports in total, which are a DMRS port 7, a DMRS port 8, a DMRS port 9, and a DMRS port 10 respectively. A mapping relationship between each eREG and a DMRS port is not limited to that shown in Table 1.

On a basis of Table 1, an optional correspondence between the second resource groups of the first type and second type and the first resource groups and pilot ports is shown in FIG. 10.

As shown in FIG. 10, the physical resource block set used for transmitting the E-PDCCH includes four physical resource block pairs, which are physical resource block pairs indexed 1, 2, 3, and 4 respectively, where each physical resource block pair includes eight eREGs. In each physical resource block pair, each eREG has a unique position index (for example, numbers 0 to 7 in brackets after eREGs in Table 1 or FIG. 10). For physical resource block pairs including a same quantity of eREGs, the eREGs have same position indexes. A second resource group of the first type includes at least two eREGs in a same physical resource block pair. Assuming that a second resource group of the first type includes two eREGs in a same physical resource block pair, the second resource group of the first type may include eREG (0) and eREG (1) in a physical resource block pair indexed 1 in FIG. 10, and corresponding pilot ports are the DMRS ports 7 and 9; or the second resource group of the first type includes eREG (2) and eREG (3) in a physical resource block pair indexed 1, and corresponding pilot ports are the DMRS ports 8 and 10; or the second resource group of the first type includes eREG (4) and eREG (5) in a physical resource block pair indexed 1, and corresponding pilot ports are the DMRS ports 9 and 7; or the second resource group of the first type includes eREG (6) and eREG (7) in a physical resource block pair indexed 1, and corresponding pilot ports are the DMRS ports 10 and 8; or the second resource group of the first type may also include eREGs in a physical resource block pair indexed 2, and so on, which are not further listed. A second resource group of the second type includes at least two eREGs in different physical resource block pairs. Assuming that a second resource group of the second type includes two eREGs in different physical resource block pairs, the second resource group of the second type may include eREG (0) in a physical resource block pair indexed 3 and eREG (0) in a physical resource block pair indexed 4 in FIG. 10, and a corresponding pilot port is the DMRS port 7; or the second resource group of the second type may include eREG (1) in a physical resource block pair indexed 3 and eREG (4) in a physical resource block pair indexed 4, and a corresponding pilot port is the DMRS port 9; or the second resource group of the second type may consist of eREG (6) in a physical resource block pair indexed 2 and eREG (7) in a physical resource block pair indexed 3, and corresponding pilot ports are the DMRS port 10 and 8, and so on. As shown in FIG. 10, if eREGs that constitute a second resource group of the first type or second type are determined, a pilot port corresponding to the second resource group of the first type or second type is also determined.

It is noted herein that the physical resource block set used for transmitting the E-PDCCH as shown in FIG. 10 includes four physical resource block pairs, but is not limited thereto.

Step 102: Determine at least one second resource group of the first type or second resource group of the second type used for transmitting an E-PDCCH, and map, according to the determined correspondence between the second resource groups of the first type or second type and the first resource groups and pilot ports, the at least one second resource group of the first type or second resource group of the second type used for transmitting the E-PDCCH, to at least one first resource group and pilot port for transmission.

If the E-PDCCH needs to be transmitted in localized mode, the base station determines at least one second resource group of the first type used for transmitting the E-PDCCH, and then maps, according to the previously determined correspondence between the second resource groups of the first type and the first resource groups and the pilot ports, the at least one second resource group of the first type used for transmitting the E-PDCCH, to at least one first resource group and pilot port for transmission.

If the E-PDCCH needs to be transmitted in distributed mode, the base station determines at least one second resource group of the second type used for transmitting the E-PDCCH, and then maps, according to the previously determined correspondence between the second resource groups of the second type and the first resource groups and the pilot ports, the at least one second resource group of the second type used for transmitting the E-PDCCH, to at least one first resource group and pilot port for transmission.

In the prior art, CRS transmission is used for transmitting a PDCCH, all CCEs for transmitting the PDCCH are mapped to a same CRS port, and an SFBC mode or both an SFBC mode and an FSTD mode are used for transmission. However, DMRS transmission is used for the E-PDCCH, and precoding (precoding) is required for the DMRS. Therefore, a correspondence between eCCEs or physical channel candidates for transmitting the E-PDCCH and DMRS ports needs to be determined, so that demodulation can be completed correctly. Apparently, the PDCCH transmission mode in the prior art is no longer applicable to the E-PDCCH. In this embodiment, the correspondence between the second resource groups of the first type and the first resource groups and the pilot ports, and the correspondence between the second resource groups of the second type and the first resource groups and the pilot ports are determined according to the mapping relationship between the first resource groups and the pilot ports; then the second resource groups (the second resource groups of the first type or the second resource groups of the second type) used for transmitting the E-PDCCH are determined; and then according to the correspondence between the second resource groups of the two types and the first resource groups and the pilot ports, the second resource groups used for transmitting the E-PDCCH are mapped to the corresponding first resource groups and pilot ports for transmission. Thereby, an E-PDCCH transmission problem is resolved, and a basis is laid for correctly demodulating the E-PDCCH.

In an optional implementation manner of this embodiment, another optional mapping relationship between the first resource groups and the pilot ports is shown in Table 3.

TABLE 3

| eREG position index (index) | DMRS port (port) |
| --- | --- |
| eREG (0) | Port 7 |
| eREG (1) | Port 8 |
| eREG (2) | Port 8 |
| eREG (3) | Port 7 |
| eREG (4) | Port 9 |
| eREG (5) | Port 10 |
| eREG (6) | Port 10 |
| eREG (7) | Port 9 |

As shown in Table 3, the physical resource element set is a physical resource block pair, where each physical resource block pair includes eight eREGs, and the eight eREGs are mapped to four DMRS ports in total, which are a DMRS port 7, a DMRS port 8, a DMRS port 9, and a DMRS port 10 respectively. A mapping relationship between each eREG and a DMRS port is different from the mapping relationship in Table 1, but the mapping relationship between eREGs and DMRSs is not limited to those shown in Table 1 and Table 3.

On a basis of Table 3, another optional correspondence between the second resource groups of the first type and second type and the first resource groups and the pilot ports is shown in FIG. 11.

As shown in FIG. 11, the physical resource block set used for transmitting the E-PDCCH includes four physical resource block pairs, which are physical resource block pairs indexed 1, 2, 3, and 4 respectively, where each physical resource block pair includes eight eREGs. A second resource group of the first type includes at least two eREGs in a same physical resource block pair. Assuming that a second resource group of the first type includes four eREGs in a same physical resource block pair, the second resource group of the first type may include eREG (0), eREG (1), eREG (2), and eREG (3) in a physical resource block pair indexed 1 in FIG. 11, and corresponding pilot ports are the DMRS ports 7 and 8; or the second resource group of the first type includes eREG (4), eREG (5), eREG (6), and eREG (7) in a physical resource block pair indexed 1, and corresponding pilot ports are the DMRS ports 9 and 10, and so on, which are not further listed. A second resource group of the second type includes at least two eREGs in different physical resource block pairs. Assuming that a second resource group of the second type includes four eREGs in different physical resource block pairs, the second resource group of the second type may include eREG (0) in physical resource block pairs indexed 1, 2, 3, and 4 in FIG. 10, and a corresponding pilot port is the DMRS port 7; or the second resource group of the second type may include eREG (2) in physical resource block pairs indexed 1 and 2 and eREG (3) in physical resource block pairs indexed 3 and 4, and corresponding pilot ports are the DMRS ports 8 and 7, and so on. As shown in FIG. 11, if eREGs that constitute a second resource group of the first type or second type are determined, a pilot port corresponding to the second resource group of the first type or second type is also determined.

It is noted herein that, on a basis shown in Table 1, a second resource group of the first type and a second resource group of the second type may also include four first resource groups, as shown in FIG. 12. Correspondingly, on a basis shown in Table 3, a second resource group of the first type and a second resource group of the second type may also include two first resource groups, and other cases are not further described by using examples.

As shown in FIG. 12, assuming that a second resource group of the first type includes four eREGs in a same physical resource block pair, the second resource group of the first type may include eREG (0), eREG (1), eREG (2), and eREG (3) in a physical resource block pair indexed 1 in FIG. 12, and corresponding pilot ports are the DMRS ports 7, 8, 9, and 10; or the second resource group of the first type includes eREG (4), eREG (5), eREG (6), and eREG (7) in a physical resource block pair indexed 1, and corresponding pilot ports are the DMRS ports 9, 7, 10, and 8; or the second resource group of the first type may also include eREG (0), eREG (1), eREG (4), and eREG (5) in a physical resource block pair indexed 2, and corresponding pilot ports are the DMRS ports 7 and 9, and so on, which are not further listed. A second resource group of the second type includes at least two eREGs in different physical resource block pairs. Assuming that a second resource group of the second type includes four eREGs in different physical resource block pairs, the second resource group of the second type may include eREG (0) in physical resource block pairs indexed 1, 2, 3, and 4 in FIG. 10, and a corresponding pilot port is the DMRS port 7; or the second resource group of the second type may include eREG (2) in physical resource block pairs indexed 1 and 2 and eREG (3) in physical resource block pairs indexed 3 and 4, and corresponding pilot ports are the DMRS ports 8 and 10, and so on. As shown in FIG. 12, if eREGs that constitute a second resource group of the first type or second type are determined, a pilot port corresponding to the second resource group of the first type or second type is also determined.

In addition to the mapping relationship between the first resource groups and the pilot ports as shown in Table 1 and Table 3, other mapping relationships may also be used. For example, eREG (0) and eREG (5) correspond to a port 7; eREG (1) and eREG (4) correspond to a port 10; eREG (2) and eREG (7) correspond to a port 8; and eREG (3) and eREG (6) correspond to a port 10.

In an optional implementation manner of this embodiment, that the base station determines a correspondence between second resource groups of a first type and first resource groups and pilot ports according to a mapping relationship between the first resource groups and the pilot ports and according to a specific relationship includes that: the base station determines, according to the mapping relationship between the first resource groups and the pilot ports and according to the specific relationship, that a port set corresponding to at least two first resource groups corresponding to the second resource groups of the first type in the foregoing mapping relationship between the first resource groups and the pilot ports includes at least two different pilot ports, and determines that a pilot port used for transmission by each second resource group of the first type is a pilot port corresponding to the first or last one of the at least two first resource groups corresponding to the second resource groups of the first type. For example, as shown in FIG. 10, the base station determines that at least two first resource groups corresponding to a second resource group of the first type are two first resource groups, and that a port set corresponding to the two first resource groups in the foregoing mapping relationship between the first resource groups and the pilot ports includes two different pilot ports, which are respectively the DMRS port 7 and DMRS port 9 or are respectively the DMRS port 8 and DMRS port 10. For another example, as shown in FIG. 11, the base station determines that at least two first resource groups corresponding to a second resource group of the first type are four first resource groups, and that a port set corresponding to the four first resource groups in the foregoing mapping relationship between the first resource groups and the pilot ports includes four different pilot ports, which are respectively the DMRS ports 7, 8, 9, and 10. For another example, as shown in FIG. 12, the base station determines that at least two first resource groups corresponding to a second resource group of the first type are four first resource groups, and that a port set corresponding to the four first resource groups in the foregoing mapping relationship between the first resource groups and the pilot ports includes four different pilot ports, which are respectively the DMRS ports 7, 8, 9, and 10, or that a port set corresponding to the four first resource groups in the foregoing mapping relationship between the first resource groups and the pilot ports includes two different pilot ports, which are respectively the DMRS ports 7 and 9.

In a word, a port set corresponding to at least two first resource groups corresponding to a second resource group of the first type includes at least two different pilot ports. Preferably, for a second resource group of the first type, using one of the pilot ports during transmission is advantageous for saving pilot resources. To unify pilot ports used during E-PDCCH transmission among different second resource groups of the first type, it is specified that a pilot port corresponding to the first eREG or the last eREG in the corresponding at least two eREGs is selected and used for transmission.

In an optional implementation manner of this embodiment, to improve utilization of first resource groups, the foregoing specific relationship is specifically determining, according to the pilot ports used for transmitting the E-PDCCH by the second resource groups of the second type, the pilot ports used for transmitting the E-PDCCH by the first type, and further determining, according to the mapping relationship between the first resource groups and the pilot ports, the correspondence between the first resource groups of the first type and the first resource groups and pilot ports, and the correspondence between the second resources of the second type and the first resource groups and pilot ports. Based on this, the at least two different pilot ports that are included in the port set corresponding to the at least two first resource groups corresponding to the second resource groups of the first type in the foregoing mapping relationship between the first resource groups and the pilot ports and that are determined by the base station, are at least two pilot ports used for transmission in each physical resource block pair when the E-PDCCH is transmitted by using at least one second resource group of the second type. The pilot ports used for transmission in each physical resource block pair when the E-PDCCH is transmitted by using the second resource groups of the second type may be predefined. For example, if the pilot ports used for transmission in each physical resource block pair when the E-PDCCH is transmitted by using the second resource groups of the second type are the DMRS ports 7 and 9, the at least two different pilot ports that are included in the port set corresponding to the at least two first resource groups corresponding to the second resource groups of the first type in the foregoing mapping relationship between the first resource groups and the pilot ports and that are determined by the base station, are the DMRS ports 7 and 9. As shown in FIG. 10, if the DMRS ports 7 and 9 are used for transmission in each physical resource block pair when the E-PDCCH is transmitted by using the second resource groups of the second type, it indicates that two eREGs corresponding to the second resource groups of the first type are eREGs corresponding to the DMRS ports 7 and 9, which may be eREG (0) and eREG (1), or eREG (4) and eREG (5).

In an optional implementation manner of this embodiment, when a quantity of at least one second resource group of the second type used for transmitting the E-PDCCH is greater than a preset quantity threshold, two pilot ports are used for transmission in each physical resource block pair, which may be a first pilot port and a second pilot port, or may be a third pilot port and a fourth pilot port. That is, when the E-PDCCH is transmitted by using the second resource groups of the second type, the quantity of pilot ports used for transmission in each physical resource block pair is not necessarily two. When a condition is satisfied, the quantity may be two, and may also be one, three, four, and so on. The first pilot port, second pilot port, third pilot port, and fourth pilot port are different DMRS ports. Which DMRS port is specifically used is not limited. In addition, the first pilot port, second pilot port, third pilot port, and fourth pilot port are all pilot ports to which first resource groups in a same physical resource block pair are mapped.

In an optional implementation manner of this embodiment, on a basis of the foregoing description, that is, when a quantity of at least one second resource group of the second type used for transmitting the E-PDCCH is greater than a preset quantity threshold, under a condition that a quantity of pilot ports used for transmission in each physical resource block pair is two, the base station determines that each second resource group of the first type corresponds to two first resource groups, and that a port set corresponding to the two first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port. With reference to FIG. 10, it is assumed that the first pilot port is the DMRS port 7, and that the second pilot port is the DMRS port 9, and that the third pilot port is the DMRS port 8, and that the fourth pilot port is the DMRS port 10. Therefore, each second resource group of the first type corresponds to two eREGs, and pilot ports corresponding to the two eREGs are the DMRS ports 7 and 9, or pilot ports corresponding to the two eREGs are the DMRS ports 8 and 10. For each second resource group of the first type, in actual transmission of the E-PDCCH, a pilot port in a corresponding port set is preferentially selected for transmission. For example, in FIG. 10, eREG (0) corresponding to the DMRS port 7 and eREG (1) corresponding to the DMRS port 9 constitute the first one of the second resource groups of the first type. When the E-PDCCH is transmitted by using the second resource group of the first type, the transmission is based on a pilot port corresponding to the first eREG, eREG (0), in the two eREGs corresponding to the second resource group of the first type, namely, the DMRS port 7. When the E-PDCCH is transmitted by using the second resource group of the first type, a precoding mode used for eREG (0) and eREG (1) is the same as a precoding mode used for the DMRS port 7, and channel estimation is performed for the two eREG (0) and eREG (1) based on the DMRS port 7. In FIG. 10, eREG (2) corresponding to the DMRS port 8 and eREG (3) corresponding to the DMRS port 10 constitute the second one of the second resource groups of the first type. When the E-PDCCH is transmitted by using the second resource group of the first type, the transmission is based on a pilot port corresponding to the first eREG, eREG (2), in the two eREGs corresponding to the second resource group of the first type, namely, the DMRS port 8. That is, when the E-PDCCH is transmitted by using the second resource group of the first type, a precoding mode used for eREG (2) and eREG (3) is the same as a precoding mode used for the DMRS port 8, and channel estimation is performed for the two eREG (2) and eREG (3) based on the DMRS port 8. In FIG. 10, eREG (4) corresponding to the DMRS port 9 and eREG (5) corresponding to the DMRS port 7 constitute the third second resource group of the first type. When the E-PDCCH is transmitted by using the second resource group of the first type, the transmission is based on a pilot port corresponding to the first eREG, eREG (4), in the two eREGs corresponding to the second resource group of the first type, namely, the DMRS port 9. That is, when the E-PDCCH is transmitted by using the second resource group of the first type, a precoding mode used for eREG (4) and eREG (5) is the same as a precoding mode used for the DMRS port 9, and channel estimation is performed for the two eREG (4) and eREG (5) based on the DMRS port 9. In FIG. 10, eREG (6) corresponding to the DMRS port 10 and eREG (7) corresponding to the DMRS port 8 constitute the fourth second resource group of the first type. When the E-PDCCH is transmitted by using the second resource group of the first type, the transmission is based on a pilot port corresponding to the first eREG, eREG (6), in the two eREGs corresponding to the second resource group of the first type, namely, the DMRS port 10. That is, when the E-PDCCH is transmitted by using the second resource group of the first type, a precoding mode used for eREG (6) and eREG (7) is the same as a precoding mode used for the DMRS port 10, and channel estimation is performed for the two eREG (6) and eREG (7) based on the DMRS port 10.

Further, on a basis that each second resource group of the first type corresponds to two first resource groups, each physical resource block pair may include four second resource groups of the first type. In this case, each physical resource block pair includes eight first resource groups in total, as shown in Table 1 to FIG. 12. Two different pilot ports included in a port set corresponding to two first resource groups corresponding to two second resource groups of the first type included in a physical resource block pair in the foregoing mapping relationship between the first resource groups and the pilot ports are uniformly a first pilot port and a second pilot port; and two different pilot ports included in a port set corresponding to two first resource groups corresponding to the other two second resource groups of the first type included in the physical resource block pair in the foregoing mapping relationship between the first resource groups and the pilot ports are uniformly a third pilot port and a fourth pilot port. In addition, for two second resource groups of the first type corresponding to two first resource groups corresponding to the pilot port set including the first pilot port and second pilot port, the two first resource groups in the two second resource groups of the first type are arranged in different sequences according to the pilot ports; likewise, for two second resource groups of the first type corresponding to two first resource groups corresponding to the pilot set including the third pilot port and fourth pilot port, the two first resource groups in the two second resource groups of the first type are arranged in different sequences according to the pilot ports. With reference to FIG. 10, a physical resource block pair indexed 1 includes four second resource groups of the first type, which are respectively a second resource group of the first type that includes eREG (0) and eREG (1), a second resource group of the first type that includes eREG (2) and eREG (3), a second resource group of the first type that includes eREG (4) and eREG (5), and a second resource group of the first type that includes eREG (6) and eREG (7). The second resource group of the first type that includes eREG (0) and eREG (1) and the second resource group of the first type that includes eREG (4) and eREG (5) correspond to same pilot ports, which are respectively the DMRS ports 7 and 9, and after an arrangement according to pilot ports, sequences of the DMRS ports 7 and 9 in the two second resource groups of the first type are different. For example, in the second resource group of the first type that includes eREG (0) and eREG (1), the sequence of the DMRS ports 7 and 9 is first the DMRS port 7 and then the DMRS port 9; and in the second resource group of the first type that includes eREG (4) and eREG (5), the sequence of the DMRS ports 7 and 9 is first the DMRS port 9 and then the DMRS port 7. The second resource group of the first type that includes eREG (2) and eREG (3) and the second resource group of the first type that includes eREG (6) and eREG (7) correspond to same pilot ports, which are respectively the DMRS ports 8 and 10, and after an arrangement according to pilot ports, sequences of the DMRS ports 8 and 9 in the two second resource groups of the first type are different. For example, in the second resource group of the first type that includes eREG (2) and eREG (3), the sequence of the DMRS ports 8 and 10 is first the DMRS port 8 and then the DMRS port 10; and in the second resource group of the first type that includes eREG (6) and eREG (7), the sequence of the DMRS ports 8 and 10 is first the DMRS port 10 and then the DMRS port 8.

In an optional implementation manner of this embodiment, on a basis of the foregoing description, that is, when a quantity of at least one second resource group of the second type used for transmitting the E-PDCCH is greater than a preset quantity threshold, under a condition that a quantity of pilot ports used for transmission in each physical resource block pair is two, the base station determines that each second resource group of the first type corresponds to four first resource groups, and that a port set corresponding to the four first resource groups corresponding to the second resource group of the first type in the foregoing mapping relationship between the first resource groups and the pilot ports includes four different pilot ports, where the four different pilot ports are respectively a first pilot port, a second pilot port, a third pilot port, and a fourth pilot port. With reference to FIG. 12, it is assumed that the first pilot port is the DMRS port 7, and that the second pilot port is the DMRS port 9, and that the third pilot port is the DMRS port 8, and that the fourth pilot port is the DMRS port 10. Therefore, each second resource group of the first type corresponds to four eREGs, and pilot ports corresponding to the four eREGs are the DMRS ports 7, 8, 9, and 10. For each second resource group of the first type, in actual transmission of the E-PDCCH, a pilot port in a corresponding port set is preferentially selected for transmission. For example, in FIG. 12, eREG (0) corresponding to the DMRS port 7, eREG (1) corresponding to the DMRS port 9, eREG (2) corresponding to the DMRS port 8, and eREG (3) corresponding to the DMRS port 10 constitute the first one of the second resource groups of the first type. When the E-PDCCH is transmitted by using the second resource group of the first type, the transmission is based on a pilot port corresponding to the first eREG, eREG (0), in the four eREGs corresponding to the second resource group of the first type, namely, the DMRS port 7. That is, when the E-PDCCH is transmitted by using the second resource group of the first type, a precoding mode used for eREG (0), eREG (1), eREG (2), and eREG (3) is the same as a precoding mode used for the DMRS port 7, and channel estimation is performed for the four eREG (0), eREG (1), eREG (2), and eREG (3) based on the DMRS port 7. In FIG. 12, eREG (4) corresponding to the DMRS port 9, eREG (5) corresponding to the DMRS port 7, eREG (6) corresponding to the DMRS port 10, and eREG (7) corresponding to the DMRS port 8 constitute the second one of the second resource groups of the first type. When the E-PDCCH is transmitted by using the second resource group of the first type, the transmission is based on a pilot port corresponding to the first eREG, eREG (4), in the four eREGs corresponding to the second resource group of the first type, namely, the DMRS port 9. That is, when the E-PDCCH is transmitted by using the second resource group of the first type, a precoding mode used for eREG (4), eREG (5), eREG (6), and eREG (7) is the same as a precoding mode used for the DMRS port 9, and channel estimation is performed for the four eREG (4), eREG (5), eREG (6), and eREG (7) based on the DMRS port 9.

On a basis that each second resource group of the first type corresponds to four first resource groups, each physical resource block pair includes two second resource groups of the first type. In this case, each physical resource block pair includes eight first resource groups in total. Four different pilot ports included in a port set corresponding to four first resource groups corresponding to the two second resource groups of the first type included in a physical resource block pair in the foregoing mapping relationship between the first resource groups and the pilot ports are uniformly a first pilot port, a second pilot port, a third pilot port, and a fourth pilot port, and the four first resource groups in the two second resource groups of the first type included in the physical resource block pair are arranged in different sequences according to the pilot ports. Manners of arranging pilot ports in the two second resource groups of the first type included in the physical resource block pair may be any different. For example, an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the second pilot port, the first pilot port, the fourth pilot port, and the third pilot port; or an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the fourth pilot port, the third pilot port, the second pilot port, and the first pilot port; or an arrangement of pilot ports in one second resource group of the first type included in the physical resource block pair is the first pilot port, the third pilot port, the second pilot port, and the fourth pilot port, but an arrangement of pilot ports in the other second resource group of the first type included in the physical resource block pair is the third pilot port, the first pilot port, the fourth pilot port, and the second pilot port.

With reference to FIG. 12, a physical resource block pair indexed 1 includes two second resource groups of the first type, which are respectively a second resource group of the first type that includes eREG (0), eREG (1), eREG (2), and eREG (3), and a second resource group of the first type that includes eREG (4), eREG (5), eREG (6), and eREG (7). The second resource group of the first type that includes eREG (0), eREG (1), eREG (2), and eREG (3), and the second resource group of the first type that includes eREG (4), eREG (5), eREG (6), and eREG (7) correspond to same pilot ports, which are respectively the DMRS ports 7, 8, 9, and 10, and after an arrangement according to pilot ports, sequences of the DMRS ports 7, 8, 9, and 10 in the two second resource groups of the first type are different. For example, in the second resource group of the first type that includes eREG (0), eREG (1), eREG (2), and eREG (3), the sequence of the DMRS ports 7, 8, 9, and 10 is the DMRS port 7, the DMRS port 9, the DMRS port 8, and the DMRS port 10; and in the second resource group of the first type that includes eREG (4), eREG (5), eREG (6), and eREG (7), the sequence of the DMRS ports 7, 8, 9, and 10 is the DMRS port 9, the DMRS port 7, the DMRS port 10, and the DMRS port 8. In addition, in the second resource group of the first type that includes eREG (0), eREG (1), eREG (2), and eREG (3), the sequence of DMRS ports 7, 8, 9, and 10 may also be the DMRS port 7, the DMRS port 8, the DMRS port 9, and the DMRS port 10; and in the second resource group of the first type that includes eREG (4), eREG (5), eREG (6), and eREG (7), the sequence of DMRS ports 7, 8, 9, and 10 may be the DMRS port 10, the DMRS port 9, the DMRS port 8, and the DMRS port 7, and so on.

In an optional implementation manner of this embodiment, on a basis of the foregoing description, that is, when a quantity of at least one second resource group of the second type used for transmitting the E-PDCCH is greater than a preset quantity threshold, under a condition that a quantity of pilot ports used for transmission in each physical resource block pair is two, the base station determines that each second resource group of the first type corresponds to four first resource groups, and that a port set corresponding to the four first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port. With reference to FIG. 11, it is assumed that the first pilot port is the DMRS port 7, and that the second pilot port is the DMRS port 8, and that the third pilot port is the DMRS port 9, and that the fourth pilot port is the DMRS port 10. Therefore, each second resource group of the first type corresponds to four eREGs, and pilot ports corresponding to the four eREGs are the DMRS ports 7 and 8 or the DMRS ports 9 and 10. For each second resource group of the first type, in actual transmission of the E-PDCCH, a pilot port in a corresponding port set is preferentially selected for transmission. For example, in FIG. 11, eREG (0) corresponding to the DMRS port 7, eREG (1) corresponding to the DMRS port 8, eREG (2) corresponding to the DMRS port 8, and eREG (3) corresponding to the DMRS port 7 constitute the first one of the second resource groups of the first type. When the E-PDCCH is transmitted by using the second resource group of the first type, the transmission is based on a pilot port corresponding to the first eREG, eREG (0), in the four eREGs corresponding to the second resource group of the first type, namely, the DMRS port 7. When the E-PDCCH is transmitted by using the second resource group of the first type, a precoding mode used for eREG (0), eREG (1), eREG (2), and eREG (3) is the same as a precoding mode used for the DMRS port 7, and channel estimation is performed for the four eREG (0), eREG (1), eREG (2), and eREG (3) based on the DMRS port 7. In FIG. 11, eREG (4) corresponding to the DMRS port 9, eREG (5) corresponding to the DMRS port 10, eREG (6) corresponding to the DMRS port 10, and eREG (7) corresponding to the DMRS port 9 constitute the second one of the second resource groups of the first type. When the E-PDCCH is transmitted by using the second resource group of the first type, the transmission is based on a pilot port corresponding to the first eREG, eREG (4), in the four eREGs corresponding to the second resource group of the first type, namely, the DMRS port 9. That is, when the E-PDCCH is transmitted by using the second resource group of the first type, a precoding mode used for eREG (4), eREG (5), eREG (6), and eREG (7) is the same as a precoding mode used for the DMRS port 9, and channel estimation is performed for the four eREG (4), eREG (5), eREG (6), and eREG (7) based on the DMRS port 9.

On a basis that each second resource group of the first type corresponds to four first resource groups, each physical resource block pair includes two second resource groups of the first type. In this case, each physical resource block pair includes eight first resource groups in total. Two different pilot ports included in a port set corresponding to four first resource groups corresponding to one second resource group of the first type included in a physical resource block pair in the foregoing mapping relationship between the first resource groups and the pilot ports are a first pilot port and a second pilot port; and two different pilot ports included in a port set corresponding to four first resource groups corresponding to the other second resource group of the first type included in the physical resource block pair in the foregoing mapping relationship between the first resource groups and the pilot ports are a third pilot port and a fourth pilot port. With reference to FIG. 11, a physical resource block pair indexed 1 includes two second resource groups of the first type, which are respectively a second resource group of the first type that includes eREG (0), eREG (1), eREG (2), and eREG (3), and a second resource group of the first type that includes eREG (4), eREG (5), eREG (6), and eREG (7). The second resource group of the first type that includes eREG (0), eREG (1), eREG (2), and eREG (3), and the second resource group of the first type that includes eREG (4), eREG (5), eREG (6), and eREG (7) correspond to different pilot ports. For example, the pilot ports corresponding to the second resource group of the first type that includes eREG (0), eREG (1), eREG (2), and eREG (3) are the DMRS ports 7 and 8, and the pilot ports corresponding to the second resource group of the first type that includes eREG (4), eREG (5), eREG (6), and eREG (7) are the DMRS ports 9 and 10.

On a basis of each of the foregoing embodiments or implementation manners, at least two first resource groups corresponding to each second resource group of the second type used for transmitting the E-PDCCH, which are determined by the base station, are first resource groups located in different physical resource block pairs, corresponding to a same pilot port, and having a same position index. For example, a second resource group of the second type enclosed in a solid line box as shown in FIG. 10 is a resource group that includes two eREGs both corresponding to the DMRS port 7 and both having a position index of 0 in two physical resource block pairs indexed 3 and 4. For another example, a second resource group of the second type enclosed in a solid line box as shown in FIG. 11 and FIG. 12 is a resource group that includes four eREGs all corresponding to the DMRS port 7 and all having a position index of 0 in four physical resource block pairs indexed 1, 2, 3, and 4.

On a basis of each of the foregoing embodiments or implementation manners, at least two first resource groups corresponding to each second resource group of the second type used for transmitting the E-PDCCH, which are determined by the base station, are first resource groups located in different physical resource block pairs, corresponding to a same pilot port, and having different position indexes. For example, a second resource group of the second type enclosed in two dotted line boxes connected by a solid line as shown in FIG. 10 is a resource group that includes two eREGs both corresponding to the DMRS port 9 and having position indexes of 1 and 4 respectively in two physical resource block pairs indexed 3 and 4. For another example, a second resource group of the second type enclosed in two dotted line boxes connected by a solid line as shown in FIG. 11 is a resource group that includes four eREGs respectively corresponding to the DMRS ports 8 and 7 and having position indexes of 2 and 3 respectively in four physical resource block pairs indexed 1, 2, 3, and 4. For another example, with reference to FIG. 11, a second resource group of the second type may also include an eREG corresponding to the DMRS port 7 and having a position index of 0 in a physical resource block pair indexed 1, an eREG corresponding to the DMRS port 8 and having a position index of 1 in a physical resource block pair indexed 2, an eREG corresponding to the DMRS port 8 and having a position index of 2 in a physical resource block pair indexed 3, and an eREG corresponding to the DMRS port 7 and having a position index of 3 in a physical resource block pair indexed 4. For another example, with reference to FIG. 11, a second resource group of the second type may also consist of an eREG corresponding to the DMRS port 7 and having a position index of 0 in a physical resource block pair indexed 1, an eREG corresponding to DMRS port 8 and having a position index of 1 in a physical resource block pair indexed 2, an eREG corresponding to DMRS port 9 and having a position index of 4 in a physical resource block pair indexed 3, and an eREG corresponding to the DMRS port 10 and having a position index of 5 in a physical resource block pair indexed 4.

In an optional implementation manner of this embodiment, on a basis of implementation of second resource groups of the first type in each of the foregoing implementation manners, at least two first resource groups corresponding to each second resource group of the second type used for transmitting the E-PDCCH, which are determined by the base station, are first resource groups that are located in different physical resource block pairs and have position indexes same as position indexes of at least two first resource groups corresponding to the second resource groups of the first type. For example, a second resource group of the second type enclosed in two dotted line boxes connected by a dotted line as shown in FIG. 10 includes a first resource group corresponding to the DMRS port 10 and having a position index of 6 in a physical resource block pair indexed 2 and a first resource group corresponding to the DMRS port 8 and having a position index of 7 in a physical resource block pair indexed 4. The second resource group of the second type corresponds to a second resource group of the first type that includes two first resource groups having position indexes of 6 and 7 in a physical resource block pair indexed 1 in FIG. 10, and position indexes of the first resource groups corresponding to the two second resource groups are the same. For another example, with reference to FIG. 12, if a second resource group of the first type includes four first resource groups having position indexes of 0, 1, 2, and 3 in a physical resource block pair indexed 1, the base station may accordingly determine that a second resource group of the second type includes a first resource group having a position index of 0 in a physical resource block pair indexed 1, a first resource group having a position index of 1 in a physical resource block pair indexed 2, a first resource group having a position index of 2 in a physical resource block pair indexed 3, and a first resource group having a position index of 3 in a physical resource block pair indexed 4. In addition, the base station may also determine that a second resource group of the second type includes a first resource group having a position index of 0 in a physical resource block pair indexed 4, a first resource group having a position index of 1 in a physical resource block pair indexed 3, a first resource group having a position index of 2 in a physical resource block pair indexed 2, and a first resource group having a position index of 3 in a physical resource block pair indexed 0, and so on, where there are multiple manners of composition.

The following describes a beneficial effect produced by each of the foregoing implementation manners. To further obtain space diversity in a same physical resource block pair, a general practice is to allocate multiple pilot ports for implementation. However, improper allocation of pilot ports causes a waste of pilot port resources, and is disadvantageous for channel estimation. For example, another mapping relationship between the first resource groups and the DMRS ports is shown in FIG. 13.

As shown in FIG. 13, if the DMRS port 7 and DMRS port 9 are allocated to second resource groups of the second type used for transmitting the E-PDCCH and used as pilot ports for transmission in each physical resource block pair, and two second resource groups of the second type used for transmitting the E-PDCCH are shown in solid line boxes shown in FIG. 13, then in a physical resource block pair indexed 1, only first resource groups shown in dotted line boxes in FIG. 13 can be used to constitute a second resource group of the first type, where eREG (1) and eREG (5) cannot be used, and a waste is caused. In each of the foregoing embodiments or implementation manners of the present invention, the foregoing problem may be resolved by setting the mapping relationship between the first resource groups and the pilot ports, and then determining the second resource groups of the first type, the second resource groups of the second type and the corresponding pilot ports according to the mapping relationship between the first resource groups and the pilot ports and the specific relationship, and so on. Thereby, pilot port resources can be fully used, and pilot port pairs can be configured flexibly, and space diversity brought by the pilot ports can be fully used.

Figure 1B:
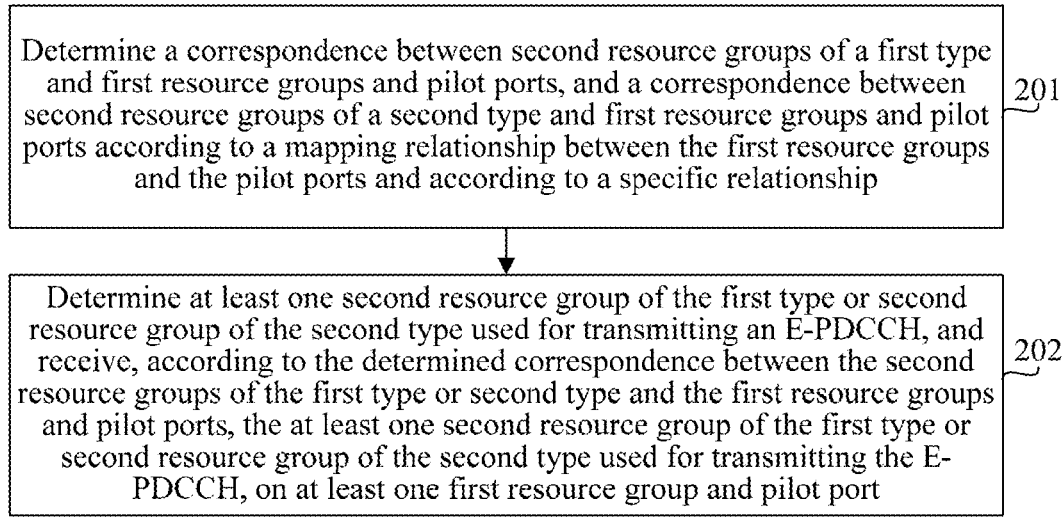
FIG. 1B is a flowchart of an E-PDCCH reception method according to an embodiment of the present invention.

FIG. 1B is a flowchart of an E-PDCCH reception method according to an embodiment of the present invention. This embodiment is executed by a UE, but is not limited thereto. As shown in FIG. 1B, the method in this embodiment includes:

Step 201: Determine a correspondence between second resource groups of a first type and first resource groups and pilot ports, and a correspondence between second resource groups of a second type and first resource groups and pilot ports according to a mapping relationship between the first resource groups and the pilot ports and according to a specific relationship.

The mapping relationship between the first resource groups and the pilot ports includes a mapping relationship between at least one first resource group in a physical resource element set and at least one pilot port. The first resource groups are eREGs or REGs, the second resource groups of the first type are eCCEs or control channel candidates, the second resource groups of the second type are eCCEs or control channel candidates, and the physical resource element set is at least one physical resource block pair. A second resource group of the first type corresponds to at least two first resource groups, and a second resource group of the second type corresponds to at least two first resource groups. A correspondence between second resource groups of different types and the first resource groups and pilot port satisfies the foregoing specific relationship.

Step 202: Determine at least one second resource group of the first type or second resource group of the second type used for transmitting an E-PDCCH, and receive, according to the determined correspondence between the second resource groups of the first type or second type and the first resource groups and pilot ports, the at least one second resource group of the first type or second resource group of the second type used for transmitting the E-PDCCH, on at least one first resource group and pilot port.

For step 201 in this embodiment, refer to the description of step 101. For step 202, refer to the description of step 102.

A difference from step 102 lies in that the UE in this embodiment receives the at least one second resource group of the first type or second resource group of the second type used for transmitting the E-PDCCH, on at least one first resource group and pilot port, unlike step 102 in which the at least one second resource group of the first type or second resource group of the second type used for transmitting the E-PDCCH is mapped to at least one first resource group and pilot port for transmission. The process in which the UE receives the at least one second resource group of the first type or second resource group of the second type used for transmitting the E-PDCCH, on the at least one first resource group and pilot port, is a blind detection process. The blind detection process in this embodiment is similar to a blind detection process in the prior art, and is not further described herein.

In this embodiment, the second resource groups include two types: second resource groups of the first type and second resource groups of the second type. Optionally, the second resource groups of the first type are resource groups for transmitting an E-PDCCH in localized mode, and the second resource groups of the second type are resource groups for transmitting the E-PDCCH in distributed mode. Herein the transmission in localized mode means that resources for transmitting the E-PDCCH are allocated and centralized in one or several consecutive physical resource block pairs, and the transmission in distributed mode means that resources for transmitting the E-PDCCH are allocated and decentralized in multiple non-consecutive physical resource block pairs.

For an optional mapping relationship between the first resource groups and the pilot ports that is described by using examples, refer to Table 1 and Table 3, but the mapping relationship is not limited thereto.

In an optional implementation manner of this embodiment, that the UE determines a correspondence between second resource groups of a first type and first resource groups and pilot ports according to a mapping relationship between the first resource groups and the pilot ports and according to a specific relationship includes that: the UE determines, according to the mapping relationship between the first resource groups and the pilot ports and according to the specific relationship, that a port set corresponding to at least two first resource groups corresponding to the second resource groups of the first type in the foregoing mapping relationship between the first resource groups and the pilot ports includes at least two different pilot ports, and determines that a pilot port used for transmission by each second resource group of the first type is a pilot port corresponding to the first or last one of the at least two first resource groups corresponding to the second resource groups of the first type.

In an optional implementation manner of this embodiment, to improve utilization of first resource groups, the foregoing specific relationship is specifically determining, according to the pilot ports used for transmitting the E-PDCCH by the second resource groups of the second type, the pilot ports used for transmitting the E-PDCCH by the first type, and further determining, according to the mapping relationship between the first resource groups and the pilot ports, the correspondence between the first resource groups of the first type and the first resource groups and pilot ports, and the correspondence between the second resources of the second type and the first resource groups and pilot ports. Based on this, the at least two different pilot ports that are included in the port set corresponding to the at least two first resource groups corresponding to the second resource groups of the first type in the foregoing mapping relationship between the first resource groups and the pilot ports and that are determined by the UE, are at least two pilot ports used for transmission in each physical resource block pair when the E-PDCCH is transmitted by using at least one second resource group of the second type. The pilot ports used for transmission in each physical resource block pair when the E-PDCCH is transmitted by using the second resource groups of the second type may be predefined.

In an optional implementation manner of this embodiment, when a quantity of at least one second resource group of the second type used for transmitting the E-PDCCH is greater than a preset quantity threshold, two pilot ports are used for transmission in each physical resource block pair, which may be a first pilot port and a second pilot port, or may be a third pilot port and a fourth pilot port. That is, when the E-PDCCH is transmitted by using the second resource groups of the second type, the quantity of pilot ports used for transmission in each physical resource block pair is not necessarily two. When a condition is satisfied, the quantity may be two, and may also be one, three, four, and so on. The first pilot port, second pilot port, third pilot port, and fourth pilot port are different DMRS ports. Which DMRS port is specifically used is not limited. In addition, the first pilot port, second pilot port, third pilot port, and fourth pilot port are all pilot ports to which first resource groups in a same physical resource block pair are mapped.

In an optional implementation manner of this embodiment, on a basis of the foregoing description, that is, when a quantity of at least one second resource group of the second type used for transmitting the E-PDCCH is greater than a preset quantity threshold, under a condition that a quantity of pilot ports used for transmission in each physical resource block pair is two, the UE determines that each second resource group of the first type corresponds to two first resource groups, and that a port set corresponding to the two first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port.

Further, on a basis that each second resource group of the first type corresponds to two first resource groups, each physical resource block pair may include four second resource groups of the first type. In this case, each physical resource block pair includes eight first resource groups in total, as shown in Table 1 to FIG. 12. Two different pilot ports included in a port set corresponding to two first resource groups corresponding to two second resource groups of the first type included in a physical resource block pair in the foregoing mapping relationship between the first resource groups and the pilot ports are uniformly a first pilot port and a second pilot port; and two different pilot ports included in a port set corresponding to two first resource groups corresponding to the other two second resource groups of the first type included in the physical resource block pair in the foregoing mapping relationship between the first resource groups and the pilot ports are uniformly a third pilot port and a fourth pilot port. In addition, for two second resource groups of the first type corresponding to two first resource groups corresponding to the pilot set including the first pilot port and second pilot port, the two first resource groups in the two second resource groups of the first type are arranged in different sequences according to the pilot ports; likewise, for two second resource groups of the first type corresponding to two first resource groups corresponding to the pilot set including the third pilot port and fourth pilot port, the two first resource groups in the two second resource groups of the first type are arranged in different sequences according to the pilot ports.

In an optional implementation manner of this embodiment, on a basis of the foregoing description, that is, when a quantity of at least one second resource group of the second type used for transmitting the E-PDCCH is greater than a preset quantity threshold, under a condition that a quantity of pilot ports used for transmission in each physical resource block pair is two, the UE determines that each second resource group of the first type corresponds to four first resource groups, and that a port set corresponding to the four first resource groups corresponding to the second resource group of the first type in the foregoing mapping relationship between the first resource groups and the pilot port includes four different pilot ports, where the four different pilot ports are respectively a first pilot port, a second pilot port, a third pilot port, and a fourth pilot port.

On a basis that each second resource group of the first type corresponds to four first resource groups, each physical resource block pair includes two second resource groups of the first type. In this case, each physical resource block pair includes eight first resource groups in total. Four different pilot ports included in a port set corresponding to four first resource groups corresponding to the two second resource groups of the first type included in a physical resource block pair in the foregoing mapping relationship between the first resource groups and the pilot ports are uniformly a first pilot port, a second pilot port, a third pilot port, and a fourth pilot port, and the four first resource groups in the two second resource groups of the first type included in the physical resource block pair are arranged in different sequences according to the pilot ports. Manners of arranging pilot ports in the two second resource groups of the first type included in the physical resource block pair may be any different. For example, an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the second pilot port, the first pilot port, the fourth pilot port, and the third pilot port; or an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the fourth pilot port, the third pilot port, the second pilot port, and the first pilot port; or an arrangement of pilot ports in one second resource group of the first type included in the physical resource block pair is the first pilot port, the third pilot port, the second pilot port, and the fourth pilot port, but an arrangement of pilot ports in the other second resource group of the first type included in the physical resource block pair is the third pilot port, the first pilot port, the fourth pilot port, and the second pilot port.

In an optional implementation manner of this embodiment, on a basis of the foregoing description, that is, when a quantity of at least one second resource group of the second type used for transmitting the E-PDCCH is greater than a preset quantity threshold, under a condition that a quantity of pilot ports used for transmission in each physical resource block pair is two, the UE determines that each second resource group of the first type corresponds to four first resource groups, and that a port set corresponding to the four first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port.

On a basis that each second resource group of the first type corresponds to four first resource groups, each physical resource block pair includes two second resource groups of the first type. In this case, each physical resource block pair includes eight first resource groups in total. Two different pilot ports included in a port set corresponding to four first resource groups corresponding to one second resource group of the first type included in a physical resource block pair in the foregoing mapping relationship between the first resource groups and the pilot ports are a first pilot port and a second pilot port; and two different pilot ports included in a port set corresponding to four first resource groups corresponding to the other second resource group of the first type included in the physical resource block pair in the foregoing mapping relationship between the first resource groups and the pilot ports are a third pilot port and a fourth pilot port.

On a basis of each of the foregoing embodiments or implementation manners, at least two first resource groups corresponding to each second resource group of the second type used for transmitting the E-PDCCH, which are determined by the UE, are first resource groups located in different physical resource block pairs, corresponding to a same pilot port, and having a same position index.

On a basis of each of the foregoing embodiments or implementation manners, at least two first resource groups corresponding to each second resource group of the second type used for transmitting the E-PDCCH, which are determined by the UE, are first resource groups located in different physical resource block pairs, corresponding to a same pilot port, and having different position indexes.

In an optional implementation manner of this embodiment, on a basis of implementation of second resource groups of the first type in each of the foregoing implementation manners, at least two first resource groups corresponding to each second resource group of the second type used for transmitting the E-PDCCH, which are determined by the UE, are first resource groups that are located in different physical resource block pairs and have position indexes same as position indexes of at least two first resource groups corresponding to the second resource groups of the first type.

For the detailed description of each of the foregoing optional implementation manners, refer to the corresponding description in the embodiment shown in FIG. 1A, and no further description is provided herein.

In another optional implementation manner of this embodiment, the LIE needs to obtain the mapping relationship between the first resource groups and the pilot ports in advance before using the mapping relationship between the first resource groups and the pilot ports. A manner in which the UE obtains the mapping relationship between the first resource groups and the pilot ports includes that: the UE and a base station predefine the mapping relationship between the first resource groups and the pilot ports; or the UE agrees with a base station in advance that the mapping relationship between the first resource groups and the pilot ports is generated according to a local cell ID. In the two cases, the base station does not need to send the mapping relationship between the first resource groups and the pilot ports to the UE, and instead, the UE may directly obtain the mapping relationship between the first resource groups and the pilot ports. Another manner is that: the UE receives higher layer signaling sent by the base station, where the higher layer signaling includes the mapping relationship between the first resource groups and the pilot ports, and the UE obtains the mapping relationship between the first resource groups and the pilot ports from the higher layer signaling. This manner is convenient for the base station to flexibly configure the mapping relationship between the first resource groups and the pilot ports.

The E-PDCCH reception method provided by this embodiment corresponds to the E-PDCCH transmission method provided by the foregoing embodiment, and the UE may successfully receive an E-PDCCH, thereby resolving an E-PDCCH transmission problem. In addition, the method in this embodiment may improve utilization of pilot ports, and may fully use space diversity effect brought by the pilot ports.

Figure 2A:
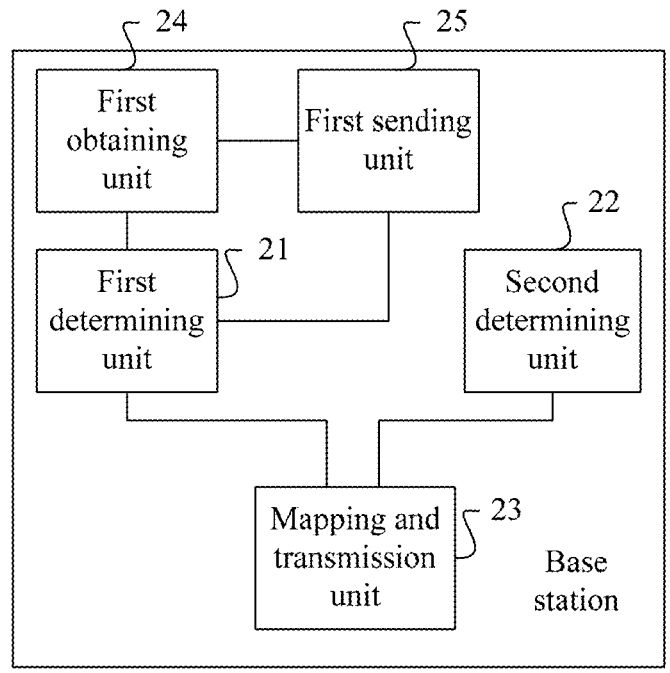
FIG. 2A is a schematic structural diagram of a base station according to an embodiment of the present invention.

FIG. 2A is a schematic structural diagram of a base station according to an embodiment of the present invention. As shown in FIG. 2A, the base station in this embodiment includes a first determining unit 21, a second determining unit 22, and a mapping and transmission unit 23.

The first determining unit 21 is configured to determine a correspondence between second resource groups of a first type and first resource groups and pilot ports, and a correspondence between second resource groups of a second type and first resource groups and pilot ports according to a mapping relationship between the first resource groups and the pilot ports and according to a specific relationship.

The mapping relationship between the first resource groups and the pilot ports includes a mapping relationship between at least one first resource group in a physical resource element set and at least one pilot port. The first resource groups are eREGs or REGs, the second resource groups of the first type are eCCEs or control channel candidates, and the second resource groups of the second type are eCCEs or control channel candidates. The physical resource element set is at least one physical resource block pair. A second resource group of the first type corresponds to at least two first resource groups, and a second resource group of the second type corresponds to at least two first resource groups. A correspondence between second resource groups of different types and the first resource groups and pilot port satisfies the foregoing specific relationship.

The second determining unit 22 is configured to determine at least one second resource group of the first type or second resource group of the second type used for transmitting an E-PDCCH.

The mapping and transmission unit 23 is connected to the first determining unit 21 and the second determining unit 22, and configured to map, according to the correspondence between the second resource groups of the first type or second type and the first resource groups and pilot ports that is determined by the first determining unit 21, the at least one second resource group of the first type or second resource group of the second type that is used for transmitting the E-PDCCH and is determined by the second determining unit 22, to at least one first resource group and pilot port for transmission.

In an optional implementation manner of this embodiment, the second resource groups of the first type are resource groups for transmitting the E-PDCCH in localized mode, and the second resource groups of the second type are resource groups for transmitting the E-PDCCH in distributed mode.

In an optional implementation manner of this embodiment, that the first determining unit 21 determines a correspondence between second resource groups of a first type and first resource groups and pilot ports according to a mapping relationship between the first resource groups and the pilot ports and according to a specific relationship includes that: the first determining unit 21 is specifically configured to determine, according to the mapping relationship between the first resource groups and the pilot ports and according to the specific relationship, that a port set corresponding to at least two first resource groups corresponding to the second resource groups of the first type in the foregoing mapping relationship between the first resource groups and the pilot ports includes at least two different pilot ports, and determine that a pilot port used for transmission by each second resource group of the first type is a pilot port corresponding to the first or last one of the at least two first resource groups corresponding to the second resource groups of the first type.

In an optional implementation manner of this embodiment, that the first determining unit 21 determines that a port set corresponding to at least two first resource groups corresponding to the second resource groups of the first type in the foregoing mapping relationship between the first resource groups and the pilot ports includes at least two different pilot ports, includes that: the first determining unit 21 is more specifically configured to determine that the at least two different pilot ports that are included in the port set corresponding to the at least two first resource groups corresponding to the second resource groups of the first type in the foregoing mapping relationship between the first resource groups and the pilot ports are at least two pilot ports used for transmission in each physical resource block pair when the E-PDCCH is transmitted by using at least one second resource group of the second type.

In an optional implementation manner of this embodiment, when a quantity of at least one second resource group of the second type used for transmitting the E-PDCCH is greater than a preset quantity threshold, two pilot ports are used for transmission in each physical resource block pair, which are respectively a first pilot port and a second pilot port, or a third pilot port and a fourth pilot port.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the first determining unit 21 is specifically configured to determine that each second resource group of the first type corresponds to two first resource groups, and determine that a port set corresponding to the two first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port.

On a basis of the foregoing description, each physical resource block pair includes four second resource groups of the first type. In this case, each physical resource block pair includes eight first resource groups in total. Two different pilot ports included in a port set corresponding to two first resource groups corresponding to two second resource groups of the first type included in a physical resource block pair in the foregoing mapping relationship between the first resource groups and the pilot ports are uniformly a first pilot port and a second pilot port; and two different pilot ports included in a port set corresponding to two first resource groups corresponding to the other two second resource groups of the first type included in the physical resource block pair in the foregoing mapping relationship between the first resource groups and the pilot ports are uniformly a third pilot port and a fourth pilot port.

In the four second resource groups of the first type included in the physical resource block pair, for two second resource groups of the first type corresponding to two first resource groups corresponding to the pilot set including the first pilot port and second pilot port, the two first resource groups in the two second resource groups of the first type are arranged in different sequences according to the pilot ports; and for two second resource groups of the first type corresponding to two first resource groups corresponding to the pilot set including the third pilot port and fourth pilot port, the two first resource groups in the two second resource groups of the first type are arranged in different sequences according to the pilot ports.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the first determining unit 21 is specifically configured to determine that each second resource group of the first type corresponds to four first resource groups, and that a port set corresponding to the four first resource groups corresponding to the second resource group of the first type in the foregoing mapping relationship between the first resource groups and the pilot ports includes four different pilot ports, where the four different pilot ports are respectively a first pilot port, a second pilot port, a third pilot port, and a fourth pilot port.

On a basis of the foregoing description, each physical resource block pair includes two second resource groups of the first type. In this case, each physical resource block pair includes eight first resource groups in total. Four different pilot ports included in a port set corresponding to four first resource groups corresponding to the two second resource groups of the first type included in a physical resource block pair in the foregoing mapping relationship between the first resource groups and the pilot ports are uniformly a first pilot port, a second pilot port, a third pilot port, and a fourth pilot port, and the four first resource groups in the two second resource groups of the first type included in the physical resource block pair are arranged in different sequences according to the pilot ports.

Manners of arranging pilot ports in the two second resource groups of the first type included in the physical resource block pair include but are not limited to the following: an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the second pilot port, the first pilot port, the fourth pilot port, and the third pilot port; or an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the fourth pilot port, the third pilot port, the second pilot port, and the first pilot port; or an arrangement of pilot ports in one second resource group of the first type included in the physical resource block pair is the first pilot port, the third pilot port, the second pilot port, and the fourth pilot port, but an arrangement of pilot ports in the other second resource group of the first type included in the physical resource block pair is the third pilot port, the first pilot port, the fourth pilot port, and the second pilot port.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the first determining unit 21 is specifically configured to determine that each second resource group of the first type corresponds to four first resource groups, and that a port set corresponding to the four first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port.

On a basis of the foregoing description, each physical resource block pair includes two second resource groups of the first type. In this case, each physical resource block pair includes eight first resource groups in total. Two different pilot ports included in a port set corresponding to four first resource groups corresponding to one second resource group of the first type included in a physical resource block pair in the foregoing mapping relationship between the first resource groups and the pilot ports are a first pilot port and a second pilot port; and two different pilot ports included in a port set corresponding to four first resource groups corresponding to the other second resource group of the first type included in the physical resource block pair in the foregoing mapping relationship between the first resource groups and the pilot ports are a third pilot port and a fourth pilot port.

In an optional implementation manner of this embodiment, the second determining unit 22 is specifically configured to determine that at least two first resource groups corresponding to each second resource group of the second type used for transmitting the E-PDCCH are first resource groups located in different physical resource block pairs, corresponding to a same pilot port, and having a same position index.

In an optional implementation manner of this embodiment, the second determining unit 22 is specifically configured to determine that at least two first resource groups corresponding to each second resource group of the second type used for transmitting the E-PDCCH are first resource groups located in different physical resource block pairs, corresponding to a same pilot port, and having different position indexes.

In an optional implementation manner of this embodiment, on a basis of implementation of second resource groups of the first type, the second determining unit 22 is specifically configured to determine that at least two first resource groups corresponding to each second resource group of the second type used for transmitting the E-PDCCH are first resource groups that are located in different physical resource block pairs and have position indexes same as position indexes of at least two first resource groups corresponding to the second resource groups of the first type.

In an optional implementation manner of this embodiment, the first pilot port is a DMRS port 7, the second pilot port is a DMRS port 9, the third pilot port is a DMRS port 8, and the fourth pilot port is a DMRS port 10; or the first pilot port is the DMRS port 8, the second pilot port is the DMRS port 10, the third pilot port is the DMRS port 7, and the fourth pilot port is the DMRS port 9; or the first pilot port is the DMRS port 7, the second pilot port is the DMRS port 8, the third pilot port is the DMRS port 9, and the fourth pilot port is the DMRS port 10; or the first pilot port is the DMRS port 9, the second pilot port is the DMRS port 10, the third pilot port is the DMRS port 7, and the fourth pilot port is the DMRS port 8.

In an optional implementation manner of this embodiment, the base station in this embodiment further includes a first obtaining unit 24. The first obtaining unit 24 is configured to predefine the mapping relationship between the first resource groups and the pilot ports before the first determining unit 21 uses the mapping relationship between the first resource groups and the pilot ports; or the first obtaining unit 24 is configured to generate the mapping relationship between the first resource groups and the pilot ports according to a local cell identity before the first determining unit 21 uses the mapping relationship between the first resource groups and the pilot ports.

In an optional implementation manner of this embodiment, the base station in this embodiment further includes a first sending unit 25. The first sending unit 25 is configured to send higher layer signaling, where the higher layer signaling includes the mapping relationship between the first resource groups and the pilot ports. The first sending unit 25 is mainly configured to provide the mapping relationship between the first resource groups and the pilot ports for a UE. Optionally, the first sending unit 25 is connected to the first determining unit 21 and the first obtaining unit 24.

The functional units of the E-PDCCH transmission base station provided by this embodiment may be configured to execute the procedure of the foregoing E-PDCCH transmission method. Specific operating principles thereof are not further described. For details, refer to the description of the method embodiment.

The E-PDCCH transmission base station in this embodiment determines the correspondence between the second resource groups of the first type and the first resource groups and pilot ports, and the correspondence between the second resource groups of the second type and the first resource groups and pilot ports respectively according to the mapping relationship between the first resource groups and the pilot ports and according to the specific relationship, and then determines at least one second resource group of the first type or at least one second resource group of the second type used for transmitting the E-PDCCH, and maps, according to the previously determined correspondence between the second resource groups of the first type or second type and the first resource groups and pilot ports, the second resource group of the first type or second type used for transmitting the E-PDCCH, to at least one first resource group and pilot port, thereby resolving an E-PDCCH transmission problem. Further, the E-PDCCH transmission base station in this embodiment can also improve utilization of pilot ports, and implement space diversity.

Figure 2B:
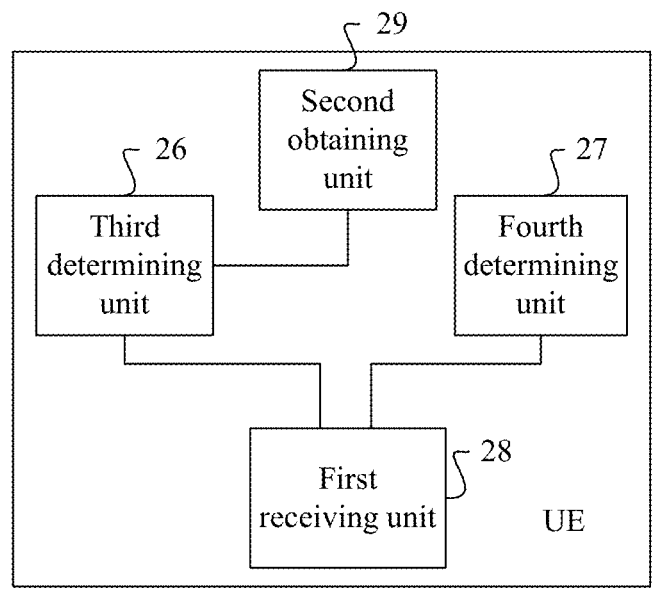
FIG. 2B is a schematic structural diagram of a UE according to an embodiment of the present invention.

FIG. 2B is a schematic structural diagram of a UE according to an embodiment of the present invention. As shown in FIG. 2B, the UE in this embodiment includes a third determining unit 26, a fourth determining unit 27, and a first receiving unit 28.

The third determining unit 26 is configured to determine a correspondence between second resource groups of a first type and first resource groups and pilot ports, and a correspondence between second resource groups of a second type and first resource groups and pilot ports according to a mapping relationship between the first resource groups and the pilot ports and according to a specific relationship.

The mapping relationship between the first resource groups and the pilot ports includes a mapping relationship between at least one first resource group in a physical resource element set and at least one pilot port. The first resource groups are eREGs or REGs, the second resource groups of the first type are eCCEs or control channel candidates, the second resource groups of the second type are eCCEs or control channel candidates, and the physical resource element set is at least one physical resource block pair. A second resource group of the first type corresponds to at least two first resource groups, and a second resource group of the second type corresponds to at least two first resource groups. A correspondence between second resource groups of different types and the first resource groups and pilot port satisfies the foregoing specific relationship.

The fourth determining unit 27 is configured to determine at least one second resource group of the first type or second resource group of the second type used for transmitting an E-PDCCH.

The first receiving unit 28 is connected to the third determining unit 26 and the fourth determining unit 27, and configured to receive, according to the correspondence between the second resource groups of the first type or second type and the first resource groups and pilot ports that is determined by the third determining unit 26, the at least one second resource group of the first type or second resource group of the second type that is used for transmitting the E-PDCCH and is determined by the fourth determining unit 27, on at least one first resource group and pilot port.

In an optional implementation manner of this embodiment, the second resource groups of the first type are resource groups for transmitting the E-PDCCH in localized mode, and the second resource groups of the second type are resource groups for transmitting the E-PDCCH in distributed mode.

In an optional implementation manner of this embodiment, that the third determining unit 26 determines a correspondence between second resource groups of a first type and first resource groups and pilot ports according to a mapping relationship between the first resource groups and the pilot ports and according to a specific relationship includes that: the third determining unit 26 is specifically configured to determine, according to the mapping relationship between the first resource groups and the pilot ports and according to the specific relationship, that a port set corresponding to at least two first resource groups corresponding to the second resource groups of the first type in the foregoing mapping relationship between the first resource groups and the pilot ports includes at least two different pilot ports, and determine that a pilot port used for transmission by each second resource group of the first type is a pilot port corresponding to the first or last one of the at least two first resource groups corresponding to the second resource groups of the first type.

In an optional implementation manner of this embodiment, that the third determining unit 26 determines that a port set corresponding to at least two first resource groups corresponding to the second resource groups of the first type in the foregoing mapping relationship between the first resource groups and the pilot ports includes at least two different pilot ports, includes that: the third determining unit 26 is more specifically configured to determine that the at least two different pilot ports that are included in the port set corresponding to the at least two first resource groups corresponding to the second resource groups of the first type in the foregoing mapping relationship between the first resource groups and the pilot ports are at least two pilot ports used for transmission in each physical resource block pair when the E-PDCCH is transmitted by using at least one second resource group of the second type.

In an optional implementation manner of this embodiment, when a quantity of at least one second resource group of the second type used for transmitting the E-PDCCH is greater than a preset quantity threshold, two pilot ports are used for transmission in each physical resource block pair, which are respectively a first pilot port and a second pilot port, or a third pilot port and a fourth pilot port.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the third determining unit 26 is specifically configured to determine that each second resource group of the first type corresponds to two first resource groups, and determine that a port set corresponding to the two first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port.

On a basis of the foregoing description, each physical resource block pair includes four second resource groups of the first type. In this case, each physical resource block pair includes eight first resource groups in total. Two different pilot ports included in a port set corresponding to two first resource groups corresponding to two second resource groups of the first type included in a physical resource block pair in the foregoing mapping relationship between the first resource groups and the pilot ports are uniformly a first pilot port and a second pilot port; and two different pilot ports included in a port set corresponding to two first resource groups corresponding to the other two second resource groups of the first type included in the physical resource block pair in the foregoing mapping relationship between the first resource groups and the pilot ports are uniformly a third pilot port and a fourth pilot port.

In the four second resource groups of the first type included in the physical resource block pair, for two second resource groups of the first type corresponding to two first resource groups corresponding to the pilot set including the first pilot port and second pilot port, the two first resource groups in the two second resource groups of the first type are arranged in different sequences according to the pilot ports; and for two second resource groups of the first type corresponding to two first resource groups corresponding to the pilot set including the third pilot port and fourth pilot port, the two first resource groups in the two second resource groups of the first type are arranged in different sequences according to the pilot ports.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the third determining unit 26 is specifically configured to determine that each second resource group of the first type corresponds to four first resource groups, and that a port set corresponding to the four first resource groups corresponding to the second resource group of the first type in the foregoing mapping relationship between the first resource groups and the pilot ports includes four different pilot ports, where the four different pilot ports are respectively a first pilot port, a second pilot port, a third pilot port, and a fourth pilot port.

On a basis of the foregoing description, each physical resource block pair includes two second resource groups of the first type. In this case, each physical resource block pair includes eight first resource groups in total. Four different pilot ports included in a port set corresponding to four first resource groups corresponding to the two second resource groups of the first type included in a physical resource block pair in the foregoing mapping relationship between the first resource groups and the pilot ports are uniformly a first pilot port, a second pilot port, a third pilot port, and a fourth pilot port, and the four first resource groups in the two second resource groups of the first type included in the physical resource block pair are arranged in different sequences according to the pilot ports.

Manners of arranging pilot ports in the two second resource groups of the first type included in the physical resource block pair include but are not limited to the following: an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the second pilot port, the first pilot port, the fourth pilot port, and the third pilot port; or an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the fourth pilot port, the third pilot port, the second pilot port, and the first pilot port; or an arrangement of pilot ports in one second resource group of the first type included in the physical resource block pair is the first pilot port, the third pilot port, the second pilot port, and the fourth pilot port, but an arrangement of pilot ports in the other second resource group of the first type included in the physical resource block pair is the third pilot port, the first pilot port, the fourth pilot port, and the second pilot port.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the third determining unit 26 is specifically configured to determine that each second resource group of the first type corresponds to four first resource groups, and that a port set corresponding to the four first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port.

On a basis of the foregoing description, each physical resource block pair includes two second resource groups of the first type. In this case, each physical resource block pair includes eight first resource groups in total. Two different pilot ports included in a port set corresponding to four first resource groups corresponding to one second resource group of the first type included in a physical resource block pair in the foregoing mapping relationship between the first resource groups and the pilot ports are a first pilot port and a second pilot port; and two different pilot ports included in a port set corresponding to four first resource groups corresponding to the other second resource group of the first type included in the physical resource block pair in the foregoing mapping relationship between the first resource groups and the pilot ports are a third pilot port and a fourth pilot port.

In an optional implementation manner of this embodiment, the fourth determining unit 27 is specifically configured to determine that at least two first resource groups corresponding to each second resource group of the second type used for transmitting the E-PDCCH are first resource groups located in different physical resource block pairs, corresponding to a same pilot port, and having a same position index.

In an optional implementation manner of this embodiment, the fourth determining unit 27 is specifically configured to determine that at least two first resource groups corresponding to each second resource group of the second type used for transmitting the E-PDCCH are first resource groups located in different physical resource block pairs, corresponding to a same pilot port, and having different position indexes.

In an optional implementation manner of this embodiment, on a basis of implementation of second resource groups of the first type, the fourth determining unit 27 is specifically configured to determine that at least two first resource groups corresponding to each second resource group of the second type used for transmitting the E-PDCCH are first resource groups that are located in different physical resource block pairs and have position indexes same as position indexes of at least two first resource groups corresponding to the second resource groups of the first type.

In an optional implementation manner of this embodiment, the first pilot port is a DMRS port 7, the second pilot port is a DMRS port 9, the third pilot port is a DMRS port 8, and the fourth pilot port is a DMRS port 10; or the first pilot port is the DMRS port 8, the second pilot port is the DMRS port 10, the third pilot port is the DMRS port 7, and the fourth pilot port is the DMRS port 9; or the first pilot port is the DMRS port 7, the second pilot port is the DMRS port 8, the third pilot port is the DMRS port 9, and the fourth pilot port is the DMRS port 10; or the first pilot port is the DMRS port 9, the second pilot port is the DMRS port 10, the third pilot port is the DMRS port 7, and the fourth pilot port is the DMRS port 8.

In an optional implementation manner of this embodiment, the UE in this embodiment further includes a second obtaining unit 29. The second obtaining unit 29 is configured to predefine the mapping relationship between the first resource groups and the pilot ports before the third determining unit 26 uses the mapping relationship between the first resource groups and the pilot ports; or the second obtaining unit 29 is configured to generate the mapping relationship between the first resource groups and the pilot ports according to a local cell identity before the third determining unit 26 uses the mapping relationship between the first resource groups and the pilot ports.

In an optional implementation manner of this embodiment, the first receiving unit 28 is further configured to receive higher layer signaling, where the higher layer signaling includes the mapping relationship between the first resource groups and the pilot ports. The first receiving unit 28 is specifically configured to receive higher layer signaling sent by a base station.

The functional units of the UE provided by this embodiment may be configured to execute the corresponding procedure of the E-PDCCH reception method shown in FIG. 1B. The specific operating principles thereof are not further described herein. For details, refer to the description of the method embodiment.

The UE provided by this embodiment cooperates with the E-PDCCH transmission base station provided by the foregoing embodiment to complete E-PDCCH transmission, and in addition, improves utilization of reference signal resources, and fully uses space diversity provided by the pilot ports.

FIG. 3A is a schematic structural diagram of a base station according to another embodiment of the present invention. As shown in FIG. 3A, the base station in this embodiment includes a processor 31 and a transmitter 32.

The processor 31 is configured to determine a correspondence between second resource groups of a first type and first resource groups and pilot ports, and a correspondence between second resource groups of a second type and first resource groups and pilot ports according to a mapping relationship between the first resource groups and the pilot ports and according to a specific relationship, and determine at least one second resource group of the first type or second resource group of the second type used for transmitting an E-PDCCH.

The mapping relationship between the first resource groups and the pilot ports includes a mapping relationship between at least one first resource group in a physical resource element set and at least one pilot port. The first resource groups are eREGs or REGs, the second resource groups of the first type are eCCEs or control channel candidates, and the second resource groups of the second type are eCCEs or control channel candidates. The physical resource element set is at least one physical resource block pair. A second resource group of the first type corresponds to at least two first resource groups, and a second resource group of the second type corresponds to at least two first resource groups. A correspondence between second resource groups of different types and the first resource groups and pilot port satisfies the foregoing specific relationship.

The transmitter 32 is configured to map, according to the correspondence between the second resource groups of the first type or second type and the first resource groups and pilot ports that is determined by the processor 31, the at least one second resource group of the first type or second resource group of the second type used for transmitting the E-PDCCH and is determined by the processor 31, to at least one first resource group and pilot port for transmission.

In an optional implementation manner of this embodiment, the second resource groups of the first type are resource groups for transmitting the E-PDCCH in localized mode, and the second resource groups of the second type are resource groups for transmitting the E-PDCCH in distributed mode.

In an optional implementation manner of this embodiment, that the processor 31 determines a correspondence between second resource groups of a first type and first resource groups and pilot ports according to a mapping relationship between the first resource groups and the pilot ports and according to a specific relationship includes that: the processor 31 is specifically configured to determine, according to the mapping relationship between the first resource groups and the pilot ports and according to the specific relationship, that a port set corresponding to at least two first resource groups corresponding to the second resource groups of the first type in the foregoing mapping relationship between the first resource groups and the pilot ports includes at least two different pilot ports, and determine that a pilot port used for transmission by each second resource group of the first type is a pilot port corresponding to the first or last one of the at least two first resource groups corresponding to the second resource groups of the first type.

In an optional implementation manner of this embodiment, that the processor 31 determines that a port set corresponding to at least two first resource groups corresponding to the second resource groups of the first type in the foregoing mapping relationship between the first resource groups and the pilot ports includes at least two different pilot ports, includes that: the processor 31 is more specifically configured to determine that the at least two different pilot ports that are included in the port set corresponding to the at least two first resource groups corresponding to the second resource groups of the first type in the foregoing mapping relationship between the first resource groups and the pilot ports are at least two pilot ports used for transmission in each physical resource block pair when the E-PDCCH is transmitted by using at least one second resource group of the second type.

In an optional implementation manner of this embodiment, when a quantity of at least one second resource group of the second type used for transmitting the E-PDCCH is greater than a preset quantity threshold, two pilot ports are used for transmission in each physical resource block pair, which are respectively a first pilot port and a second pilot port for, or a third pilot port and a fourth pilot port.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the processor 31 is specifically configured to determine that each second resource group of the first type corresponds to two first resource groups, and determine that a port set corresponding to the two first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port.

On a basis of the foregoing description, each physical resource block pair includes four second resource groups of the first type. In this case, each physical resource block pair includes eight first resource groups in total. Two different pilot ports included in a port set corresponding to two first resource groups corresponding to two second resource groups of the first type included in a physical resource block pair in the foregoing mapping relationship between the first resource groups and the pilot ports are uniformly a first pilot port and a second pilot port; and two different pilot ports included in a port set corresponding to two first resource groups corresponding to the other two second resource groups of the first type included in the physical resource block pair in the foregoing mapping relationship between the first resource groups and the pilot ports are uniformly a third pilot port and a fourth pilot port.

In the four second resource groups of the first type included in the physical resource block pair, for two second resource groups of the first type corresponding to two first resource groups corresponding to the pilot set including the first pilot port and second pilot port, the two first resource groups in the two second resource groups of the first type are arranged in different sequences according to the pilot ports; and for two second resource groups of the first type corresponding to two first resource groups corresponding to the pilot set including the third pilot port and fourth pilot port, the two first resource groups in the two second resource groups of the first type are arranged in different sequences according to the pilot ports.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the processor 31 is specifically configured to determine that each second resource group of the first type corresponds to four first resource groups, and that a port set corresponding to the four first resource groups corresponding to the second resource group of the first type in the foregoing mapping relationship between the first resource groups and the pilot ports includes four different pilot ports, where the four different pilot ports are respectively a first pilot port, a second pilot port, a third pilot port, and a fourth pilot port.

On a basis of the foregoing description, each physical resource block pair includes two second resource groups of the first type. In this case, each physical resource block pair includes eight first resource groups in total. Four different pilot ports included in a port set corresponding to four first resource groups corresponding to the two second resource groups of the first type included in a physical resource block pair in the foregoing mapping relationship between the first resource groups and the pilot ports are uniformly a first pilot port, a second pilot port, a third pilot port, and a fourth pilot port, and the four first resource groups in the two second resource groups of the first type included in the physical resource block pair are arranged in different sequences according to the pilot ports.

Manners of arranging pilot ports in the two second resource groups of the first type included in the physical resource block pair include but are not limited to the following: an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the second pilot port, the first pilot port, the fourth pilot port, and the third pilot port; or an arrangement of pilot ports in one second resource group of the first type included in the physical resource block pair is the first pilot port, the second pilot port, the third pilot port, and the fourth pilot port, but an arrangement of pilot ports in the other second resource group of the first type included in the physical resource block pair is the fourth pilot port, the third pilot port, the second pilot port, and the first pilot port; or an arrangement of pilot ports in one second resource group of the first type included in the physical resource block pair is the first pilot port, the third pilot port, the second pilot port, and the fourth pilot port, but an arrangement of pilot ports in the other second resource group of the first type included in the physical resource block pair is the third pilot port, the first pilot port, the fourth pilot port, and the second pilot port.

In an optional implementation manner of this embodiment, on a basis of the foregoing description, that is, when a quantity of at least one second resource group of the second type used for transmitting the E-PDCCH is greater than a preset quantity threshold, under a condition that two pilot ports are used for transmission in each physical resource block pair, which are respectively a first pilot port and a second pilot port, or a third pilot port and a fourth pilot port, the processor 31 is specifically configured to determine that each second resource group of the first type corresponds to four first resource groups, and that a port set corresponding to the four first resource groups corresponding to the second resource group of the first type in the foregoing mapping relationship between the first resource groups and the pilot ports includes two different pilot ports, where the two different pilot ports are respectively a first pilot port and a second pilot port, or are respectively a third pilot port and a fourth pilot port.

On a basis of the foregoing description, each physical resource block pair includes two second resource groups of the first type. In this case, each physical resource block pair includes eight first resource groups in total. Two different pilot ports included in a port set corresponding to four first resource groups corresponding to one second resource group of the first type included in a physical resource block pair in the foregoing mapping relationship between the first resource groups and the pilot ports are a first pilot port and a second pilot port; and two different pilot ports included in a port set corresponding to four first resource groups corresponding to the other second resource group of the first type included in the physical resource block pair in the foregoing mapping relationship between the first resource groups and the pilot ports are a third pilot port and a fourth pilot port.

In an optional implementation manner of this embodiment, the processor 31 is specifically configured to determine that at least two first resource groups corresponding to each second resource group of the second type used for transmitting the E-PDCCH are first resource groups located in different physical resource block pairs, corresponding to a same pilot port, and having a same position index.

In an optional implementation manner of this embodiment, the processor 31 is specifically configured to determine that at least two first resource groups corresponding to each second resource group of the second type used for transmitting the E-PDCCH are first resource groups located in different physical resource block pairs, corresponding to a same pilot port, and having different position indexes.

In an optional implementation manner of this embodiment, on a basis of implementation of second resource groups of the first type, the processor 31 is specifically configured to determine that at least two first resource groups corresponding to each second resource group of the second type used for transmitting the E-PDCCH are first resource groups that are located in different physical resource block pairs and have position indexes same as position indexes of at least two first resource groups corresponding to the second resource groups of the first type.

In an optional implementation manner of this embodiment, the first pilot port is a DMRS port 7, the second pilot port is a DMRS port 9, the third pilot port is a DMRS port 8, and the fourth pilot port is a DMRS port 10; or the first pilot port is the DMRS port 8, the second pilot port is the DMRS port 10, the third pilot port is the DMRS port 7, and the fourth pilot port is the DMRS port 9; or the first pilot port is the DMRS port 7, the second pilot port is the DMRS port 8, the third pilot port is the DMRS port 9, and the fourth pilot port is the DMRS port 10; or the first pilot port is the DMRS port 9, the second pilot port is the DMRS port 10, the third pilot port is the DMRS port 7, and the fourth pilot port is the DMRS port 8.

In an optional implementation manner of this embodiment, the transmitter 32 is further configured to send higher layer signaling, where the higher layer signaling includes the mapping relationship between the first resource groups and the pilot ports. Specifically, the transmitter 32 is configured to transmit higher layer signaling to a UE to provide the foregoing mapping relationship between the first resource groups and the pilot ports for the UE.

In an optional implementation manner of this embodiment, the processor 31 is further configured to predefine the mapping relationship between the first resource groups and the pilot ports before the processor 31 uses the mapping relationship between the first resource groups and the pilot ports; or the processor 31 is further configured to generate the mapping relationship between the first resource groups and the pilot ports according to a local cell identity before the processor 31 uses the mapping relationship between the first resource groups and the pilot ports.

The base station provided by this embodiment may be configured to execute the procedure of the foregoing E-PDCCH transmission method. Specific operating principles thereof are not further described. For details, refer to the description of the method embodiment.

The base station in this embodiment determines the correspondence between the second resource groups of the first type and the first resource groups and pilot ports, and the correspondence between the second resource groups of the second type and the first resource groups and pilot ports respectively according to the mapping relationship between the first resource groups and the pilot ports and according to the specific relationship, and then determines at least one second resource group of the first type or at least one second resource group of the second type used for transmitting the E-PDCCH, and maps, according to the previously determined correspondence between the second resource groups of the first type or second type and the first resource groups and pilot ports, the second resource group of the first type or second type used for transmitting the E-PDCCH, to at least one first resource group and pilot port for transmission, thereby solving an E-PDCCH transmission problem. Further, the E-PDCCH transmission base station in this embodiment can also improve utilization of pilot ports, and implement space diversity.

FIG. 3B is a schematic structural diagram of a UE according to another embodiment of the present invention. As shown in FIG. 3B, the UE in this embodiment includes a processor 35 and a receiver 36.

The processor 35 is configured to determine a correspondence between second resource groups of a first type and first resource groups and pilot ports, and a correspondence between second resource groups of a second type and first resource groups and pilot ports according to a mapping relationship between the first resource groups and the pilot ports and according to a specific relationship, and determine at least one second resource group of the first type or second resource group of the second type used for transmitting an E-PDCCH.

The mapping relationship between the first resource groups and the pilot ports includes a mapping relationship between at least one first resource group in a physical resource element set and at least one pilot port. The first resource groups are eREGs or REGs, the second resource groups of the first type are eCCEs or control channel candidates, the second resource groups of the second type are eCCEs or control channel candidates, and the physical resource element set is at least one physical resource block pair. A second resource group of the first type corresponds to at least two first resource groups, and a second resource group of the second type corresponds to at least two first resource groups. A correspondence between second resource groups of different types and the first resource groups and pilot port satisfies the foregoing specific relationship.

The receiver 36 is configured to receive, according to the correspondence between the second resource groups of the first type or second type and the first resource groups and pilot ports that is determined by the processor 35, the at least one second resource group of the first type or second resource group of the second type used for transmitting the E-PDCCH and is determined by the processor 35, on at least one first resource group and pilot port.

The UE provided by this embodiment may be configured to execute the procedure of the E-PDCCH reception method provided by the foregoing embodiment. For specific operating principles and other functions thereof, refer to the description of the foregoing method embodiment, and no further description is provided herein.

The UE provided by this embodiment cooperates with the base station provided by the foregoing embodiment to complete E-PDCCH transmission, and in addition, may also improve utilization of pilot ports, and implement space diversity.

FIG. 4A is a flowchart of an E-PDCCH transmission method according to an embodiment of the present invention. This embodiment may be executed by a base station, and may also by a UE. That is, a UE cooperates with a base station to number second resource groups of a first type and second resource groups of a second type by using a same manner, so as to facilitate E-PDCCH transmission and improve blind detection efficiency. As shown in FIG. 4A, the transmission method in this embodiment includes:

Step 401: In a physical resource block set, separately arrange first resource groups in each PRB pair, where the first resource groups are eREGs or REGs, and the physical resource block set includes at least one of the physical resource block pairs.

In this embodiment, the physical resource block set includes at least one physical resource block pair. The first resource groups in the physical resource block set include first resource groups in each physical resource block pair in the physical resource block set. The first resource groups in the physical resource block set are arranged sequentially according to a sequence of the physical resource block pairs, and a number of each arranged first resource group is obtained.

As shown in FIG. 14, assuming that the physical resource block set includes four physical resource block pairs, where one PRB pair includes L eREGs, for example, L=16, for ai, i=1 to 16, a1 to a16 correspond to indexes of the eREGs, and values of a1 to a16 are numbers that are different from each other in a range of 0 to 15. In each PRB pair in a same control channel resource block set, L eREGs are grouped into same K eREG groups. If K=4, 16 eREGs are grouped into four eREG groups.

In eCCEs for transmitting an E-PDCCH in localized mode, each eCCE corresponds to one REG group. A dotted line box in FIG. 14 shows an eCCE for transmitting the E-PDCCH in localized mode. As shown in FIG. 14, in a PRB pair, four eCCEs are respectively corresponding to the four REG groups. A first eREG group (an eREG group 1) includes (eREG (a1), eREG (a2), eREG (a3), and eREG (a4)); a second eREG group (an eREG group 2) includes (eREG (a5), eREG (a6), eREG (a7) and eREG (a8)); a third eREG group (an eREG group 3) includes (eREG (a9), eREG (a10), eREG (a11), and eREG (a12)); and a fourth eREG group (an eREG group 4) includes (eREG (a13), eREG (a14), eREG (a15), and eREG (a16)).

The foregoing eREG group grouping manner is used in each PRB pair in a same control channel resource block set. For different PRB pairs, in each eREG group that includes same eREGs, the eREGs are arranged in different sequences. For example, for the same eREG group 1 that includes same elements (eREG (a1), eREG (a2), eREG (a3), and eREG (a4)), an arrangement sequence in PRB pair 1 is (eREG (a1), eREG (a2), eREG (a3), and eREG (a4)), an arrangement sequence in PRB pair 2 is (eREG (a2), eREG (a3), eREG (a4), and eREG (a1)), an arrangement sequence in PRB pair 3 is (eREG (a3), eREG (a4), eREG (a1), and eREG (a2)), and an arrangement sequence in PRB pair 4 is (eREG (a4), eREG (a1), eREG (a2), and eREG (a3)). An arrangement sequence may also be a cyclic shift of different PRB pairs. A similar arrangement manner may also be used for other eREG groups, which is not further described herein.

By using the foregoing manner, eCCEs for transmitting the E-PDCCH in localized mode are obtained.

Each eCCE for transmitting the E-PDCCH in distributed mode may correspond to each row in FIG. 14, that is, from an eREG group including same eREG elements in each PRB pair, a different eREG element is selected to constitute an eCCE for transmitting the E-PDCCH in distributed mode. A solid line box in FIG. 14 shows an eCCE for transmitting the E-PDCCH in distributed mode. For example, an eREG group including same eREG elements (eREG (a1), eREG (a2), eREG (a3), and eREG (a4)) in each PRB pair is referred to as an eREG group 1, and from the eREG group 1 in different PRB pairs, a different element is separately selected to constitute an eCCE for transmitting the E-PDCCH in distributed mode. For example, eREG (a1) selected from the eREG group 1 in the PRB pair 1, eREG (a2) selected from the eREG group 1 in the PRB pair 2, eREG (a3) selected from the eREG group 1 in the PRB pair 3, and eREG (a4) selected from the eREG group 1 in the PRB pair 4, that is, a set of all eREGs in a first row in FIG. 14, constitute an eCCE for transmitting the E-PDCCH in distributed mode; eREG (a2) selected from the eREG group 1 in the PRB pair 1, eREG (a3) selected from the eREG group 1 in the PRB pair 2, eREG (a4) selected from the eREG group 1 in the PRB pair 3, and eREG (a1) selected from the eREG group 1 in the PRB pair 4, that is, a set of all eREGs in a second row in FIG. 14, constitute another eCCE for transmitting the E-PDCCH in distributed mode; and similarly, each row in FIG. 14 is circled to constitute an eCCE for transmitting the E-PDCCH in distributed mode. This manner may also be understood as selecting an eREG with a different number corresponding to an eREG element included in a localized eCCE from each PRB pair to constitute an eCCE for transmitting the E-PDCCH in distributed mode.

The following form may be used as a form of numbers of eREGs corresponding to a1-a16 in the FIG. 14:

a1, a2, a3, and a4 respectively correspond to eREG numbers 0, 4, 8, and 12;

a5, a6, a7, and a8 respectively correspond to eREG numbers 1, 5, 9, and 13;

a9, a10, a11, and a12 respectively correspond to eREG numbers 2, 6, 10, 14; and a13, a14, a15, and a16 respectively correspond to eREG numbers 3, 9, 11, and 15.

The specific resource set may be a set including L*B eREGs in size, where M is a quantity of eREGs included in each eCCE, B is a quantity of PRB pairs, and the set of B*M eREGs is a set including indexes of only B eREGs.

The form of distributed and localized eCCEs for the E-PDCCH has been determined in the foregoing manner. On a basis of the foregoing principle, the eCCEs need to be numbered. A purpose of eCCE numbering is: first, a correspondence between logical eCCEs and physical eCCEs needs to be determined, so that the logical eCCEs are mapped to the physical eCCEs, or composition of a search scope may be determined, and a resource binding relationship in HARQ feedback needs to be associated with eCCE indexes.

Step 402: Number second resource groups according to a correspondence between the first resource groups and the second resource groups in the physical resource block set, where the second resource groups are control channel element eCCE groups or control channel candidates.

Preferably, for the second resource groups of a first type (for example, the eCCEs for transmitting the E-PDCCH in localized mode), any one of the following manners may be used for numbering the second resource groups:

Manner 1:

Each of the physical resource block pairs includes N third resource groups, where N is a positive integer, and each of the third resource groups includes M first resource groups, and in the physical resource block set, a number set of first resource groups included in each third resource group in a physical resource block pair is the same as a number set of first resource groups included in a third resource group in each of other physical resource block pairs; and the numbering second resource groups according to a correspondence between the first resource groups and the second resource groups in the physical resource block set includes that: each of the third resource groups corresponds to one of the second resource groups of the first type, and the second resource groups of the first type in each physical resource block pair are numbered sequentially in ascending or descending order of numbers of the physical resource block pairs, where a correspondence between numbers of the second resource groups of the first type and numbers of first resource groups corresponding to the second resource groups of the first type exists in each physical resource block pair.

Optionally, that a correspondence between numbers of the second resource groups of the first type and numbers of first resource groups corresponding to the second resource groups of the first type exists in each physical resource block pair includes that: in each physical resource block pair, the numbers of the second resource groups of the first type are consecutive, and a sequence of the numbers of the second resource groups of the first type is the same as a sequence of maximum numbers or minimum numbers of the first resource groups corresponding to the second resource groups of the first type.

In a preferred implementation manner of the present invention, manner 1 may include that:

the numbering second resource groups according to a correspondence between the first resource groups and the second resource groups in the physical resource block set includes that: determining the numbers of the second resource groups of the first type according to the following formula:

$$j = K*m + (i \bmod K),$$

where, i is a number of a first resource group, i is an integer from 0 to L−1, L is a quantity of first resource groups in one of the physical resource block pairs, j is a number of the second resource group of the first type, m is a number of a physical resource block pair, K is a quantity of the second resource groups of the first type in each of the physical resource block pairs, mod indicates a modulo operation, and the second resource groups of the first type correspond to M first resource groups that belong to a same physical resource block pair, where M is a positive integer.

Figure 4B:
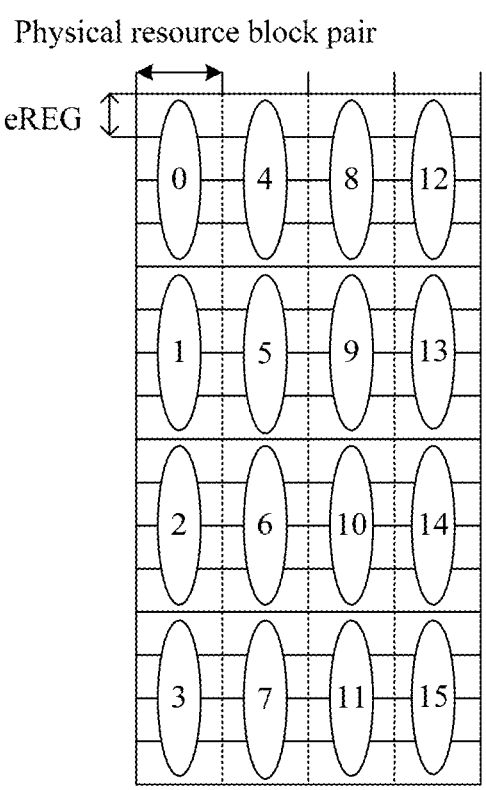
FIG. 4B to FIG. 4E are schematic diagrams of various numbering results according to an embodiment of the present invention.

For example, for the eCCEs for transmitting the control channel in localized mode, a numbering rule thereof may be numbering all eCCEs in each PRB pair sequentially from the first PRB pair, and then numbering all eCCEs in a next PRB pair. A sequence of numbering eCCEs in each PRB pair is an arrangement in ascending order of minimum numbers of eREGs included in each eCCE. For example, in a PRB pair, numbers of eREGs included in an eCCE are 0, 4, 8, and 12, and numbers of eREGs included in another eCCE are 1, 5, 9, and 13; a minimum number of an eREG included in the first eCCE is 0, and a minimum number of an eREG included in the another eCCE is 1. In this case, the eCCE including the eREG with the minimum number of 0 may be numbered before the eCCE including the eREG with the minimum number of 1. A final numbering manner using the method in this embodiment is shown in FIG. 4B. In FIG. 4B, each circle represents an eCCE, and a number in the circle represents the number of the eCCE. Manners of arranging eREGs in FIG. 4B to FIG. 4E are the same as those in FIG. 14.

Manner 2:

Each of the physical resource block pairs includes N third resource groups, where N is a positive integer, and each of the third resource groups includes M first resource groups; in the physical resource block set, a number set of first resource groups included in each third resource group in a physical resource block pair is the same as a number set of first resource groups included in a third resource group in each of other physical resource block pairs; in each of the physical resource block pairs, a sequence of numbers of the third resource groups is the same as a sequence of maximum numbers or minimum numbers of the first resource groups in the third resource groups; and the numbering second resource groups according to a correspondence between the first resource groups and the second resource groups in the physical resource block set includes that: each of the third resource groups corresponds to one of the second resource groups of the first type, and the second resource groups of the first type corresponding to third resource groups having a same number are numbered sequentially in ascending or descending order of the numbers of the third resource groups, where a correspondence between a sequence of numbers of the second resource groups of the first type and a sequence of numbers of physical resource block pairs in which the second resource groups of the first type are located, exists in the second resource groups of the first type corresponding to the third resource groups having the same number.

Optionally, that a correspondence between a sequence of numbers of the second resource groups of the first type and a sequence of numbers of physical resource block pairs in which the second resource groups of the first type are located, exists in the second resource groups of the first type corresponding to the third resource groups having the same number includes that: in the second resource groups of the first type corresponding to the third resource groups having the same number, the numbers of the second resource groups of the first type are consecutive, and the sequence of the numbers of the second resource groups of the first type is the same as the sequence of the numbers of the physical resource block pairs in which the second resource groups of the first type are located.

In a preferred instance of the embodiment of the present invention, manner 2 may include:

determining the numbers of the second resource groups of the first type according to the following formula:

$$j = (i \bmod K)*K + m,$$

where, i is a number of a first resource group, i is an integer from 0 to L−1, L is a quantity of first resource groups in one of the physical resource block pairs, j is a number of the second resource group of the first type, m is a number of a physical resource block pair, K is a quantity of the second resource groups of the first type in each of the physical resource block pairs, mod indicates a modulo operation, and the second resource groups of the first type correspond to M first resource groups that belong to a same physical resource block pair, where M is a positive integer.

Figure 4C:
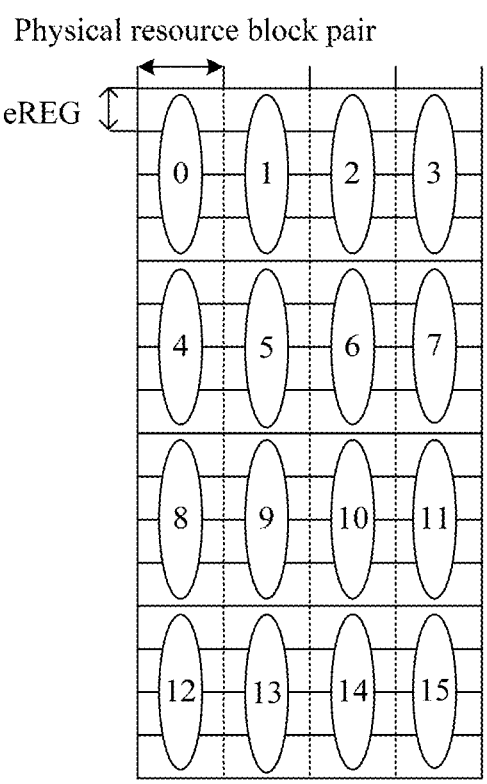

For example, for the eCCEs for transmitting the control channel in localized mode, a numbering rule thereof may be numbering a same eREG group in all PRB pairs sequentially from the first PRB pair, where the same eREG group is an eREG group including same eREG elements in each PRB pair, and then numbering a next eREG group. The eREG groups are numbered in ascending order of PRB indexes (PRB numbers). For example, for the eREG group 1 in FIG. 14, the numbering is sequential numbering in a manner of first numbering the eREG group 1 in the PRB pair 1 and then numbering the eREG group 1 in the PRB pair 2. The eREG group 2 is numbered in the same manner. The numbering manner may be the manner shown in FIG. 4C. In FIG. 4C, each circle represents an eCCE for transmitting the control channel in localized mode, and a number in the circle represents the number of the eCCE.

Preferably, in the foregoing manner 1 and manner 2, for the second resource groups of the first type corresponding to the third resource groups having the same number, a mapping relationship between the second resource group of the first type in a physical resource block pair and first resource groups included in the second resource group of the first type in the physical resource block pair is a cyclic shift of a mapping relationship between one of the second resource groups of the first type in each of the other physical resource block pairs and first resource groups included in the one of the second resource groups of the first type in each of the other physical resource block pairs.

Optionally, for the second resource groups of a second type (for example, the eCCEs for transmitting the E-PDCCH in distributed mode), any one of the following methods may be used for numbering the second resource groups:

Method 1:

Preferably, the numbering second resource groups according to a correspondence between the first resource groups and the second resource groups in the physical resource block set includes that: the second resource groups of the second type include M first resource groups that respectively belong to different physical resource block pairs; and numbers of first resource groups in a same physical resource block pair corresponding to the second resource groups of the second type are used as numbers of the second resource groups of the second type.

Optionally, the numbering second resource groups according to a correspondence between the first resource groups and the second resource groups in the physical resource block set includes:

determining the numbers of the second resource groups of the second type according to the following formula:

$$j=(i-K*m)\bmod 16,$$

where, i is a number of a first resource group, i is an integer from 0 to L−1, L is a quantity of first resource groups in one of the physical resource block pairs, j is a number of the second resource group of the second type, m is a number of a physical resource block pair, K is a quantity of the second resource groups of the second type in each of the physical resource block pairs, and mod indicates a modulo operation; or determining the numbers of the second resource groups of the second type according to the following formula:

$$i=(j+x*K)\bmod N,$$

$$m=(\mathrm{floor}(j/(M*K))*M+x)\bmod C,$$

where, i is a number of an $x^{th}$ first resource group corresponding to the second resource group numbered j of the second type, i is an integer from 0 to L−1, L is a quantity of first resource groups in one of the physical resource block pairs, m is a number of a physical resource block pair in which the $x^{th}$ first resource group corresponding to the second resource group numbered j of the second type is located, K=floor(P/O), P is a quantity of first resource groups in a physical resource block pair, O is a quantity of first resource groups included in a second resource group, C is a quantity of physical resource block pairs in the physical resource block set, mod indicates a modulo operation, and floor indicates a round-down operation.

Figure 4D:
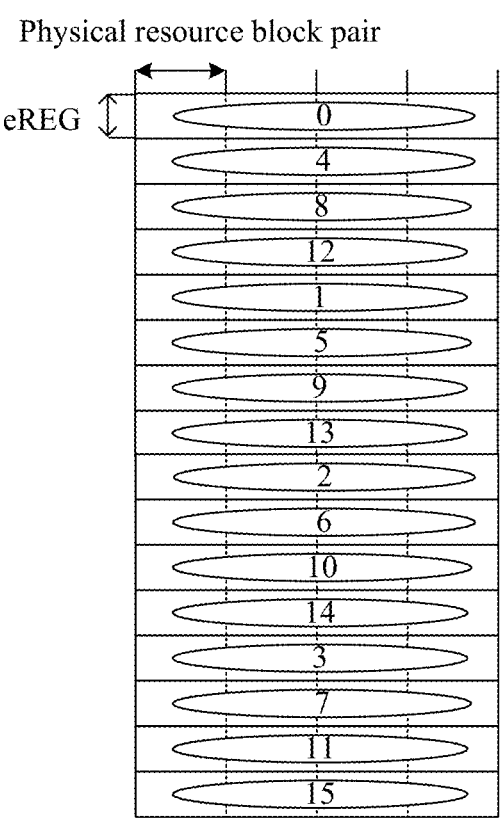

For example, as shown in FIG. 4D, each circle represents a distributed eCCE, and a number in the circle represents the number of the eCCE. A numbering manner may be that the number of each eCCE is the same as a number of an eREG included in the eCCE in a specific PRB pair. For example, indexes of eREGs included in the eCCE in a first row in FIG. 14, in four PRB pairs, are sequentially 0, 4, 8, and 10, and therefore, the index 0 of the eREG included in the eCCE in the PRB pair 1 is used as the number of the eCCE.

Preferably, the physical resource block set includes K sets of the second resource groups of the second type, and in each set of the K sets, a mapping relationship between one of the second resource groups of the second type and first resource groups included in the one of the second resource groups of the second type is a cyclic shift of a mapping relationship between each of other second resource groups of the second type and first resource groups included in each of the other second resource groups of the second type.

Method 2:

The numbering second resource groups according to a correspondence between the first resource groups and the second resource groups in the physical resource block set includes that: the second resource groups of the second type include M first resource groups that respectively belong to different physical resource block pairs, and the physical resource block set includes K sets of the second resource groups of the second type, where K is a positive integer, and in each set of the K sets, a mapping relationship between one of the second resource groups of the second type and first resource groups included in the one of the second resource groups of the second type is a cyclic shift of a mapping relationship between each of other second resource groups of the second type and first resource groups included in each of the other second resource groups of the second type; in each set of the K sets, the second resource groups of the second type are numbered according to numbers of first resource groups in a same physical resource block pair corresponding to the second resource groups of the second type; and between different sets of the K sets, a sequence of numbers of the second resource groups of the second type is the same as a sequence of maximum numbers or minimum numbers of first resource groups corresponding to the different sets in the K sets in a same physical resource block pair.

Figure 4E:
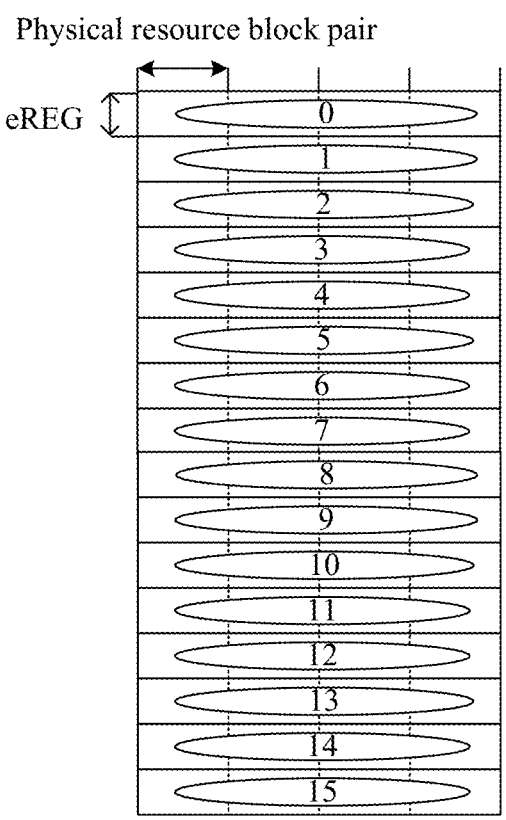

For example, as shown in FIG. 4E, each circle represents a distributed eCCE, and a number in the circle represents the number of the eCCE. A numbering manner may be that numbering is first performed within an eCCE group. The eCCE group refers to a group of eCCEs. eREGs included in each eCCE in the group have same numbers, but the numbers of the eREGs are different in different PRB pairs. For example, the eCCE group 1 is four eCCEs corresponding to first four rows in FIG. 10. Each eCCE includes eREGs 0, 4, 8, and 12, but eREGs 0, 4, 8, and 12 in different eCCEs are located in different PRB pairs. First, eCCEs are numbered sequentially in each eCCE group, and a specific PRB pair is used as a basis of the sequence of numbers. For example, in a first PRB pair, eCCEs in which eREGs are located are numbered in ascending order of indexes of eREGs of each eCCE in the PRB pair. Then eCCEs in a next eCCE group are numbered sequentially.

Preferably, if first resource groups corresponding to at least two of the second resource groups of the first type in the physical resource block set are the same as first resource groups corresponding to at least two of the second resource groups of the second type in the physical resource block set, a set of numbers of the at least two of the second resource groups of the first type is the same as a set of numbers of the at least two of the second resource groups of the second type.

For example, there is a correspondence between the foregoing numbering manner of localized eCCEs and the numbering manner of distributed eCCEs. The correspondence may be: if the numbering manner of localized eCCEs is manner 1, method 1 is used as the numbering manner of distributed eCCEs; if the numbering manner of localized eCCE is manner 2, method 2 is used as the numbering manner of distributed eCCEs.

A principle of the foregoing correspondence is that: in a specific resource set, a number group including localized eCCEs is the same as a number group including distributed eCCEs. For example, numbers of localized eCCEs included in resource sets in dotted line boxes in FIG. 4B and FIG. 4D are respectively 0, 4, 8, and 12, and numbers of distributed eCCEs therein are also respectively 0, 4, 8, and 12. Likewise, numbers of localized eCCEs included in resource sets in dotted line boxes in FIG. 4C and FIG. 4E are respectively 0, 1, 2, and 3, and numbers of distributed eCCEs therein are also respectively 0, 1, 2, and 3.

Optionally, the second resource groups of the first type in the physical resource block set are resource groups for transmitting the E-PDCCH in localized mode; and the second resource groups of the second type in the physical resource block set are resource groups for transmitting the E-PDCCH in distributed mode.

Step 403: Determine numbers of the second resource groups for transmitting an E-PDCCH, and map, according to the determined numbers, the E-PDCCH to the corresponding first resource groups for transmission.

As may be seen above, this embodiment implements numbering of the second resource groups of the first type and the second resource groups of the second type, and is advantageous for blind detection.

For a case in which each eCCE includes four eREGs, an internal specific mapping sequence is not considered, and only cases of combinations are considered. There are the following four cases, and the eCCE may be an eCCE for transmission in localized mode or an eCCE for transmission in distributed mode:

eCCE X1 (eREG 0, eREG 4, eREG 8, and eREG 12),
eCCE X2 (eREG 1, eREG 5, eREG 9, and eREG13),
eCCE X3 (eREG 2, eREG 6, eREG 10, and eREG 14), and
eCCE X4 (eREG 3, eREG 7, eREG 11, and eREG 15).

When each eCCE includes eight eREGs, indexes of eREGs included in eCCE Y1 may include a combination of indexes of eREGs included in eCCE X1 and eCCE X2, for example, eCCE Y1 (eREG 0, eREG 4, eREG 8, eREG 12, eREG 1, eREG 5, eREG 9, and eREG 13); and
eCCE Y2 (eREG 2, eREG 6, eREG 10, eREG 14, eREG 3, eREG 7, eREG 11, and eREG 15).

In this case, when a CRS port quantity is 1, this combination may cause a quantity of available REs included in eCCE Y1 to be closest to a quantity of available REs included in eCCE Y2. Both (eREG 0, eREG 4, eREG 8, and eREG 12) and (eREG2, eREG 6, eREG 10, and eREG 14) are always in a subcarrier in which a pilot frequency is located, which causes the quantity of available REs to be less than (eREG 1, eREG 5, eREG 9, and eREG 13) and (eREG 3, eREG 7, eREG 11, and eREG 15); or both (eREG 1, eREG 5, eREG 9, and eREG 13) and (eREG 3, eREG 7, eREG 11, and eREG 15) are always in a subcarrier in which a pilot frequency is located, which causes the quantity of available REs to be less than (eREG 0, eREG 4, eREG 8, and eREG 12) and (eREG 2, eREG 6, eREG 10, and eREG 14). Therefore, eREGs that are all in a subcarrier in which a pilot frequency is located must be decentralized to two eCCEs.

Alternatively, indexes of eREGs included in eCCE Y1 may include a combination of indexes of eREGs included in eCCE X1 and eCCE X2, for example, eCCE Y1 (eREG 0, eREG 4, eREG 8, eREG 12, eREG 2, eREG 6, eREG 10, and eREG 14); and
eCCE Y2 (eREG 1, eREG 5, eREG 9, eREG 13, eREG 3, eREG 7, eREG 11, and eREG 15).

For eCCEs for transmission in distributed mode, each eCCE includes eight eREGs, and a control channel resource set includes eight eREGs. In this case, there are two manners.

Manner 1:

The numbers of the eREGs included in the foregoing eCCE Y1 are respectively mapped to eight eREGs sequentially in ascending order. For example, indexes of eREGs of eCCE 0 in Table 1 are (eREG 0, eREG 1, eREG 4, eREG 5, eREG 8, eREG 9, eREG 12, and eREG 13) in eight PRB pairs; and numbers of eREGs included in seven eCCEs are the same as those indexes, but are a cyclic shift of a mapping sequence of the eREGs of eCCE 0 in different PRB pairs. The cyclic shift is a sequence that is cyclically shifted sequentially. For example, a mapping sequence of eCCE 1 in eight PRB pairs is (eREG 1, eREG 4, eREG 5, eREG 8, eREG 9, eREG 12, eREG 13, and eREG 0).

Manner 2:

The numbers of the eREGs included in the foregoing eCCE Y1 are grouped into two groups. Numbers of eREGs included in each group are the same as those in a case in which an eCCE includes four eREGs. Indexes of eREGs of eCCE 0 in eight PRB pairs are ((eREG 0, eREG 4, eREG 8, and eREG 12), and (eREG 2, eREG 6, eREG 10, and eREG 14)). A first group is (eREG 0, eREG 4, eREG 8, and eREG 12), and a second group is (eREG 2, eREG 6, eREG 10, and eREG 14). Therefore, eCCE 0 is respectively mapped to eight PRB pairs according to a sequence of ((eREG 0, eREG 4, eREG 8, and eREG 12), and (eREG 2, eREG 6, eREG 10, and eREG 14)), and a group mapping sequence of eCCE 0 is (first group, and second group). Therefore, numbers of eREGs included in seven eCCEs are the same as those of eCCE 0; however, cyclic shifts of the seven eCCEs are not sequential cyclic shifts, and may first be inter-group shifts, and then intra-group cyclic shifts. For example, for eCCE 9 in Table 3, (second group, and first group) is a cyclic shift of the group mapping sequence (first group, and second group) of eCCE 0, namely, (second group (6, 10, 14, and 2), and first group (4, 8, 12, and 0)). Then, for a sequence of eREGs of eCCE 9 in the first group, there is a cyclic shift relative to a sequence of eREGs of eCCE 0 in the first group, and for a sequence of eREGs in the second group, there is a cyclic shift relative to a sequence of eREGs of eCCE 0 in the second group. Alternatively, there is no inter-group cycle shift, and there is only an intra-group cyclic shift. For example, for eCCE 1, there is no inter-group shift relative to eCCE 0, and there is only an intra-group shift. Specific numbering manners of eCCEs may be the manners in Table 1.1 and Table 8.1. In eight eCCEs including same eREG indexes, three eCCEs have no inter-group shift relative to a mapping relationship of eREGs of one eCCE, and have only an intra-group shift; the other four eCCEs have both an intra-group shift and an inter-group shift. Effect is that a mapping manner of four eREGs included in one eCCE may be reused in each group, and implementation is simple.

TABLE 1.1

Manner 1 of mapping between eCCEs and eREGs, where there are eight PRB pairs, and each eCCE includes eight eREGs

| ECCE index | ECCE0 | ECCE1 | ECCE2 | ECCE3 | ECCE4 | ECCE5 | ECCE6 | ECCE7 |
|---|---|---|---|---|---|---|---|---|
| PRB pair 0 | 0 | 1 | 4 | 5 | 8 | 9 | 12 | 13 |
| PRB pair 1 | 1 | 4 | 5 | 8 | 9 | 12 | 13 | 0 |

TABLE 1.1-continued

Manner 1 of mapping between eCCEs and eREGs, where there are eight PRB pairs, and each eCCE includes eight eREGs

| | | | | | | | | |
|---|---|---|---|---|---|---|---|---|
| PRB pair 2 | 4 | 5 | 8 | 9 | 12 | 13 | 0 | 1 |
| PRB pair 3 | 5 | 8 | 9 | 12 | 13 | 0 | 1 | 4 |
| PRB pair 4 | 8 | 9 | 12 | 13 | 0 | 1 | 4 | 5 |
| PRB pair 5 | 9 | 12 | 13 | 0 | 1 | 4 | 5 | 8 |
| PRB pair 6 | 12 | 13 | 0 | 1 | 4 | 5 | 8 | 9 |
| PRB pair 7 | 13 | 0 | 1 | 4 | 5 | 8 | 9 | 12 |

| ECCE index | ECCE8 | ECCE9 | ECCE10 | ECCE11 | ECCE12 | ECCE13 | ECCE14 | ECCE15 |
|---|---|---|---|---|---|---|---|---|
| PRB pair 0 | 2 | 3 | 6 | 7 | 10 | 11 | 14 | 15 |
| PRB pair 1 | 3 | 6 | 7 | 10 | 11 | 14 | 15 | 2 |
| PRB pair 2 | 6 | 7 | 10 | 11 | 14 | 15 | 2 | 3 |
| PRB pair 3 | 7 | 10 | 11 | 14 | 15 | 2 | 3 | 6 |
| PRB pair 4 | 10 | 11 | 14 | 15 | 2 | 3 | 6 | 7 |
| PRB pair 5 | 11 | 14 | 15 | 2 | 3 | 6 | 7 | 10 |
| PRB pair 6 | 14 | 15 | 2 | 3 | 6 | 7 | 10 | 11 |
| PRB pair 7 | 15 | 2 | 3 | 6 | 7 | 10 | 11 | 14 |

FIG. 10.1 Manner 1 of mapping between distributed eCCEs and eREGs, where there are four PRB pairs and each eCCE includes four eREGs

| ECCE index | ECCE0 | ECCE1 | ECCE2 | ECCE3 | ECCE4 | ECCE5 | ECCE6 | ECCE7 |
|---|---|---|---|---|---|---|---|---|
| PRB pair 0 | 0 | 4 | 8 | 12 | 1 | 5 | 9 | 13 |
| PRB pair 1 | 4 | 8 | 12 | 0 | 5 | 9 | 13 | 1 |
| PRB pair 2 | 8 | 12 | 0 | 4 | 9 | 13 | 1 | 5 |
| PRB pair 3 | 12 | 0 | 4 | 8 | 13 | 1 | 5 | 9 |

| ECCE index | ECCE8 | ECCE9 | ECCE10 | ECCE11 | ECCE12 | ECCE13 | ECCE14 | ECCE15 |
|---|---|---|---|---|---|---|---|---|
| PRB pair 0 | 2 | 6 | 10 | 14 | 3 | 7 | 11 | 15 |
| PRB pair 1 | 6 | 10 | 14 | 2 | 7 | 11 | 15 | 3 |
| PRB pair 2 | 10 | 14 | 2 | 6 | 11 | 15 | 3 | 7 |
| PRB pair 3 | 14 | 2 | 6 | 10 | 15 | 3 | 7 | 11 |

TABLE 3.1

Manner 2 of mapping between eCCEs and eREGs, where there are eight PRB pairs, and each eCCE includes eight eREGs

| ECCE index | ECCE0 | ECCE1 | ECCE2 | ECCE3 | ECCE4 | ECCE5 | ECCE6 | ECCE7 |
|---|---|---|---|---|---|---|---|---|
| PRB pair 0 | 0 | 4 | 8 | 12 | 1 | 5 | 9 | 13 |
| PRB pair 1 | 4 | 8 | 12 | 0 | 5 | 9 | 13 | 1 |
| PRB pair 2 | 8 | 12 | 0 | 4 | 9 | 13 | 1 | 5 |
| PRB pair 3 | 12 | 0 | 4 | 8 | 13 | 1 | 5 | 9 |
| PRB pair 4 | 2 | 6 | 10 | 14 | 3 | 7 | 11 | 15 |
| PRB pair 5 | 6 | 10 | 14 | 2 | 7 | 11 | 15 | 3 |
| PRB pair 6 | 10 | 14 | 2 | 6 | 11 | 15 | 3 | 7 |
| PRB pair 7 | 14 | 2 | 6 | 10 | 15 | 3 | 7 | 11 |

| ECCE index | ECCE8 | ECCE9 | ECCE10 | ECCE11 | ECCE12 | ECCE13 | ECCE14 | ECCE15 |
|---|---|---|---|---|---|---|---|---|
| PRB pair 0 | 2 | 6 | 10 | 14 | 3 | 7 | 11 | 15 |
| PRB pair 1 | 6 | 10 | 14 | 2 | 7 | 11 | 15 | 3 |
| PRB pair 2 | 10 | 14 | 2 | 6 | 11 | 15 | 3 | 7 |
| PRB pair 3 | 14 | 2 | 6 | 10 | 15 | 3 | 7 | 11 |
| PRB pair 4 | 0 | 4 | 8 | 12 | 1 | 5 | 9 | 13 |
| PRB pair 5 | 4 | 8 | 12 | 0 | 5 | 9 | 13 | 1 |
| PRB pair 6 | 8 | 12 | 0 | 4 | 9 | 13 | 1 | 5 |
| PRB pair 7 | 12 | 0 | 4 | 8 | 13 | 1 | 5 | 9 |

If a control channel resource set includes eight PRB pairs, and each eCCE includes eight eREGs, for a mapping relationship between eCCEs and eREGs in the eight PRBs pair, a mapping manner used in the first four PRBs is the same as that in the case described in FIG. 10.1 in which a control channel set includes four PRB pairs and each eCCE includes four eREGs. It may be seen that the first four rows in Table 3.1 are completely the same as those in FIG. 10.1.

However, in the last four rows, that is, in the last four PRB pairs (PRB pair 4, PRB pair 5, PRB pair 6, and PRB pair 7), a mapping relationship between eCCEs and eREGs is a cyclic shift of a mapping relationship between eCCEs and eREGs in the first four PRB pairs, for example, a cyclic shift by eight positions. Therefore, the first four eREGs of eCCE 8 to eCCE 15 in the first four PRB pairs are cyclically shifted by eight positions, to change to the last four eREGs of eCCE 0 to eCCE 7. Therefore, the first four eREGs of eCCE 0 to eCCE 7 in the first four PRB pairs are cyclically shifted by eight positions, to change to the last four eREGs of eCCE 8 to eCCE 15.

Alternatively

FIG. 11.1 Manner 3 of mapping between eCCEs and eREGs, where there are eight PRB pairs, and each eCCE includes eight eREGs

| ECCE index | ECCE0 | ECCE1 | ECCE2 | ECCE3 | ECCE4 | ECCE5 | ECCE6 | ECCE7 |
|---|---|---|---|---|---|---|---|---|
| PRB pair 0 | 0 | 4 | 8 | 12 | 1 | 5 | 9 | 13 |
| PRB pair 1 | 4 | 8 | 12 | 0 | 5 | 9 | 13 | 1 |
| PRB pair 2 | 8 | 12 | 0 | 4 | 9 | 13 | 1 | 5 |
| PRB pair 3 | 12 | 0 | 4 | 8 | 13 | 1 | 5 | 9 |
| PRB pair 4 | 1 | 5 | 9 | 13 | 2 | 6 | 10 | 14 |
| PRB pair 5 | 5 | 9 | 13 | 1 | 6 | 10 | 14 | 2 |
| PRB pair 6 | 9 | 13 | 1 | 5 | 10 | 14 | 2 | 6 |
| PRB pair 7 | 13 | 1 | 5 | 9 | 14 | 2 | 6 | 10 |

| ECCE index | ECCE8 | ECCE9 | ECCE10 | ECCE11 | ECCE12 | ECCE13 | ECCE14 | ECCE15 |
|---|---|---|---|---|---|---|---|---|
| PRB pair 0 | 2 | 6 | 10 | 14 | 3 | 7 | 11 | 15 |
| PRB pair 1 | 6 | 10 | 14 | 2 | 7 | 11 | 15 | 3 |
| PRB pair 2 | 10 | 14 | 2 | 6 | 11 | 15 | 3 | 7 |
| PRB pair 3 | 14 | 2 | 6 | 10 | 15 | 3 | 7 | 11 |
| PRB pair 4 | 3 | 7 | 11 | 15 | 0 | 4 | 8 | 12 |
| PRB pair 5 | 7 | 11 | 15 | 3 | 4 | 8 | 12 | 0 |
| PRB pair 6 | 11 | 15 | 3 | 7 | 8 | 12 | 0 | 4 |
| PRB pair 7 | 15 | 3 | 7 | 11 | 12 | 0 | 4 | 8 |

If a control channel resource set includes eight PRB pairs, and each eCCE includes eight eREGs, for a mapping relationship between eCCEs and eREGs in the eight PRBs, a mapping manner used in the first four PRBs is the same as that in the case described in Table 1 in which a control channel set includes four PRB pairs and each eCCE includes four eREGs. It may be seen that the first four rows in FIG. 11.1 are completely the same as those in FIG. 10.1.

However, in the last four rows, that is, in the last four PRB pairs (PRB pair 4, PRB pair 5, PRB pair 6, and PRB pair 7), a mapping relationship between eCCEs and eREGs is a cyclic shift of a mapping relationship between eCCEs and eREGs in the first four PRB pairs, for example, a cyclic shift by four positions. Therefore, the first four eREGs in eCCE (i, j−4) are the same as those in FIG. 10.1, and numbers of the last four eREGs are the same as numbers of eREGs corresponding to eCCE (i+4, j−4), where i is a number of an eCCE, and j is an integer from 0 to 3 and indicates a jth eREG included in the eCCE.

FIG. 12.1 Manner 1-1 of mapping between eCCEs and eREGs, where there are eight PRB pairs, and each eCCE includes four eREGs

| ECCE index | ECCE0 | ECCE1 | ECCE2 | ECCE3 | ECCE4 | ECCE5 | ECCE6 | ECCE7 |
|---|---|---|---|---|---|---|---|---|
| PRB pair 0 | 0 | 4 | 8 | 12 | 1 | 5 | 9 | 13 |
| PRB pair 1 | 4 | 8 | 12 | 0 | 5 | 9 | 13 | 1 |
| PRB pair 2 | 8 | 12 | 0 | 4 | 9 | 13 | 1 | 5 |
| PRB pair 3 | 12 | 0 | 4 | 8 | 13 | 1 | 5 | 9 |

| ECCE index | ECCE8 | ECCE9 | ECCE10 | ECCE11 | ECCE12 | ECCE13 | ECCE14 | ECCE15 |
|---|---|---|---|---|---|---|---|---|
| PRB pair 4 | 0 | 4 | 8 | 12 | 1 | 5 | 9 | 13 |
| PRB pair 5 | 4 | 8 | 12 | 0 | 5 | 9 | 13 | 1 |
| PRB pair 6 | 8 | 12 | 0 | 4 | 9 | 13 | 1 | 5 |
| PRB pair 7 | 12 | 0 | 4 | 8 | 13 | 1 | 5 | 9 |

In a case in which each control channel resource set includes eight PRB pairs and each eCCE includes four eREGs, as shown in FIG. 12.1, a mapping manner used between eCCEs and eREGs of the first four PRBs is a mapping manner between eCCEs and eREGs in FIG. 10.1, and a mapping manner used between eCCEs and eREGs of the last four PRBs is a mapping manner of eCCE 8 to eCCE 15 in FIG. 10.1.

FIG. 13.1 Manner 1-2 of mapping between eCCEs and eREGs, where there are eight PRB pairs, and each eCCE includes four eREGs

| ECCE index | ECCE0 | ECCE1 | ECCE2 | ECCE3 | ECCE4 | ECCE5 | ECCE6 | ECCE7 |
|---|---|---|---|---|---|---|---|---|
| PRB pair 0 | 0 |   | 8 |   | 1 |   | 9 |   |
| PRB pair 1 | 4 |   | 12 |   | 5 |   | 13 |   |
| PRB pair 2 | 8 |   | 0 |   | 9 |   | 1 |   |
| PRB pair 3 | 12 |   | 4 |   | 13 |   | 5 |   |
| PRB pair 4 |   | 4 |   | 4 |   | 5 |   | 13 |
| PRB pair 5 |   | 8 |   | 8 |   | 9 |   | 1 |
| PRB pair 6 |   | 12 |   | 12 |   | 13 |   | 5 |
| PRB pair 7 |   | 0 |   | 0 |   | 1 |   | 9 |

| ECCE index | ECCE8 | ECCE9 | ECCE10 | ECCE11 | ECCE12 | ECCE13 | ECCE14 | ECCE15 |
|---|---|---|---|---|---|---|---|---|
| PRB pair 0 | 0 |   | 8 |   | 1 |   | 9 |   |
| PRB pair 1 | 4 |   | 12 |   | 5 |   | 13 |   |
| PRB pair 2 | 8 |   | 0 |   | 9 |   | 1 |   |
| PRB pair 3 | 12 |   | 4 |   | 13 |   | 5 |   |
| PRB pair 4 |   | 4 |   | 4 |   | 5 |   | 13 |
| PRB pair 5 |   | 8 |   | 8 |   | 9 |   | 1 |
| PRB pair 6 |   | 12 |   | 12 |   | 13 |   | 5 |
| PRB pair 7 |   | 0 |   | 0 |   | 1 |   | 9 |

In a case in which each control channel resource set includes eight PRB pairs and each eCCE includes four eREGs, as shown in FIG. 13.1, a mapping manner used between eCCEs and eREGs of the first four PRBs is a mapping manner of eCCEs having even numbers in FIG. 10.1, and a mapping manner used between eCCEs and eREGs of the last four PRBs is a mapping manner of eCCEs having odd numbers in FIG. 10.1, or the odd numbers are interchanged.

FIG. 14.1 Manner of mapping between eCCEs and eREGs, where there are eight PRB pairs, and each eCCE includes eight eREGs

| ECCE index | ECCE0 | ECCE1 | ECCE2 | ECCE3 | ECCE0 | ECCE1 | ECCE2 | ECCE3 |
|---|---|---|---|---|---|---|---|---|
| PRB pair 0 | 0 | 4 | 8 | 12 | 1 | 5 | 9 | 13 |
| PRB pair 1 | 4 | 8 | 12 | 0 | 5 | 9 | 13 | 1 |
| PRB pair 2 | 8 | 12 | 0 | 4 | 9 | 13 | 1 | 5 |
| PRB pair 3 | 12 | 0 | 4 | 8 | 13 | 1 | 5 | 9 |

| ECCE index | ECCE4 | ECCE5 | ECCE6 | ECCE7 | ECCE4 | ECCE5 | ECCE6 | ECCE7 |
|---|---|---|---|---|---|---|---|---|
| PRB pair 0 | 2 | 6 | 10 | 14 | 3 | 7 | 11 | 15 |
| PRB pair 1 | 6 | 10 | 14 | 2 | 7 | 11 | 15 | 3 |
| PRB pair 2 | 10 | 14 | 2 | 6 | 11 | 15 | 3 | 7 |
| PRB pair 3 | 14 | 2 | 6 | 10 | 15 | 3 | 7 | 11 |

TABLE 8.1

Manner 2-1 of mapping between eCCEs and eREGs, where there are eight PRB pairs, and each eCCE includes eight eREGs

| ECCE index | ECCE0 | ECCE1 | ECCE2 | ECCE3 | ECCE4 | ECCE5 | ECCE6 | ECCE7 |
|---|---|---|---|---|---|---|---|---|
| PRB pair 0 | 0 | 1 | 2 | 3 | 4 | 5 | 6 | 7 |
| PRB pair 1 | 4 | 5 | 6 | 7 | 8 | 9 | 10 | 11 |
| PRB pair 2 | 8 | 9 | 10 | 11 | 12 | 13 | 14 | 15 |
| PRB pair 3 | 12 | 13 | 14 | 15 | 0 | 1 | 2 | 3 |
| PRB pair 4 | 1 | 0 | 3 | 2 | 5 | 4 | 7 | 6 |

TABLE 8.1-continued

Manner 2-1 of mapping between eCCEs and eREGs, where there are eight
PRB pairs, and each eCCE includes eight eREGs

| PRB pair 5 | 5 | 4 | 7 | 6 | 9 | 8 | 11 | 10 |
|---|---|---|---|---|---|---|---|---|
| PRB pair 6 | 9 | 8 | 11 | 10 | 13 | 12 | 15 | 14 |
| PRB pair 7 | 13 | 12 | 15 | 14 | 1 | 0 | 3 | 2 |

| ECCE index | ECCE8 | ECCE9 | ECCE10 | ECCE11 | ECCE12 | ECCE13 | ECCE14 | ECCE15 |
|---|---|---|---|---|---|---|---|---|
| PRB pair 0 | 8 | 9 | 10 | 11 | 12 | 13 | 14 | 15 |
| PRB pair 1 | 12 | 13 | 14 | 15 | 0 | 1 | 2 | 3 |
| PRB pair 2 | 0 | 1 | 2 | 3 | 4 | 5 | 6 | 7 |
| PRB pair 3 | 4 | 5 | 6 | 7 | 8 | 9 | 10 | 11 |
| PRB pair 4 | 9 | 8 | 11 | 10 | 13 | 12 | 15 | 14 |
| PRB pair 5 | 13 | 12 | 15 | 14 | 1 | 0 | 3 | 2 |
| PRB pair 6 | 1 | 0 | 3 | 2 | 5 | 4 | 7 | 6 |
| PRB pair 7 | 5 | 4 | 7 | 6 | 9 | 8 | 11 | 10 |

Figure 5:
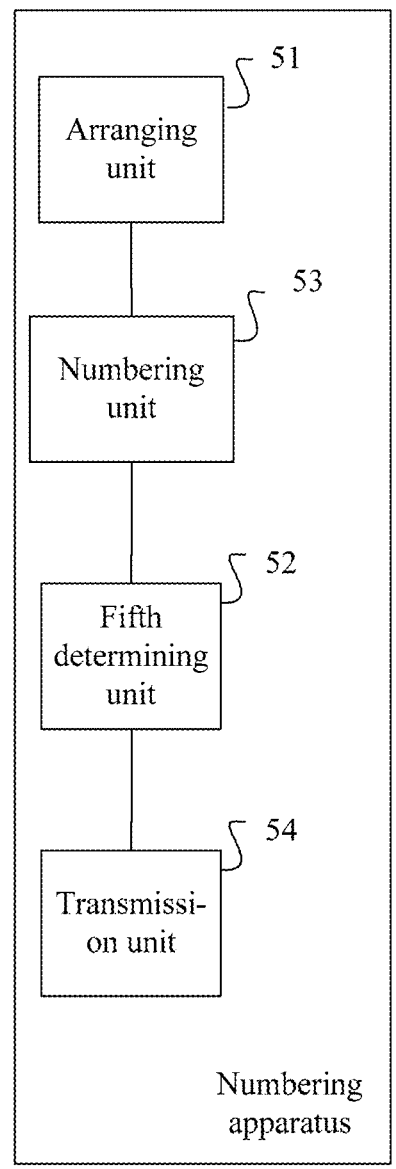
FIG. 5 is a schematic structural diagram of a transmission apparatus according to an embodiment of the present invention.

FIG. 5 is a schematic structural diagram of an E-PDCCH transmission apparatus according to an embodiment of the present invention. The apparatus may be a base station, or may be a user equipment. As shown in FIG. 5, the E-PDCCH transmission apparatus in this embodiment includes an arranging unit 51, a numbering unit 53, a fifth determining unit 52, and a transmission unit 54.

The arranging unit 51 is configured to separately arrange, in a physical resource block set, first resource groups in each physical resource block pair PRB pair, where the first resource groups are resource element groups eREGs or REGs, and the physical resource block set includes at least one of the physical resource block pairs.

The numbering unit 53 is configured to number second resource groups according to a correspondence between the first resource groups and the second resource groups in the physical resource block set, where the second resource groups are control channel element eCCE groups or control channel candidates.

The fifth determining unit 52 is configured to determine numbers of the second resource groups for transmitting an E-PDCCH.

The transmission unit 54 is configured to map, according to the determined numbers, the E-PDCCH to the corresponding first resource groups for transmission.

Preferably, each of the physical resource block pairs includes N third resource groups, where N is a positive integer, and each of the third resource groups includes M first resource groups, and in the physical resource block set, a number set of first resource groups included in each third resource group in a physical resource block pair is the same as a number set of first resource groups included in a third resource group in each of other physical resource block pairs, and each of the third resource groups corresponds to one of second resource groups of a first type; and the numbering unit 53 is configured to sequentially number the second resource groups of the first type in each physical resource block pair in ascending or descending order of numbers of the physical resource block pairs, where a correspondence between numbers of the second resource groups of the first type and numbers of first resource groups corresponding to the second resource groups of the first type exists in each physical resource block pair.

Optionally, that a correspondence between numbers of the second resource groups of the first type and numbers of first resource groups corresponding to the second resource groups of the first type exists in each physical resource block pair includes that: in each physical resource block pair, the numbers of the second resource groups of the first type are consecutive, and a sequence of the numbers of the second resource groups of the first type is the same as a sequence of maximum numbers or minimum numbers of the first resource groups corresponding to the second resource groups of the first type.

Optionally, the numbering unit 53 is configured to determine the numbers of the second resource groups of the first type according to the following formula:

$$j = K*m + (i \bmod K),$$

where, i is a number of a first resource group, i is an integer from 0 to L−1, L is a quantity of first resource groups in one of the physical resource block pairs, j is a number of the second resource group of the first type, m is a number of a physical resource block pair, K is a quantity of the second resource groups of the first type in each of the physical resource block pairs, mod indicates a modulo operation, and the second resource groups of the first type correspond to M first resource groups that belong to a same physical resource block pair, where M is a positive integer.

Preferably, each of the physical resource block pairs includes N third resource groups, where N is a positive integer, and each of the third resource groups includes M first resource groups; in the physical resource block set, a number set of first resource groups included in each third resource group in a physical resource block pair is the same as a number set of first resource groups included in a third resource group in each of other physical resource block pairs; in each of the physical resource block pairs, a sequence of numbers of the third resource groups is the same as a sequence of maximum numbers or minimum numbers of the first resource groups in the third resource groups; each of the third resource groups corresponds to one of second resource groups of a first type; and the numbering unit 53 is configured to sequentially number the second resource groups of the first type corresponding to third resource groups having a same number in ascending or descending order of the numbers of the third resource groups, where a correspondence between a sequence of numbers of the second resource groups of the first type and a sequence of numbers of physical resource block pairs in which the second resource groups of the first type are located, exists in the second resource groups of the first type corresponding to the third resource groups having the same number.

Optionally, that a correspondence between a sequence of numbers of the second resource groups of the first type and a sequence of numbers of physical resource block pairs in which the second resource groups of the first type are located, exists in the second resource groups of the first type corresponding to the third resource groups having the same number includes that: in the second resource groups of the first type corresponding to the third resource groups having the same number, the numbers of the second resource groups of the first type are consecutive, and the sequence of the numbers of the second resource groups of the first type is the same as the sequence of the numbers of the physical resource block pairs in which the second resource groups of the first type are located.

Preferably, the numbering unit 53 is configured to determine the numbers of the second resource groups of the first type according to the following formula:

$$j=(i \bmod K)*K+m,$$

where, i is a number of a first resource group, i is an integer from 0 to L−1, L is a quantity of first resource groups in one of the physical resource block pairs, j is a number of the second resource group of the first type, m is a number of a physical resource block pair, K is a quantity of the second resource groups of the first type in each of the physical resource block pairs, mod indicates a modulo operation, and the second resource groups of the first type correspond to M first resource groups that belong to a same physical resource block pair, where M is a positive integer.

Preferably, for the second resource groups of the first type corresponding to the third resource groups having the same number, a mapping relationship between the second resource groups of the first type in a physical resource block pair and first resource groups included in the second resource groups of the first type in the physical resource block pair is a cyclic shift of a mapping relationship between one of the second resource groups of the first type in each of the other physical resource block pairs and first resource groups included in the one of the second resource groups of the first type in each of the other physical resource block pairs.

Optionally, the second resource groups of a second type include M first resource groups that respectively belong to different physical resource block pairs; and the numbering unit 53 is configured to use numbers of first resource groups in a same physical resource block pair corresponding to the second resource groups of the second type as numbers of the second resource groups of the second type.

Preferably, the numbering unit 53 is configured to determine the numbers of the second resource groups of the second type according to the following formula:

$$J=(I-K*m) \bmod 16,$$

where, i is a number of a first resource group, i is an integer from 0 to L−1, L is a quantity of first resource groups in one of the physical resource block pairs, j is a number of the second resource group of the second type, m is a number of a physical resource block pair, K is a quantity of the second resource groups of the second type in each of the physical resource block pairs, and mod indicates a modulo operation; or the numbering unit 53 is configured to determine the numbers of the second resource groups of the second type according to the following formula:

$$i=(j+x*K) \bmod N,$$

$$m=(\mathrm{floor}(j(M*K))*M+x) \bmod C,$$

where, i is a number of an $x^{th}$ first resource group corresponding to the second resource group numbered j of the second type, i is an integer from 0 to L−1, L is a quantity of first resource groups in one of the physical resource block pairs, m is a number of a physical resource block pair in which the $x^{th}$ first resource group corresponding to the second resource group numbered j of the second type is located, K=floor(P/O), P is a quantity of first resource groups in a physical resource block pair, O is a quantity of first resource groups included in a second resource group, C is a quantity of physical resource block pairs in the physical resource block set, mod indicates a modulo operation, and floor indicates a round-down operation.

Preferably, the second resource groups of a second type include M first resource groups that respectively belong to different physical resource block pairs, and the physical resource block set includes K sets of the second resource groups of the second type, where K is a positive integer, and in each set of the K sets, a mapping relationship between one of the second resource groups of the second type and first resource groups included in the one of the second resource groups of the second type is a cyclic shift of a mapping relationship between each of other second resource groups of the second type and first resource groups included in each of the other second resource groups of the second type; the numbering unit 53 is configured to number, in each set of the K sets, the second resource groups of the second type according to numbers of first resource groups in a same physical resource block pair corresponding to the second resource groups of the second type; and between different sets of the K sets, a sequence of numbers of the second resource groups of the second type is the same as a sequence of maximum numbers or minimum numbers of first resource groups corresponding to the different sets in the K sets in a same physical resource block pair.

Optionally, the physical resource set includes K sets of the second resource groups of the second type, and in each set of the K sets, a mapping relationship between one of the second resource groups of the second type and first resource groups included in the one of the second resource groups of the second type is a cyclic shift of a mapping relationship between each of other second resource groups of the second type and first resource groups included in each of the other second resource groups of the second type.

Preferably, if first resource groups corresponding to at least two of the second resource groups of the first type in the physical resource block set are the same as first resource groups corresponding to at least two of the second resource groups of the second type in the physical resource block set, a set of numbers of the at least two of the second resource groups of the first type is the same as a set of numbers of the at least two of the second resource groups of the second type.

Preferably, the second resource groups of the first type in the physical resource block set are resource groups for transmitting the E-PDCCH in localized mode; and the second resource groups of the second type in the physical resource block set are resource groups for transmitting the E-PDCCH in distributed mode.

The transmission apparatus in this embodiment implements numbering of the second resource groups of the first type and the second resource groups of the second type, and thereby implements E-PDCCH transmission and is advantageous for blind detection.

Figure 6:
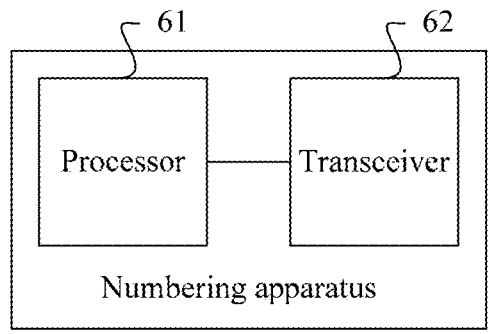
FIG. 6 is a schematic structural diagram of a numbering apparatus according to another embodiment of the present invention.

FIG. 6 is a schematic structural diagram of an E-PDCCH transmission apparatus according to another embodiment of the present invention. The apparatus may be a base station, or may be a user equipment. As shown in FIG. 6, the apparatus in this embodiment includes at least one processor 61 and a transceiver 62, where the transceiver 62 is configured to transmit and receive a signal, and the processor 61 is configured to execute the following steps:

in a physical resource block set, separately arranging first resource groups in each physical resource block pair PRB pair, where the first resource groups are resource element groups eREGs or REGs, and the physical resource block set includes at least one of the physical resource block pairs;

numbering second resource groups according to a correspondence between the first resource groups and the second resource groups in the physical resource block set, where the second resource groups are control channel element eCCE groups or control channel candidates;

determining numbers of the second resource groups for transmitting an E-PDCCH; and mapping, according to the determined numbers, the E-PDCCH to the corresponding first resource groups for transmission.

Preferably, each of the physical resource block pairs includes N third resource groups, where N is a positive integer, and each of the third resource groups includes M first resource groups, and in the physical resource block set, a number set of first resource groups included in each third resource group in a physical resource block pair is the same as a number set of first resource groups included in a third resource group in each of other physical resource block pairs; and the processor 61 is configured to implement, in the following manner, the numbering second resource groups according to a correspondence between the first resource groups and second resource groups in the physical resource block set: each of the third resource groups corresponds to one of second resource groups of a first type, and the second resource groups of the first type in each physical resource block pair are numbered sequentially in ascending or descending order of numbers of the physical resource block pairs, where a correspondence between numbers of the second resource groups of the first type and numbers of first resource groups corresponding to the second resource groups of the first type exists in each physical resource block pair.

Preferably, that a correspondence between numbers of the second resource groups of the first type and numbers of first resource groups corresponding to the second resource groups of the first type exists in each physical resource block pair includes that: in each physical resource block pair, the numbers of the second resource groups of the first type are consecutive, and a sequence of the numbers of the second resource groups of the first type is the same as a sequence of maximum numbers or minimum numbers of the first resource groups corresponding to the second resource groups of the first type.

Optionally, the processor 61 is configured to implement, in the following manner, the numbering second resource groups according to a correspondence between the first resource groups and second resource groups in the physical resource block set:

determining the numbers of the second resource groups of the first type according to the following formula:

$$j = K*m + (i \mod K),$$

where, i is a number of a first resource group, i is an integer from 0 to L−1, L is a quantity of first resource groups in one of the physical resource block pairs, j is a number of the second resource group of the first type, m is a number of a physical resource block pair, K is a quantity of the second resource groups of the first type in each of the physical resource block pairs, mod indicates a modulo operation, and the second resource groups of the first type correspond to M first resource groups that belong to a same physical resource block pair, where M is a positive integer.

Preferably, each of the physical resource block pairs includes N third resource groups, where N is a positive integer, and each of the third resource groups includes M first resource groups; in the physical resource block set, a number set of first resource groups included in each third resource group in a physical resource block pair is the same as a number set of first resource groups included in a third resource group in each of other physical resource block pairs; in each of the physical resource block pairs, a sequence of numbers of the third resource groups is the same as a sequence of maximum numbers or minimum numbers of the first resource groups in the third resource groups; and the processor 61 is configured to implement, in the following manner, the numbering second resource groups according to a correspondence between the first resource groups and the second resource groups in the physical resource block set: each of the third resource groups corresponds to one of second resource groups of a first type, and the second resource groups of the first type corresponding to third resource groups having a same number are numbered sequentially in ascending or descending order of the numbers of the third resource groups, where a correspondence between a sequence of numbers of the second resource groups of the first type and a sequence of numbers of physical resource block pairs in which the second resource groups of the first type are located, exists in the second resource groups of the first type corresponding to the third resource groups having the same number.

Optionally, that a correspondence between a sequence of numbers of the second resource groups of the first type and a sequence of numbers of physical resource block pairs in which the second resource groups of the first type are located, exists in the second resource groups of the first type corresponding to the third resource groups having the same number, includes that: in the second resource groups of the first type corresponding to the third resource groups having the same number, the numbers of the second resource groups of the first type are consecutive, and the sequence of the numbers of the second resource groups of the first type is the same as the sequence of the numbers of the physical resource block pairs in which the second resource groups of the first type are located.

Preferably, the processor 61 is configured to implement, in the following manner, the numbering second resource groups according to a correspondence between the first resource groups and the second resource groups in the physical resource block set:

determining the numbers of the second resource groups of the first type according to the following formula:

$$j = (i \mod K)*K + m,$$

where, i is a number of a first resource group, i is an integer from 0 to L−1, L is a quantity of first resource groups in one of the physical resource block pairs, j is a number of the second resource group of the first type, m is a number of a physical resource block pair, K is a quantity of the second resource groups of the first type in each of the physical resource block pairs, mod indicates a modulo operation, and the second resource groups of the first type correspond to M first resource groups that belong to a same physical resource block pair, where M is a positive integer.

Preferably, for the second resource groups of the first type corresponding to the third resource groups having the same number, a mapping relationship between the second resource groups of the first type in a physical resource block pair and first resource groups included in the second resource groups of the first type in the physical resource block pair is a cyclic shift of a mapping relationship between one of the second resource groups of the first type in each of the other physical resource block pairs and first resource groups included in the one of the second resource groups of the first type in each of the other physical resource block pairs.

Optionally, the processor 61 is configured to implement, in the following manner, the numbering second resource groups according to a correspondence between the first resource groups and the second resource groups in the physical resource block set: the second resource groups of a second type include M first resource groups that respectively belong to different physical resource block pairs; and numbers of first resource groups in a same physical resource block pair corresponding to the second resource groups of the second type are used as numbers of the second resource groups of the second type.

Preferably, the processor 61 is configured to implement, in the following manner, the numbering second resource groups according to a correspondence between the first resource groups and the second resource groups in the physical resource block set:

determining the numbers of the second resource groups of the second type according to the following formula:

$$j=(i-K*m)\mod 16,$$

where, i is a number of a first resource group, i is an integer from 0 to L−1, L is a quantity of first resource groups in one of the physical resource block pairs, j is a number of the second resource group of the second type, m is a number of a physical resource block pair, K is a quantity of the second resource groups of the second type in each of the physical resource block pairs, and mod indicates a modulo operation; or determining the numbers of the second resource groups of the second type according to the following formula:

$$i=(j+x*K)\mod N,$$

$$m=(\text{floor}(j/(M*K))*M+x)\mod C,$$

where, i is a number of an $x^{th}$ first resource group corresponding to the second resource group numbered j of the second type, i is an integer from 0 to L−1, L is a quantity of first resource groups in one of the physical resource block pairs, m is a number of a physical resource block pair in which the $x^{th}$ first resource group corresponding to the second resource group numbered j of the second type is located, K=floor(P/O), P is a quantity of first resource groups in a physical resource block pair, O is a quantity of first resource groups included in a second resource group, C is a quantity of physical resource block pairs in the physical resource block set, mod indicates a modulo operation, and floor indicates a round-down operation.

Optionally, the processor 61 is configured to implement, in the following manner, the numbering second resource groups according to a correspondence between the first resource groups and the second resource groups in the physical resource block set: the second resource groups of a second type include M first resource groups that respectively belong to different physical resource block pairs, and the physical resource block set includes K sets of the second resource groups of the second type, where K is a positive integer, and in each set of the K sets, a mapping relationship between one of the second resource groups of the second type and first resource groups included in the one of the second resource groups of the second type is a cyclic shift of a mapping relationship between each of other second resource groups of the second type and first resource groups included in each of the other second resource groups of the second type; in each set of the K sets, the second resource groups of the second type are numbered according to numbers of first resource groups in a same physical resource block pair corresponding to the second resource groups of the second type; and between different sets of the K sets, a sequence of numbers of the second resource groups of the second type is the same as a sequence of maximum numbers or minimum numbers of first resource groups corresponding to the different sets in the K sets in a same physical resource block pair.

Preferably, the physical resource set includes K sets of the second resource groups of the second type, and in each set of the K sets, a mapping relationship between one of the second resource groups of the second type and first resource groups included in the one of the second resource groups of the second type is a cyclic shift of a mapping relationship between each of other second resource groups of the second type and first resource groups included in each of the other second resource groups of the second type.

Optionally, if first resource groups corresponding to at least two of the second resource groups of the first type in the physical resource block set are the same as first resource groups corresponding to at least two of the second resource groups of the second type in the physical resource block set, a set of numbers of the at least two of the second resource groups of the first type is the same as a set of numbers of the at least two of the second resource groups of the second type.

Optionally, the second resource groups of the first type in the physical resource block set are resource groups for transmitting the E-PDCCH in localized mode; and the second resource groups of the second type in the physical resource block set are resource groups for transmitting the E-PDCCH in distributed mode.

The apparatus provided by this embodiment implements numbering of the second resource groups of the first type and the second resource groups of the second type, and thereby implements E-PDCCH transmission and is advantageous for blind detection.

Each localized control channel candidate is preferably centralized in contiguous PRB pairs, but different localized control channel candidates should be decentralized as much as possible, so that a scheduling gain and a beam forming gain of a localized control channel may be obtained. Each control channel candidate at an aggregation level of 1, 2, or 4 may be transmitted in one PRB pair, and therefore, N distributed PRB pairs may be configured as search scopes of the aggregation level of 1, 2, or 4. However, for control channel candidates at an aggregation level of 8, if the foregoing configured search scopes are also used for each control channel candidate, the control channel candidates are decentralized in different PRB pairs for transmission, and no scheduling gain can be obtained. In view of this problem, the following embodiments of the present invention provide a control channel detection method and a control channel sending method. Different control channels are distinguished, different control channels are transmitted by using different physical resource block sets, and a search scope may be implicitly defined for a control channel candidate transmitted in more than one PRB pair may be supported. Thereby, resources may be configured more flexibly, control signaling is saved, and it may be ensured that better channel estimation performance in a PRG may be obtained for a control channel candidate in more than one PRB pair.

Figure 7A:
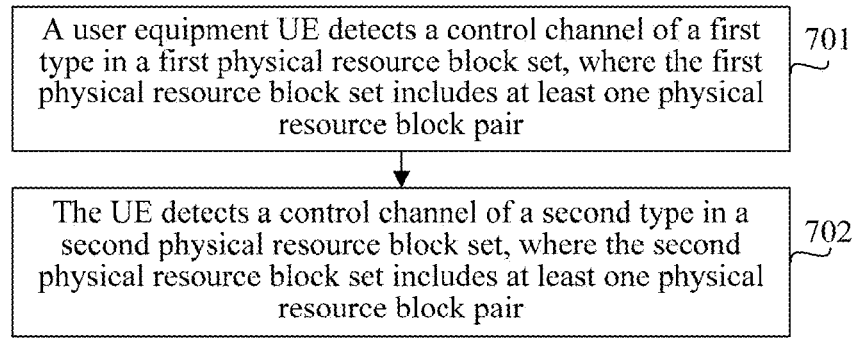
FIG. 7A is a flowchart of a control channel detection method according to an embodiment of the present invention.

FIG. 7A is a flowchart of a control channel detection method according to an embodiment of the present invention. As shown in FIG. 7A, the method in this embodiment includes:

Step 701: A user equipment UE detects a control channel of a first type in a first physical resource block set, where the first physical resource block set includes at least one physical resource block pair.

Step 702: The UE detects a control channel of a second type in a second physical resource block set, where the second physical resource block set includes at least one physical resource block pair.

In an optional implementation manner of this embodiment, the control channel of the first type is a control channel transmitted in localized mode; and the control channel of the second type is a control channel transmitted in distributed mode.

In an optional implementation manner of this embodiment, the control channel of the first type is a control channel that is transmitted in localized mode and whose aggregation level is lower than or equal to a preset aggregation threshold; and the control channel of the second type is a control channel that is transmitted in localized mode and whose aggregation level is higher than the preset aggregation threshold.

In an optional implementation manner of this embodiment, the control channel of the first type is a control channel transmitted in localized mode, and the control channel candidate of the first type is transmitted in one physical resource block pair; and the control channel of the second type is a control channel transmitted in localized mode, and the control channel candidate of the second type is transmitted in at least two physical resource block pairs.

Further, optionally, the control channel candidate of the second type corresponds to at least two physical resource block pairs, and the at least two physical resource block pairs corresponding to the control channel candidate of the second type are located in a same precoding resource block group (Precoding resource block group, PRG for short) or a same resource block group (Resource Block Group, RBG for short) or a same subband, so that channel estimation performance and demodulation performance may be improved.

In an optional implementation manner of this embodiment, at least one physical resource block pair included in the first physical resource block set is located in different precoding block groups PRGs or resource block groups RBGs or subbands.

In an optional implementation manner of this embodiment, before the UE detects the control channel of the first type in the first physical resource block set, the method includes: receiving, by the UE, first higher layer signaling, where the first higher layer signaling includes the first resource block set. That is, the first physical resource block set may be configured by a higher layer on a network side, and specifically, may be configured by using static signaling or dynamic signaling. This manner may improve flexibility of configuring the first resource block set.

Figure 7B:
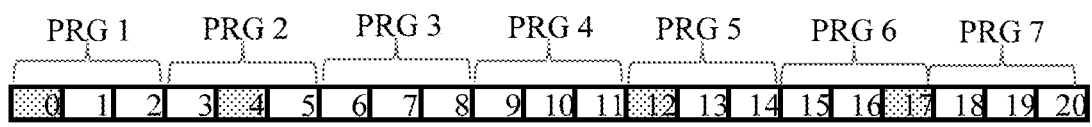
FIG. 7B and FIG. 7C are schematic diagrams of a first physical resource block set and a second physical resource block set according to an embodiment of the present invention.

FIG. 7B shows a first physical resource block set configured by the network side for a control channel. The first physical resource block set, for example, includes four PRB pairs. The configuration manner may be a manner of configuring four consecutive VRBs, or may be a resource allocation manner 1. The four configured PRB pairs are PRB pair 0, PRB pair 4, PRB pair 12, and PRB pair 17 in FIG. 7B.

Figure 7C:
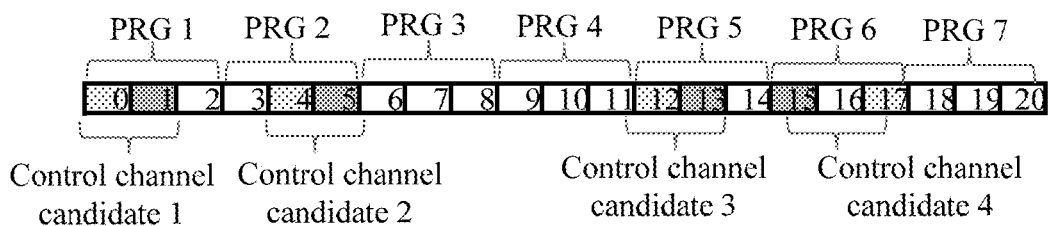

The control channel candidate transmitted in localized mode may be transmitted in at least one PRB pair. For example, a search scope of the control channel candidate that is transmitted in localized mode and whose aggregation level is 1, 2, or 4 is at least one PRB pair in the first physical resource block set, and each control channel candidate is transmitted in only one PRB pair in the first physical resource block set. The control channel candidate that is transmitted in localized mode and whose aggregation level is 8 needs to be transmitted in two PRB pairs. Therefore, each control channel candidate is limited to two PRB pairs in one PRG or one RBG or one subband for transmission. One PRB pair of the two PRB pairs comes from the first physical resource block set, and the other PRB pair comes from the second physical resource block set. When the control channel candidate transmitted in localized mode needs to be transmitted in two PRB pairs, a manner shown in FIG. 7C may be used. In FIG. 7C, dotted boxes constitute the first physical resource block set, and gray boxes constitute the second physical resource block set.

Optionally, the second physical resource block set and the first physical resource block set may use an implicit correspondence, and may also be configured for the UE by using higher layer signaling. An implicit correspondence is that: in the first physical resource block set, each PRB pair belongs to different PRGs or RBGs or subbands, and therefore, one PRB pair associated with a PRB pair of the first physical resource block set is implicitly predefined in each RPG or RBG or subband, and used as a PRB pair of the second physical resource block set. For example, an association manner may be that a distance between the PRB pair of the second physical resource block set and the PRB pair of the first physical resource block set in one PRG or RBG or subband is a cyclic difference of at least one PRB pair. As shown in FIG. 7C, in PRG 1, a position index of the PRB pair in the first physical resource block set is 0, and a position index of the PRB pair in the second physical resource block set is 1; in PRG 2, a position index of the PRB pair in the first physical resource block set is 4, and a position index of the PRB pair in the second physical resource block set is 5; in PRG 5, a position index of the PRB pair in the first physical resource block set is 12, and a position index of the PRB pair in the second physical resource block set is 13; in PRG 6, a position index of the PRB pair in the first physical resource block set is 17, and a position index of the PRB pair in the second physical resource block set is 15. This implicit correspondence may enable a base station to send the first physical resource block set by using only higher layer signaling, and is advantageous for reducing signaling notifications.

In an optional implementation manner of this embodiment, the second physical resource block set includes the first physical resource block set and a third physical resource block set. As shown in FIG. 7C, dotted boxes and gray boxes constitute the second physical resource block set, where the dotted boxes constitute the first physical resource block set, and the padded boxes constitute the third physical resource block set.

On a basis of the foregoing description, one physical resource block pair of the at least two physical resource block pairs corresponding to the control channel candidate of the second type is a physical resource block pair of the first physical resource block set, and at least one physical resource block pair of the remaining physical resource block pairs is a physical resource block pair of the third physical resource block set.

In an optional implementation manner of this embodiment, before the UE detects the control channel of the second type in the second physical resource block set, the method includes: obtaining, by the UE, the third resource block set according to the first resource block set and a preset function mapping relationship, which may reduce signaling notifications, so that a manner of configuring control channel resources is more flexible. Alternatively, the UE receives second higher layer signaling, where the second higher layer signaling includes the third resource block set. That is, the third physical resource block set may be configured by a higher layer on the network side, and may be configured by using higher layer static signaling or dynamic signaling. This manner is advantageous for improving flexibility of configuring the third physical resource block set.

By using the control channel detection method provided by this embodiment, control channels may be classified into different types, and detection and reception of control channels of different types are completed. In addition, during transmission in localized mode, this embodiment may limit a control channel candidate used for transmission to one PRG or RBG or subband, which may improve channel estimation performance and demodulation performance.

An embodiment of the present invention provides a control channel sending method. An entity for executing the method is a base station. The method specifically includes: determining, by a base station, a type of a control channel to be sent; if it is determined that the control channel is a control channel of a first type, sending, by the base station, the control channel in a first physical resource block set; and if it is determined that the control channel is a control channel of a second type, sending, by the base station, the control channel in a second physical resource block set, where the first physical resource block set includes at least one physical resource block pair, and the second physical resource block set includes at least one physical resource block pair.

Specifically, if the control channel of the first type is to be sent, the base station sends the control channel of the first type in the first physical resource block set, and if the control channel of the second type is to be sent, the base station sends the control channel of the second type in the second physical resource block set.

In an optional implementation manner of this embodiment, the control channel of the first type is a control channel transmitted in localized mode; and the control channel of the second type is a control channel transmitted in distributed mode.

In an optional implementation manner of this embodiment, the control channel of the first type is a control channel that is transmitted in localized mode and whose aggregation level is lower than or equal to a preset aggregation threshold; and the control channel of the second type is a control channel that is transmitted in localized mode and whose aggregation level is higher than the preset aggregation threshold.

In an optional implementation manner of this embodiment, the control channel of the first type is a control channel transmitted in localized mode, and the control channel candidate of the first type is transmitted in one physical resource block pair; and the control channel of the second type is a control channel transmitted in localized mode, and the control channel candidate of the second type is transmitted in at least two physical resource block pairs.

Further, optionally, the control channel candidate of the second type corresponds to at least two physical resource block pairs, and the at least two physical resource block pairs corresponding to the control channel candidate of the second type are located in a same PRG or a same RBG or a same subband, which is advantageous for improving channel estimation performance and demodulation performance.

In an optional implementation manner of this embodiment, at least one physical resource block pair included in the first physical resource block set is located in different precoding block groups PRGs or resource block groups RBGs or subbands.

In an optional implementation manner of this embodiment, before the control channel of the first type is sent in the first physical resource block set, the method includes: sending, by the base station, first higher layer signaling, where the first higher layer signaling includes the first resource block set. That is, the first physical resource block set may be configured by a higher layer at a network side, and specifically, may be configured by using static signaling or dynamic signaling. This manner is advantageous for improving flexibility of configuring the first resource block set.

In an optional implementation manner of this embodiment, the second physical resource block set includes the first physical resource block set and a third physical resource block set.

On a basis of the foregoing description, one physical resource block pair of the at least two physical resource block pairs corresponding to the control channel candidate of the second type is a physical resource block pair of the first physical resource block set, and at least one physical resource block pair of the remaining physical resource block pairs is a physical resource block pair of the third physical resource block set.

In an optional implementation manner of this embodiment, before the base station sends the control channel of the second type in the second physical resource block set, the method includes: sending, by the base station, second higher layer signaling, where the second higher layer signaling includes the third resource block set. That is, the third physical resource block set may be configured by a higher layer at the network side, and may be configured by using higher layer static signaling or dynamic signaling. This manner is advantageous for improving flexibility of configuring the third resource block set.

By using the control channel sending method provided by this embodiment, control channels may be classified into different types, and sending of control channels of different types is completed. In addition, during transmission in localized mode, this embodiment may limit a control channel candidate used for transmission to one PRG or RBG or subband, which may improve channel estimation performance and demodulation performance.

Figure 8:
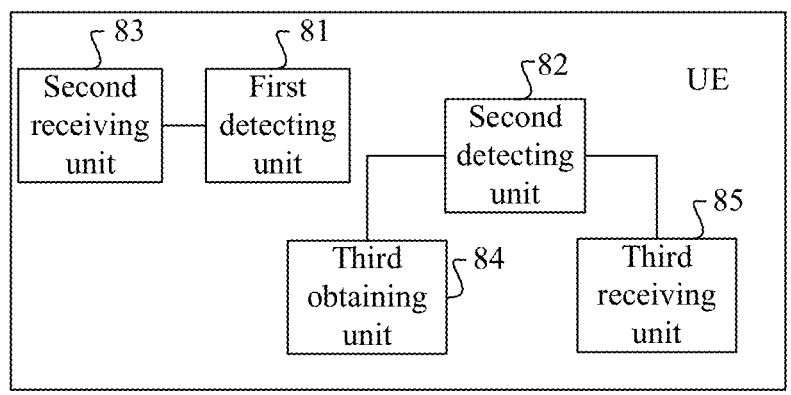
FIG. 8 is a schematic structural diagram of a UE according to still another embodiment of the present invention.

FIG. 8 is a schematic structural diagram of a UE according to still another embodiment of the present invention. As shown in FIG. 8, the UE in this embodiment includes a first detecting unit 81 and a second detecting unit 82.

The first detecting unit 81 is configured to detect a control channel of a first type in a first physical resource block set, where the first physical resource block set includes at least one physical resource block pair.

The second detecting unit 82 is configured to detect a control channel of a second type in a second physical resource block set, where the second physical resource block set includes at least one physical resource block pair.

In an optional implementation manner of this embodiment, the control channel of the first type is a control channel transmitted in localized mode; and the control channel of the second type is a control channel transmitted in distributed mode.

In an optional implementation manner of this embodiment, the control channel of the first type is a control channel that is transmitted in localized mode and whose aggregation level is lower than or equal to a preset aggregation threshold; and the control channel of the second type is a control channel that is transmitted in localized mode and whose aggregation level is higher than the preset aggregation threshold.

In an optional implementation manner of this embodiment, the control channel of the first type is a control channel transmitted in localized mode, and the control channel candidate of the first type is transmitted in one physical resource block pair; and the control channel of the second type is a control channel transmitted in localized mode, and the control channel candidate of the second type is transmitted in at least two physical resource block pairs.

Further, optionally, the control channel candidate of the second type corresponds to at least two physical resource block pairs, and the at least two physical resource block pairs corresponding to the control channel candidate of the second type are located in a same PRG or a same RBG or a same subband.

In an optional implementation manner of this embodiment, at least one physical resource block pair included in the first physical resource block set is located in different precoding block groups PRGs or resource block groups RBGs or subbands, so that channel estimation performance and demodulation performance may be improved.

In an optional implementation manner of this embodiment, the second physical resource block set includes the first physical resource block set and a third physical resource block set.

On a basis of the foregoing description, one physical resource block pair of the at least two physical resource block pairs corresponding to the control channel candidate of the second type is a physical resource block pair of the first physical resource block set, and at least one physical resource block pair of the remaining physical resource block pairs is a physical resource block pair of the third physical resource block set.

In an optional implementation manner of this embodiment, the UE in this embodiment further includes a second receiving unit 83. The second receiving unit 83 is configured to receive first higher layer signaling, where the first higher layer signaling includes the first resource block set. The second receiving unit 83 is connected to the first detecting unit 81, and configured to provide the first resource block set for the first detecting unit 81.

In an optional implementation manner of this embodiment, the UE in this embodiment further includes a third obtaining unit 84 and/or a third receiving unit 85.

The third obtaining unit 84 is configured to obtain the third resource block set according to the first resource block set and a preset function mapping relationship.

The third receiving unit 85 is configured to receive second higher layer signaling, where the second higher layer signaling includes the third resource block set. The third obtaining unit 84 and third receiving unit 85 are respectively connected to the second detecting unit 82, and configured to provide the third resource block set for the second detecting unit 82.

The UE provided by this embodiment may be configured to execute the procedure of the foregoing control channel detection method. Specific operating principles are not further described. For details, refer to the description of the method embodiment.

By using the UE provided by this embodiment, detection of control channels is completed, and during transmission in localized mode, a control channel candidate used for transmission is limited to one PRG or RBG or subband, which improves channel estimation performance and demodulation performance.

Figure 9:
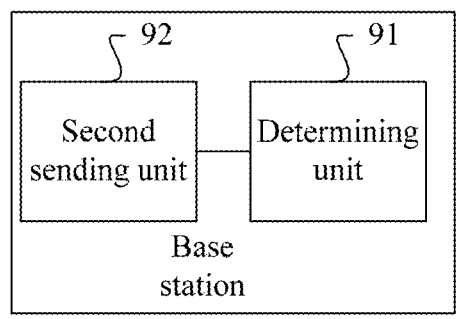
FIG. 9 is a schematic structural diagram of a base station according to still another embodiment of the present invention.

FIG. 9 is a schematic structural diagram of a base station according to still another embodiment of the present invention. As shown in FIG. 9, the base station in this embodiment includes a determining unit 91 and a second sending unit 92.

The determining unit 91 is configured to determine a type of a control channel to be sent. The second sending unit 92 is configured to send the control channel in a first physical resource block set when the determining unit 91 determines that the control channel is a control channel of a first type, or send the control channel in a second physical resource block set when the determining unit 91 determines that the control channel is a control channel of a second type, where the first physical resource block set includes at least one physical resource block pair, and the second physical resource block set includes at least one physical resource block pair.

In an optional implementation manner of this embodiment, the control channel of the first type is a control channel transmitted in localized mode; and the control channel of the second type is a control channel transmitted in distributed mode.

In an optional implementation manner of this embodiment, the control channel of the first type is a control channel that is transmitted in localized mode and whose aggregation level is lower than or equal to a preset aggregation threshold; and the control channel of the second type is a control channel that is transmitted in localized mode and whose aggregation level is higher than the preset aggregation threshold.

In an optional implementation manner of this embodiment, the control channel of the first type is a control channel transmitted in localized mode, and the control channel candidate of the first type is transmitted in one physical resource block pair; and the control channel of the second type is a control channel transmitted in localized mode, and the control channel candidate of the second type is transmitted in at least two physical resource block pairs.

Further, optionally, the control channel candidate of the second type corresponds to at least two physical resource block pairs, and the at least two physical resource block pairs corresponding to the control channel candidate of the second type are located in a same PRG or a same RBG or a same subband.

In an optional implementation manner of this embodiment, at least one physical resource block pair included in the first physical resource block set is located in different precoding block groups PRGs or resource block groups RBGs or subbands, so that channel estimation performance and demodulation performance may be improved.

In an optional implementation manner of this embodiment, the second physical resource block set includes the first physical resource block set and a third physical resource block set.

On a basis of the foregoing description, one physical resource block pair of the at least two physical resource block pairs corresponding to the control channel candidate of the second type is a physical resource block pair of the first physical resource block set, and at least one physical resource block pair of the remaining physical resource block pairs is a physical resource block pair of the third physical resource block set.

In an optional implementation manner of this embodiment, the second sending unit 92 is further configured to send first higher layer signaling, where the first higher layer signaling includes the first resource block set. The second sending unit 92 is specifically configured to send the first higher layer signaling to a UE before the second sending unit 92 sends the control channel.

In an optional implementation manner of this embodiment, the second sending unit 92 is further configured to send second higher layer signaling, where the second higher layer signaling includes the third resource block set. The second sending unit 92 is specifically configured to send the second higher layer signaling to a UE before the second sending unit 92 sends the control channel.

The base station provided by this embodiment may be configured to execute the procedure of the foregoing control channel sending method. Specific operating principles are not further described. For details, refer to the description of the method embodiment.

By using the base station provided by this embodiment, control channels may be classified into different types, and sending of control channels of different types is completed. In addition, during transmission in localized mode, limiting a control channel candidate used for transmission to one PRG or RBG or subband is supported, which may improve channel estimation performance and demodulation performance.

Still another embodiment of the present invention provides a UE. The UE includes at least one processor and a memory, where the memory is configured to store executable program code, and the processor runs, by reading the executable program code stored in the memory, a program corresponding to the executable program code so as to:

detect a control channel of a first type in a first physical resource block set, where the first physical resource block set includes at least one physical resource block pair; and detect a control channel of a second type in a second physical resource block set, where the second physical resource block set includes at least one physical resource block pair.

The UE provided by this embodiment may be configured to execute the procedure of the foregoing control channel detection method. Specific operating principles are not further described. For details, refer to the description of the method embodiment.

By using the UE provided by this embodiment, detection of control channels is completed, and during transmission in localized mode, a control channel candidate used for transmission is limited to one PRG or RBG or subband, which improves channel estimation performance and demodulation performance.

Still another embodiment of the present invention provides a base station. The base station includes a processor and a transmitter.

The processor is configured to determine a type of a control channel to be sent. The transmitter is configured to send the control channel in a first physical resource block set when the processor determines that the control channel is a control channel of a first type, or send the control channel in a second physical resource block set when the processor determines that the control channel is a control channel of a second type, where the first physical resource block set includes at least one physical resource block pair, and the second physical resource block set includes at least one physical resource block pair.

The base station provided by this embodiment may be configured to execute the procedure of the foregoing control channel sending method. Specific operating principles are not further described. For details, refer to the description of the method embodiment.

By using the base station provided by this embodiment, control channels may be classified into different types, and sending of control channels of different types is completed. In addition, during transmission in localized mode, limiting a control channel candidate used for transmission to one PRG or RBG or subband is supported, which may improve channel estimation performance and demodulation performance.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method comprising:
separately numbering, by a terminal device, first resource groups in each of at least one physical resource block (PRB) pair comprised in a PRB set, wherein the first resource groups are resource element groups;
numbering, by the terminal device, second resource groups in each of the at least one PRB pair according to a correspondence between the first resource groups and the second resource groups in each PRB pair of the PRB set, wherein
the second resource groups are control channel elements, each second resource group comprises at least one first resource group; and
in each PRB pair, numbers of the second resource groups are consecutive, and a sequence of the numbers of the second resource groups is the same as a sequence of maximum numbers of the first resource groups associated with the second resource groups;
determining, by the terminal device, the numbers of the second resource groups for receiving an physical downlink control channel; and
receiving, by the terminal device according to the determined numbers, the physical downlink control channel on the first resource groups associated with the second resource groups.

2. The method according to claim 1, wherein:
each of the PRB pairs comprises N third resource groups, wherein N is a positive integer, and each of the third resource groups comprises M first resource groups, wherein M is a positive integer, and in the PRB set, a number set of first resource groups comprised in each third resource group in a PRB pair is the same as a number set of first resource groups comprised in a third resource group in each of other PRB pairs; and each of the third resource groups corresponds to one of the second resource groups, and the second resource groups in each PRB pair are numbered sequentially in ascending order of numbers of the PRB pairs.

3. The method according to claim 2, wherein:

for the second resource groups associated with the third resource groups having the same number, a mapping relationship between the second resource group in a PRB pair and first resource groups comprised in the second resource group in the PRB pair is a cyclic shift of a mapping relationship between one of the second resource groups in other PRB pairs in the PRB set and first resource groups comprised in the one of the second resource groups of the first type in each of the other PRB pairs.

4. The method according to claim 1, wherein the numbers of the second resource groups satisfy the following:

$$j=K*m+(i \bmod K),$$

wherein i is a number of a first resource group, i is an integer from 0 to L−1, L is a quantity of the first resource groups in one of the PRB pairs, j is a number of a second resource group, m is a number of a PRB pair, K is a quantity of the second resource groups in each of the PRB pairs, mod indicates a modulo operation, and the second resource groups are associated with M first resource groups that belong to a same PRB pair, wherein M is a positive integer.

5. The method according to claim 1, wherein the numbers of the second resource groups satisfy the following:

$$j=(i \bmod K)*K+m,$$

wherein i is a number of a first resource group, i is an integer from 0 to L−1, L is a quantity of first resource groups in one of the PRB pairs, j is a number of a second resource group, m is a number of a PRB pair, K is a quantity of the second resource groups in each of the PRB pairs, mod indicates a modulo operation, and the second resource groups correspond to M first resource groups that belong to a same PRB pair, wherein M is a positive integer.

6. The method according to claim 1, wherein the second resource groups in the PRB set are resource groups for transmitting the physical downlink control channel in a localized mode.

7. An apparatus, comprising:

a storage medium including processor-executable instructions; and a processor coupled to the storage medium;

wherein the processor-executable instructions, when executed by the processor, cause the apparatus to:

separately number first resource groups in each of at least one physical resource block (PRB) pair comprised in a PRB set, wherein the first resource groups are resource element groups;

number second resource groups in each of the at least one PRB pair according to a correspondence between the first resource groups and the second resource groups in each PRB pair of the PRB set, wherein the second resource groups are control channel elements, each second resource group comprises at least one first resource group; and in each PRB pair, numbers of the second resource groups are consecutive, and a sequence of the numbers of the second resource groups is the same as a sequence of maximum numbers of the first resource groups associated with the second resource groups;

determine the numbers of the second resource groups for receiving a physical downlink control channel; and receive, according to the determined numbers, the physical downlink control channel on the first resource groups associated with the second resource groups.

8. The apparatus according to claim 7, wherein:

each of the PRB pairs comprises N third resource groups, wherein N is a positive integer, and each of the third resource groups comprises M first resource groups, wherein M is a positive integer, and in the PRB set, a number set of first resource groups comprised in each third resource group in a PRB pair is the same as a number set of first resource groups comprised in a third resource group in each of other PRB pairs; and each of the third resource groups corresponds to one of the second resource groups, and the second resource groups in each PRB pair are numbered sequentially in ascending order of numbers of the PRB pairs.

9. The apparatus according to claim 8, wherein:

for the second resource groups associated with the third resource groups having the same number, a mapping relationship between the second resource group in a PRB pair and first resource groups comprised in the second resource group in the PRB pair is a cyclic shift of a mapping relationship between one of the second resource groups in other PRB pairs in the PRB set and first resource groups comprised in the one of the second resource groups of the first type in each of the other PRB pairs.

10. The apparatus according to claim 7, wherein the numbers of the second resource groups satisfy the following:

$$j=K*m+(i \bmod K),$$

wherein i is a number of a first resource group, i is an integer from 0 to L−1, L is a quantity of the first resource groups in one of the PRB pairs, j is a number of a second resource group, m is a number of a PRB pair, K is a quantity of the second resource groups in each of the PRB pairs, mod indicates a modulo operation, and the second resource groups are associated with M first resource groups that belong to a same PRB pair, wherein M is a positive integer.

11. The apparatus according to claim 7, wherein the numbers of the second resource groups satisfy the following:

$$j=(i \bmod K)*K+m,$$

wherein i is a number of a first resource group, i is an integer from 0 to L−1, L is a quantity of first resource groups in one of the PRB pairs, j is a number of a second resource group, m is a number of a PRB pair, K is a quantity of the second resource groups in each of the PRB pairs, mod indicates a modulo operation, and the second resource groups correspond to M first resource groups that belong to a same PRB pair, wherein M is a positive integer.

12. The apparatus according to claim 7, wherein the second resource groups in the PRB set are resource groups for transmitting the physical downlink control channel in a localized mode.

13. A non-transitory computer-readable storage medium comprising instructions which, when executed by a computer, cause the computer to carry out operations including:
- separately numbering first resource groups in each of the at least one physical resource block (PRB) pair comprised in a PRB set, wherein the first resource groups are resource element groups;
- numbering second resource groups in each of the at least one PRB pair according to a correspondence between the first resource groups and the second resource groups in each PRB pair of the PRB set, wherein the second resource groups are control channel elements, each second resource group comprises at least one first resource group; and
- in each PRB pair, numbers of the second resource groups are consecutive, and a sequence of the numbers of the second resource groups is the same as a sequence of maximum numbers of the first resource groups associated with the second resource groups;
- determining the numbers of the second resource groups for receiving a physical downlink control channel; and
- receiving, according to the determined numbers, the physical downlink control channel on the first resource groups associated with the second resource groups.

14. The non-transitory computer-readable storage medium according to claim 13, wherein:
- each of the PRB pairs comprises N third resource groups, wherein N is a positive integer, and each of the third resource groups comprises M first resource groups, wherein M is a positive integer, and in the PRB set, a number set of first resource groups comprised in each third resource group in a PRB pair is the same as a number set of first resource groups comprised in a third resource group in each of other PRB pairs; and
- each of the third resource groups corresponds to one of the second resource groups, and the second resource groups in each PRB pair are numbered sequentially in ascending order of numbers of the PRB pairs.

15. The non-transitory computer-readable storage medium according to claim 14, wherein:
- for the second resource groups associated with the third resource groups having the same number, a mapping relationship between the second resource group in a PRB pair and first resource groups comprised in the second resource group in the PRB pair is a cyclic shift of a mapping relationship between one of the second resource groups in other PRB pairs in the PRB set and first resource groups comprised in the one of the second resource groups of the first type in each of the other PRB pairs.

16. The non-transitory computer-readable storage medium according to claim 13, wherein
the numbers of the second resource groups satisfy the following:

$j = K*m + (i \bmod K)$, wherein i is a number of a first resource group, i is an integer from 0 to L−1, L is a quantity of the first resource groups in one of the PRB pairs, j is a number of a second resource group, m is a number of a PRB pair, K is a quantity of the second resource groups in each of the PRB pairs, mod indicates a modulo operation, and the second resource groups are associated with M first resource groups that belong to a same PRB pair, wherein M is a positive integer.

17. The non-transitory computer-readable storage medium according to claim 13, wherein the numbers of the second resource groups satisfy the following:

$j = (i \bmod K)*K + m$, wherein i is a number of a first resource group, i is an integer from 0 to L−1, L is a quantity of first resource groups in one of the PRB pairs, j is a number of a second resource group, m is a number of a PRB pair, K is a quantity of the second resource groups in each of the PRB pairs, mod indicates a modulo operation, and the second resource groups correspond to M first resource groups that belong to a same PRB pair, wherein M is a positive integer.

18. The non-transitory computer-readable storage medium according to claim 13, wherein the second resource groups in the PRB set are resource groups for transmitting the physical downlink control channel in a localized mode.

* * * * *